June 14, 1960   S. T. CARTER   2,940,630
LABELING MACHINE
Filed Dec. 5, 1955   45 Sheets-Sheet 1
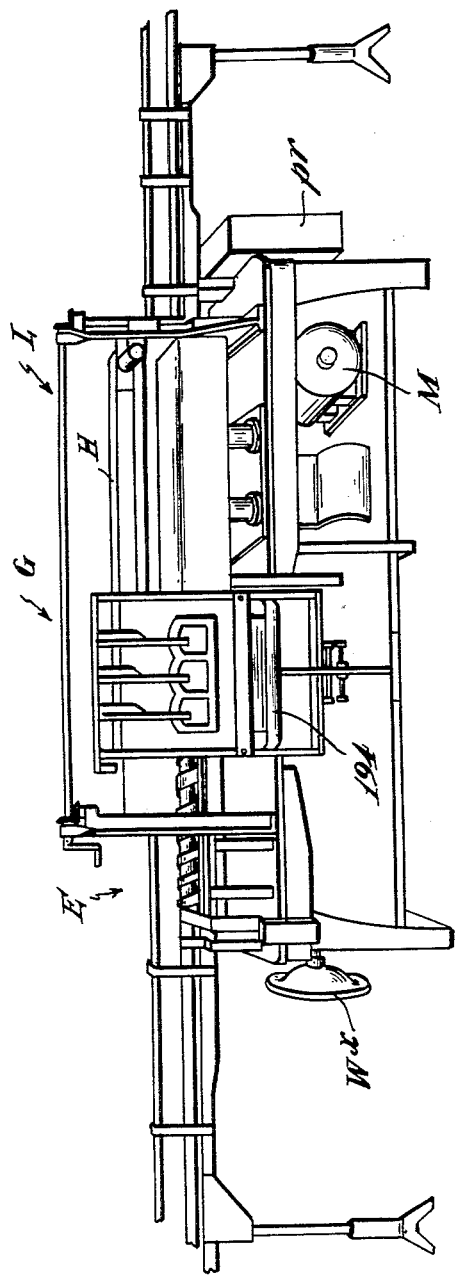
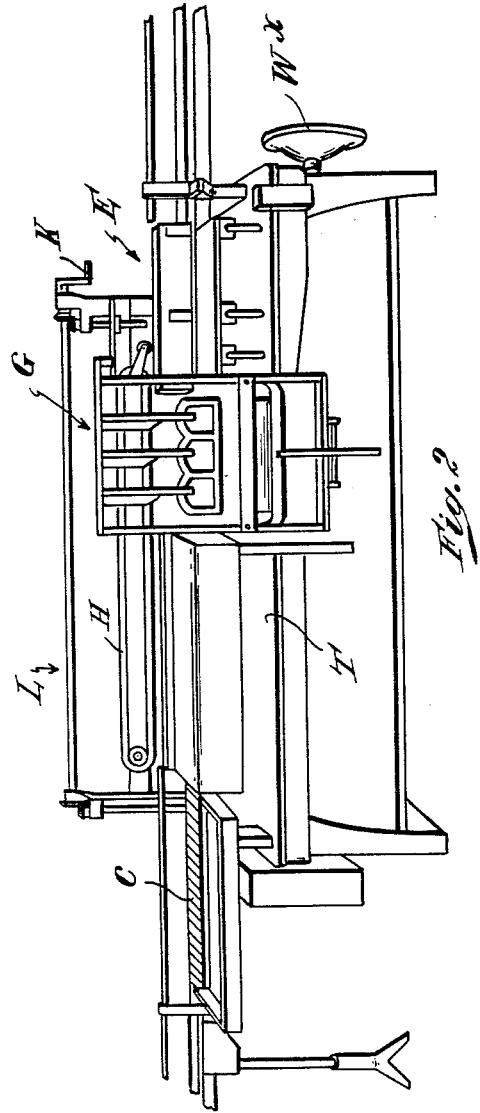
Inventor
Sidney T. Carter
by
Attys June 14, 1960   S. T. CARTER   2,940,630
LABELING MACHINE
Filed Dec. 5, 1955   45 Sheets-Sheet 2

Inventor
Sidney T. Carter
by Roberts Cushman Grover
Attys

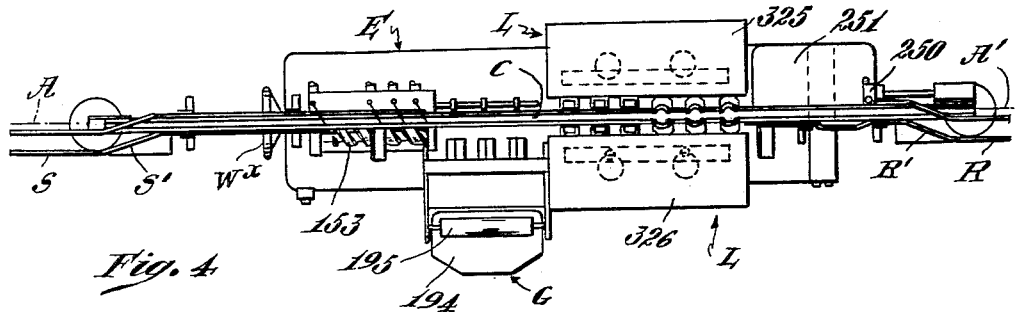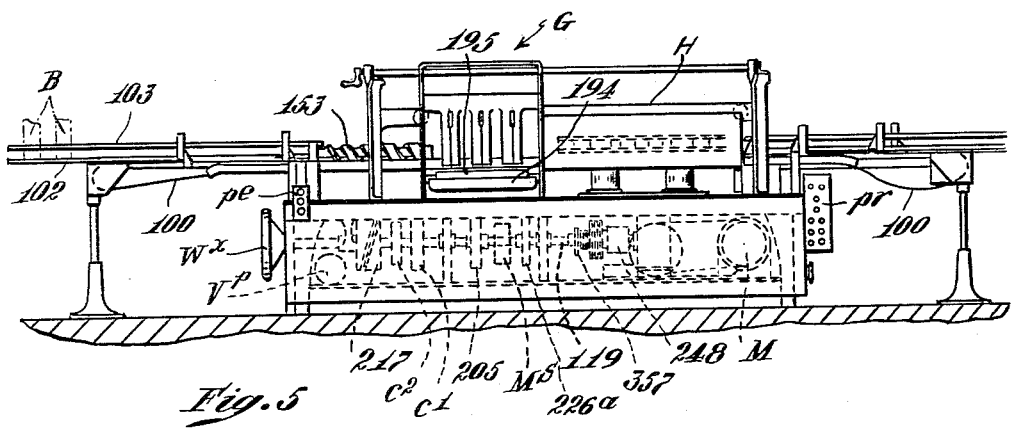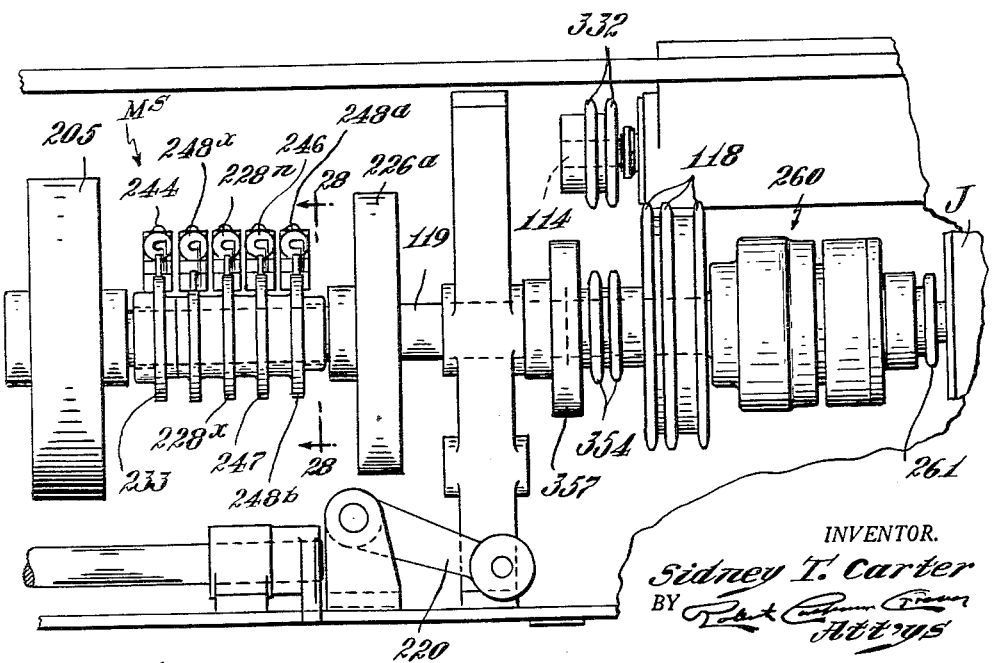

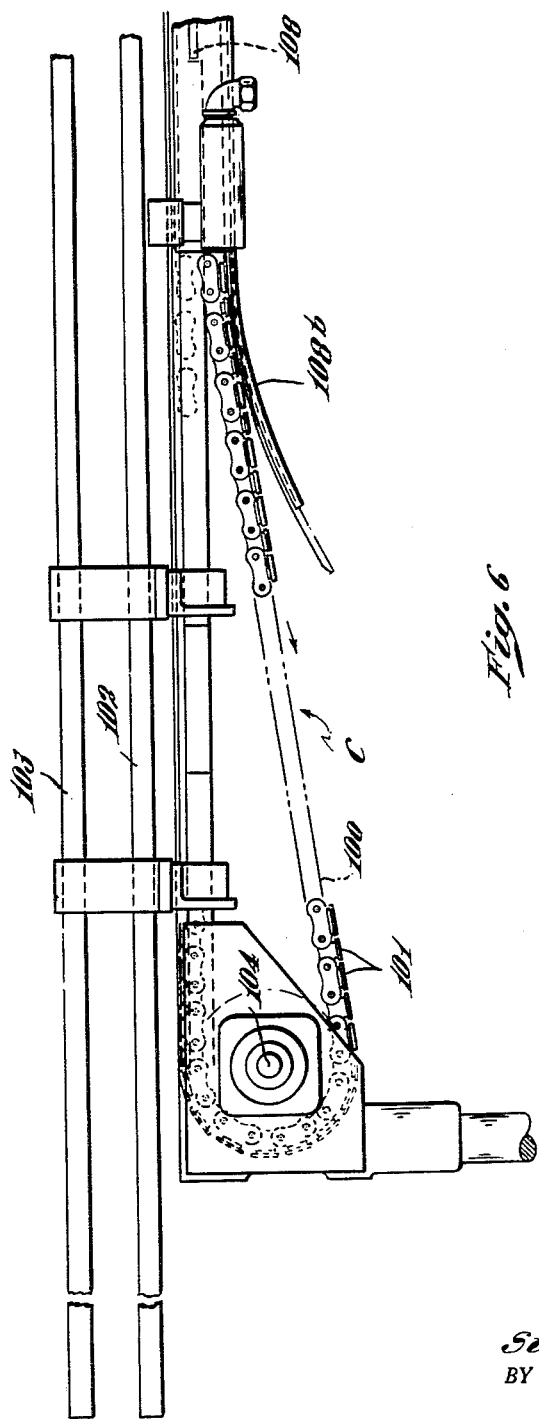

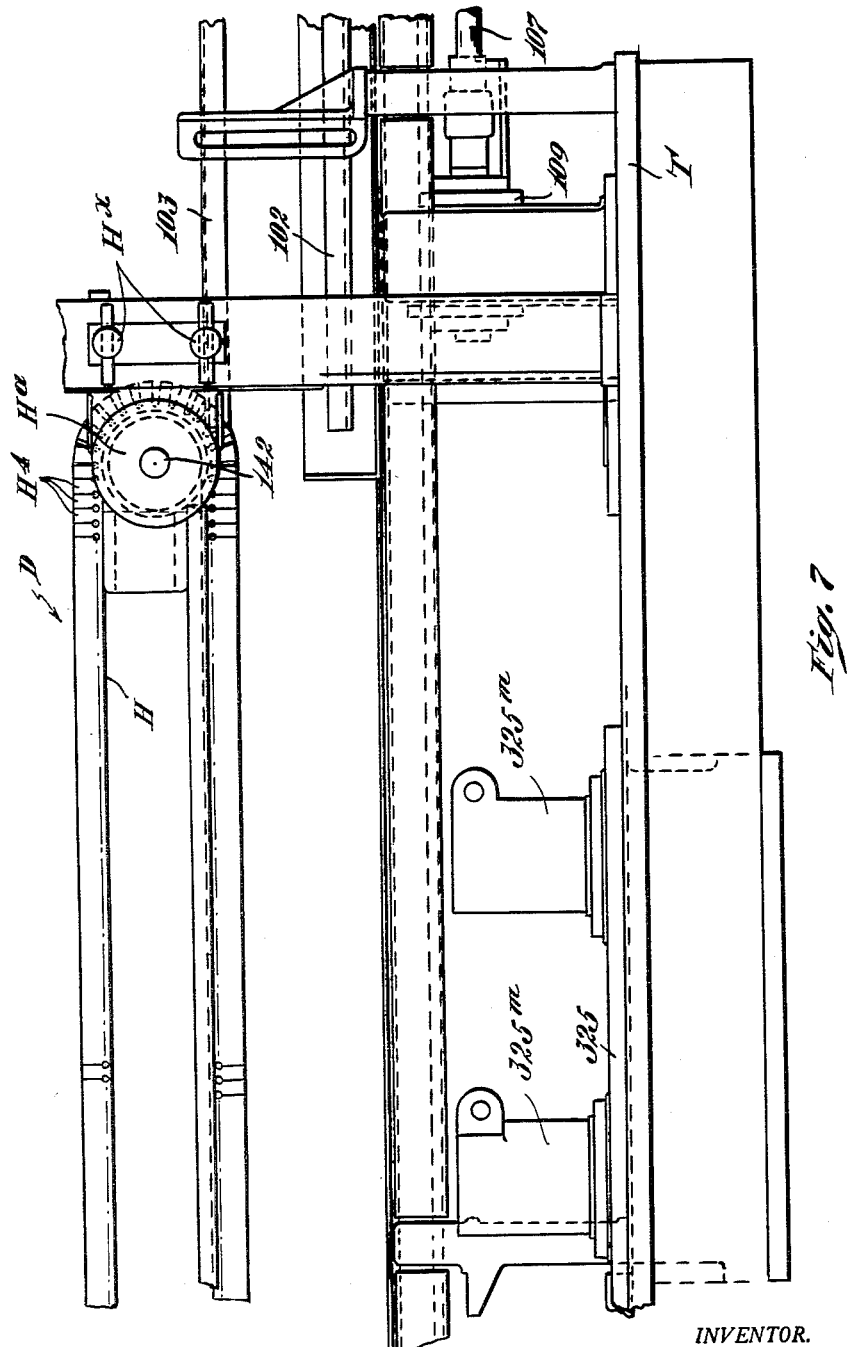

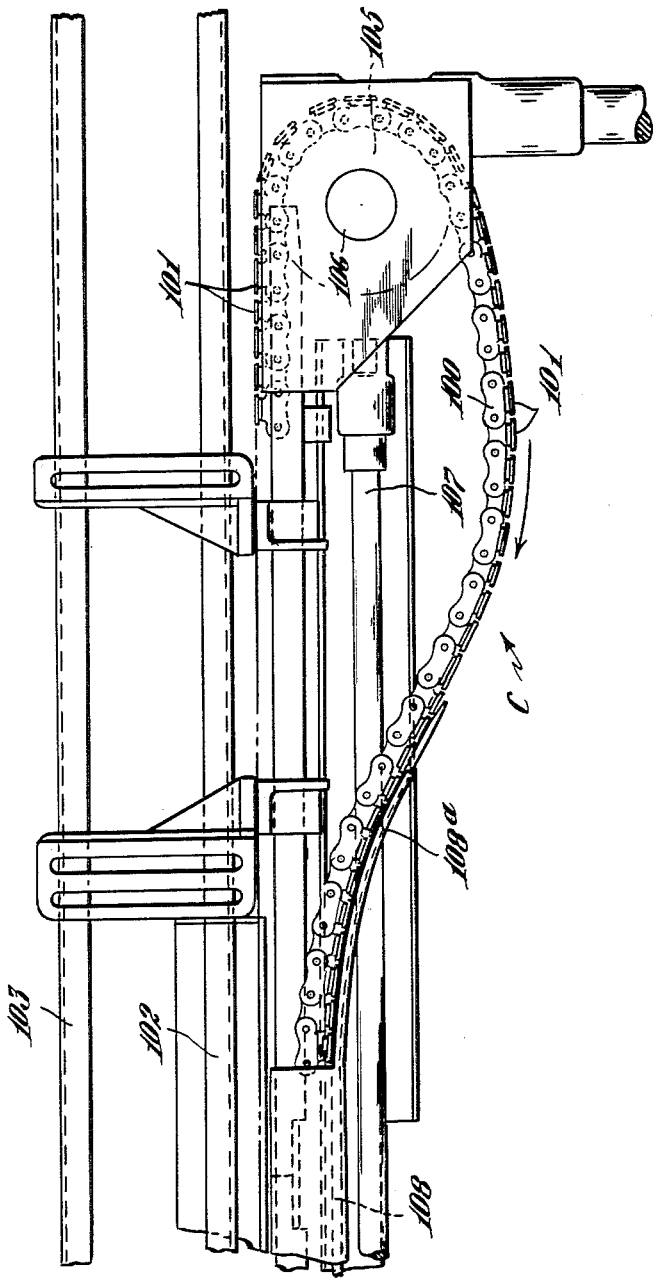

INVENTOR.
Sidney T. Carter

INVENTOR.
Sidney T. Carter

June 14, 1960 S. T. CARTER 2,940,630
LABELING MACHINE
Filed Dec. 5, 1955 45 Sheets-Sheet 13

INVENTOR.
Sidney T. Carter
BY
Attys

INVENTOR.
Sidney T. Carter
BY
Att'ys

INVENTOR.
Sidney T. Carter

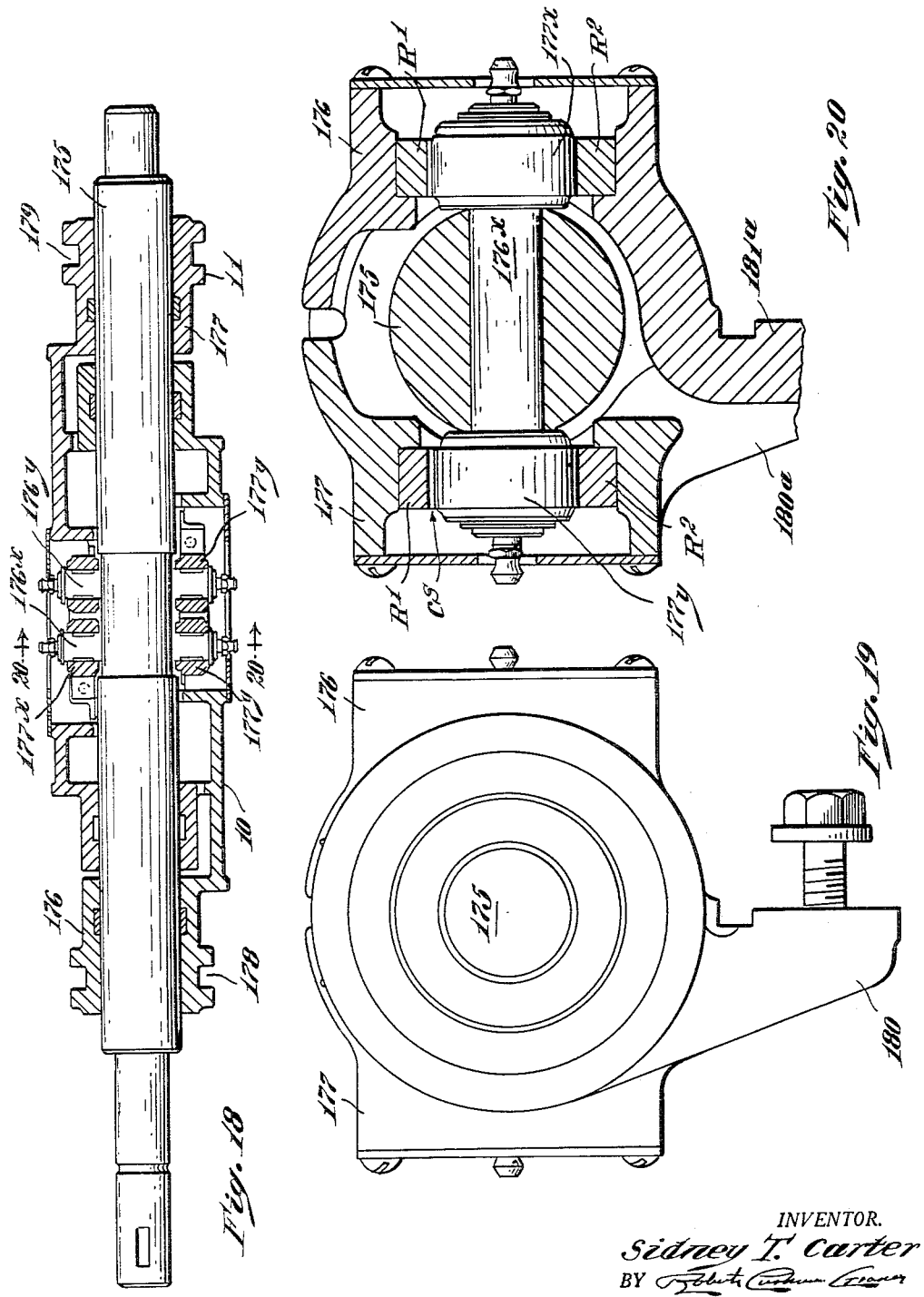

Inventor
Sidney T. Carter
by [signature]
Att'ys

June 14, 1960 S. T. CARTER 2,940,630
LABELING MACHINE
Filed Dec. 5, 1955 45 Sheets-Sheet 18
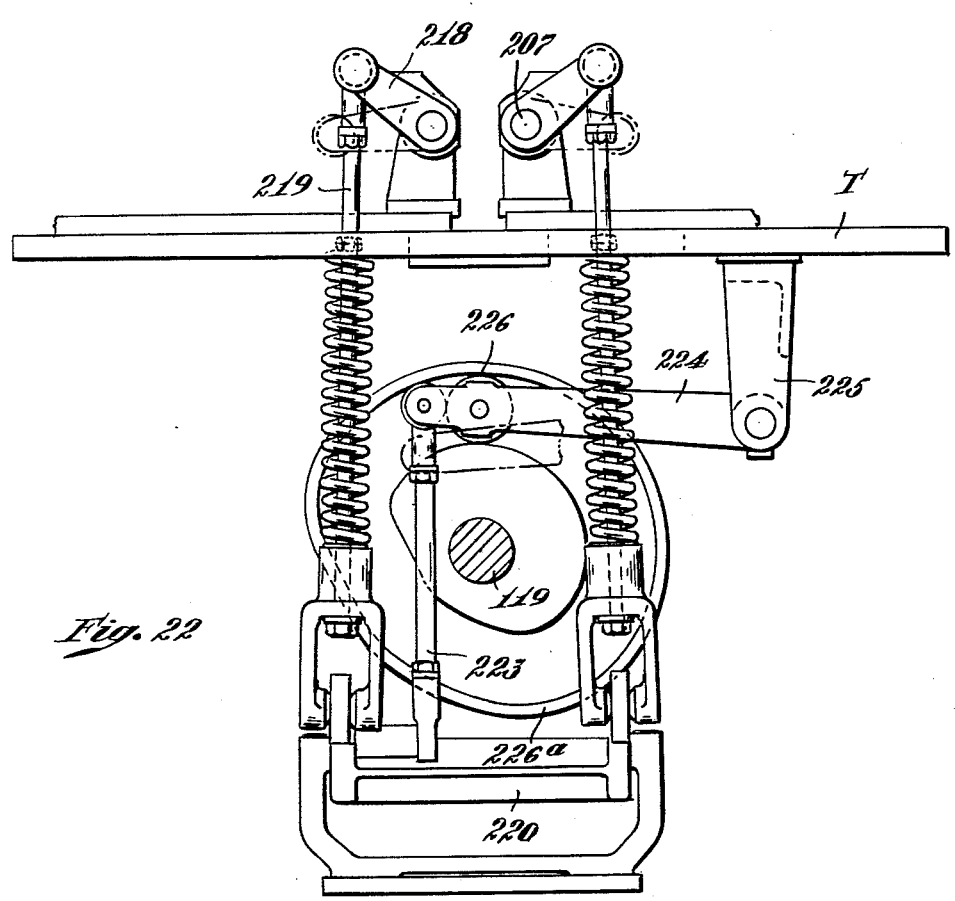
Fig. 22
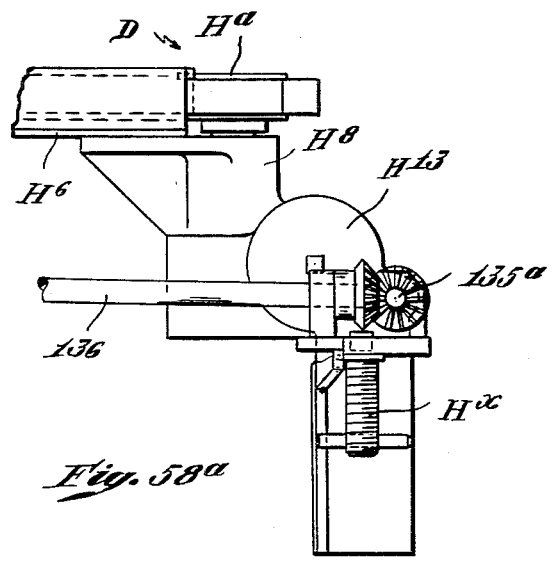
Fig. 58ª
INVENTOR.
Sidney T. Carter
BY
Att'ys June 14, 1960 S. T. CARTER 2,940,630
LABELING MACHINE
Filed Dec. 5, 1955 45 Sheets-Sheet 19
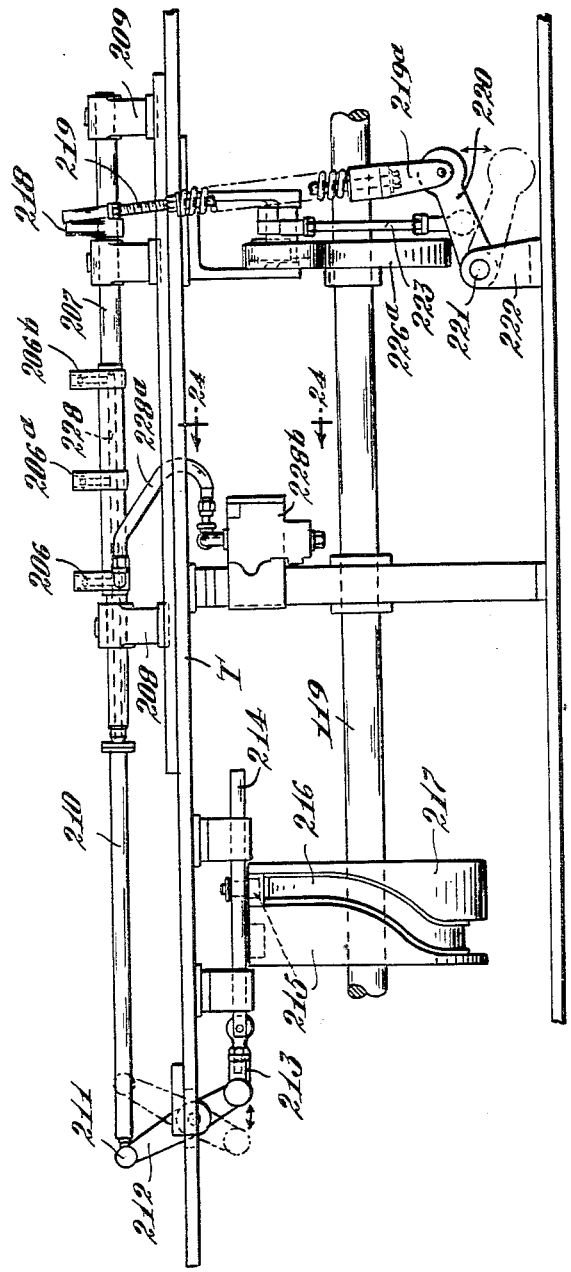
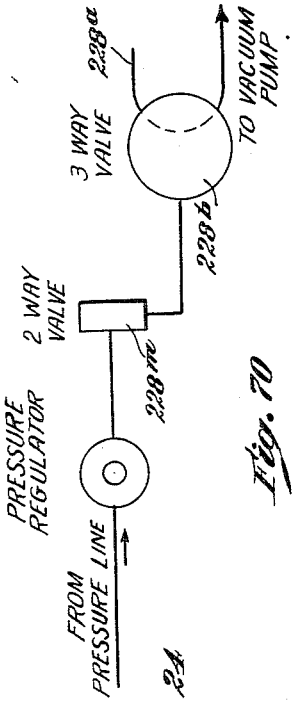
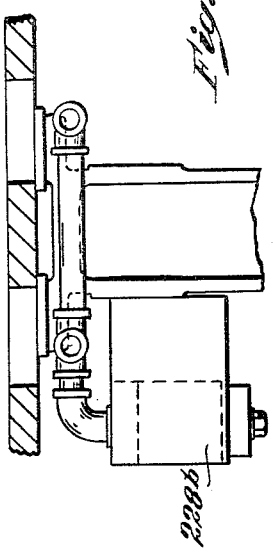
INVENTOR.
Sidney T. Carter
BY

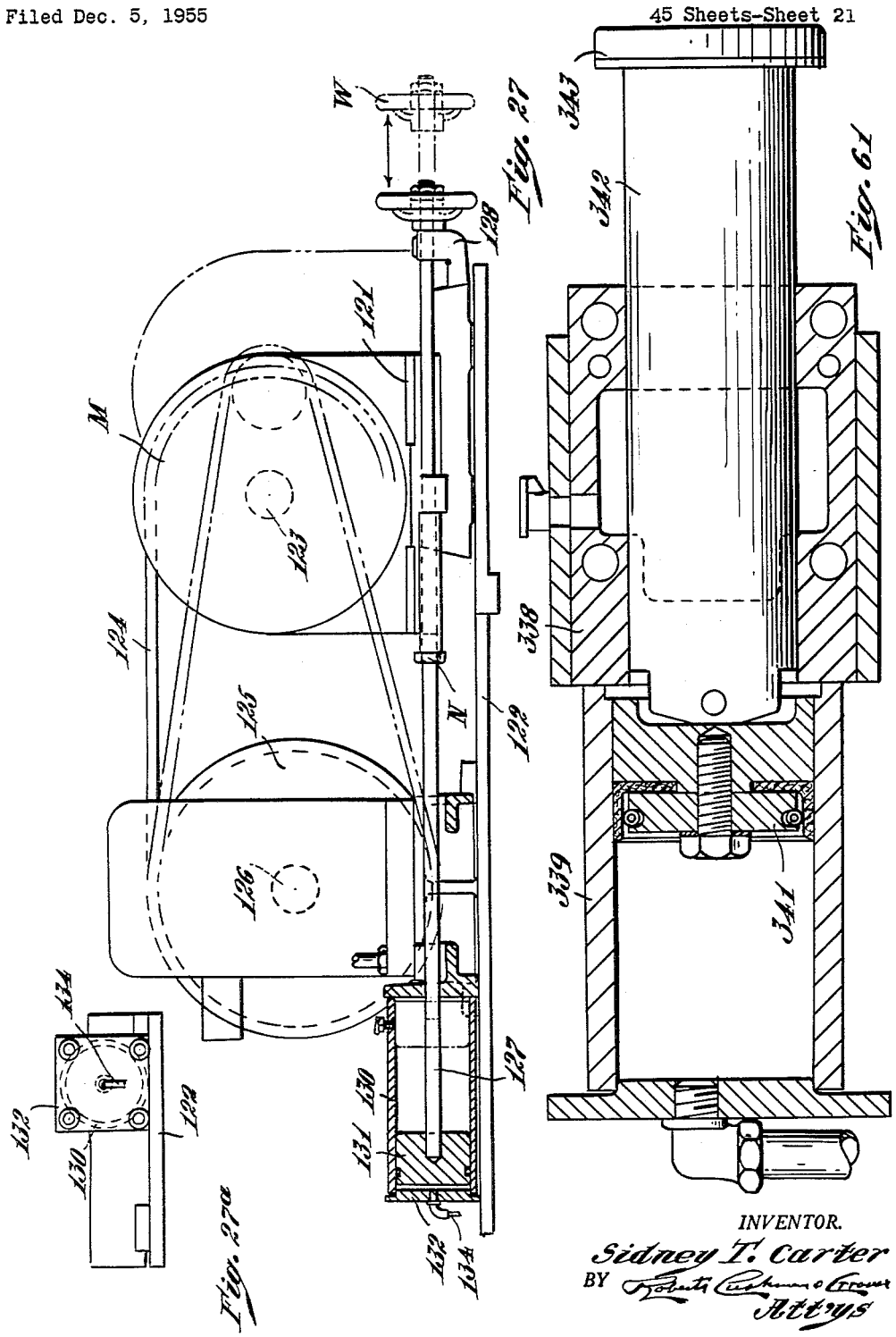

June 14, 1960 S. T. CARTER 2,940,630
LABELING MACHINE
Filed Dec. 5, 1955 45 Sheets-Sheet 22
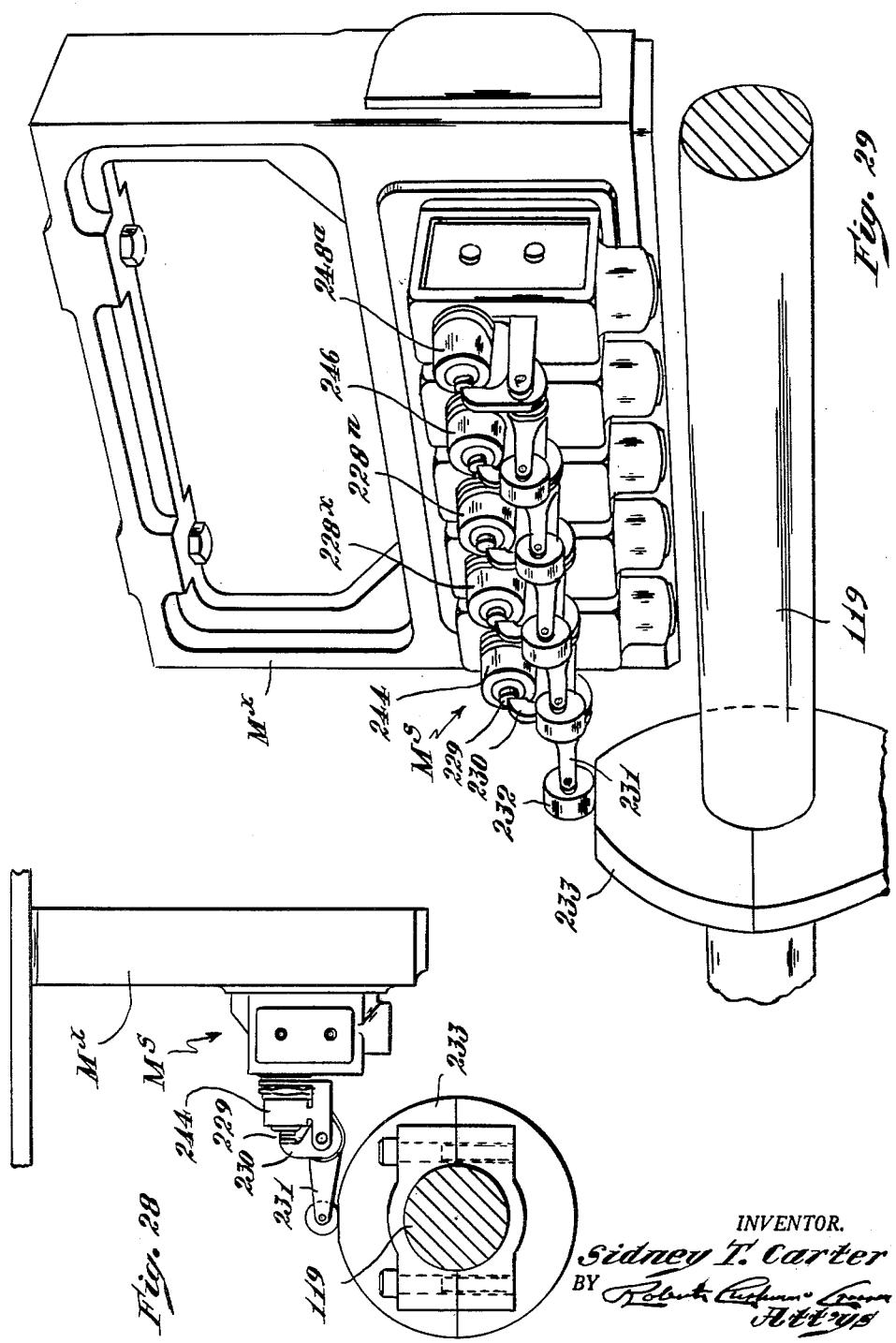
INVENTOR.
Sidney T. Carter
BY
Attys

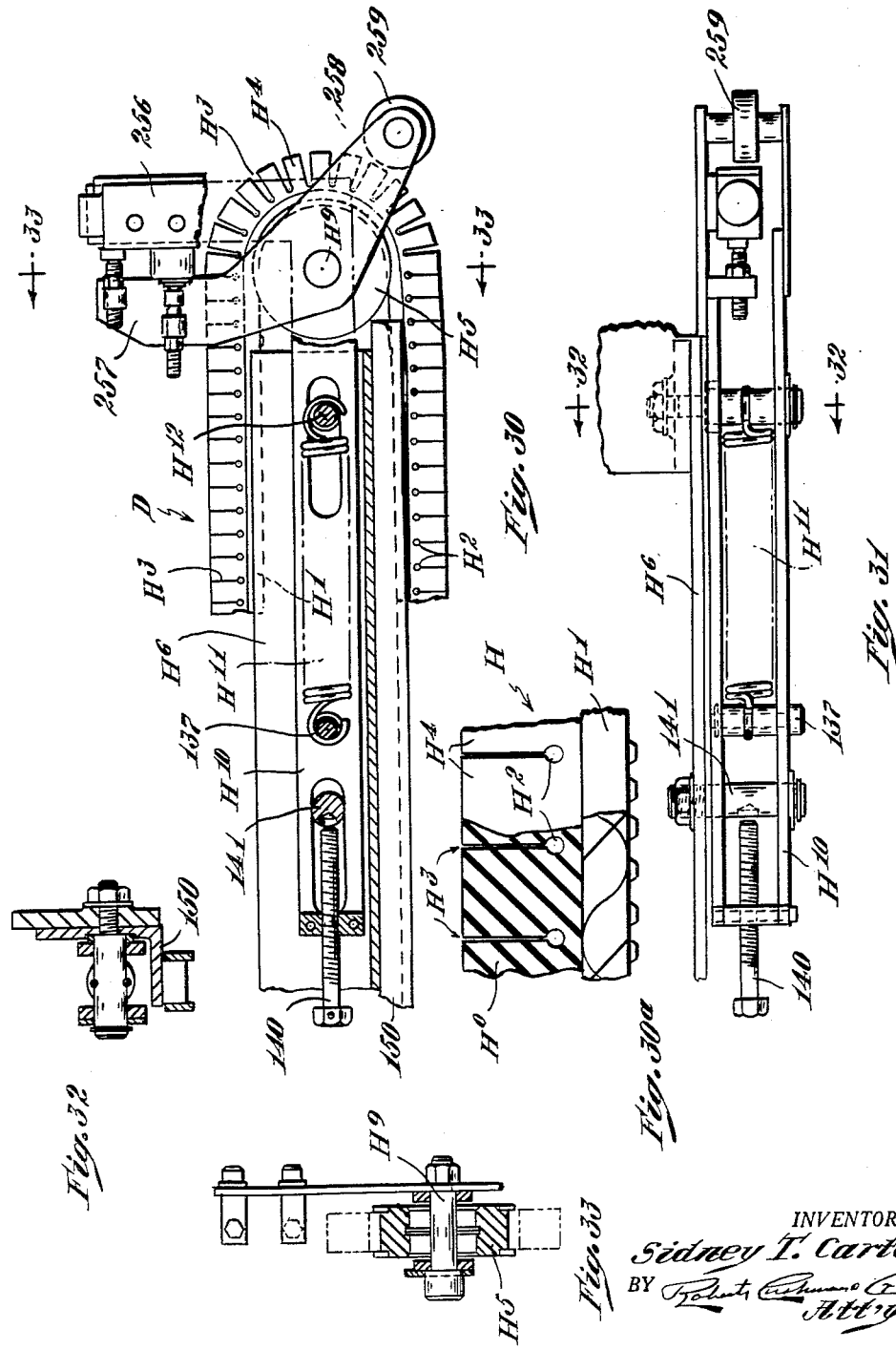

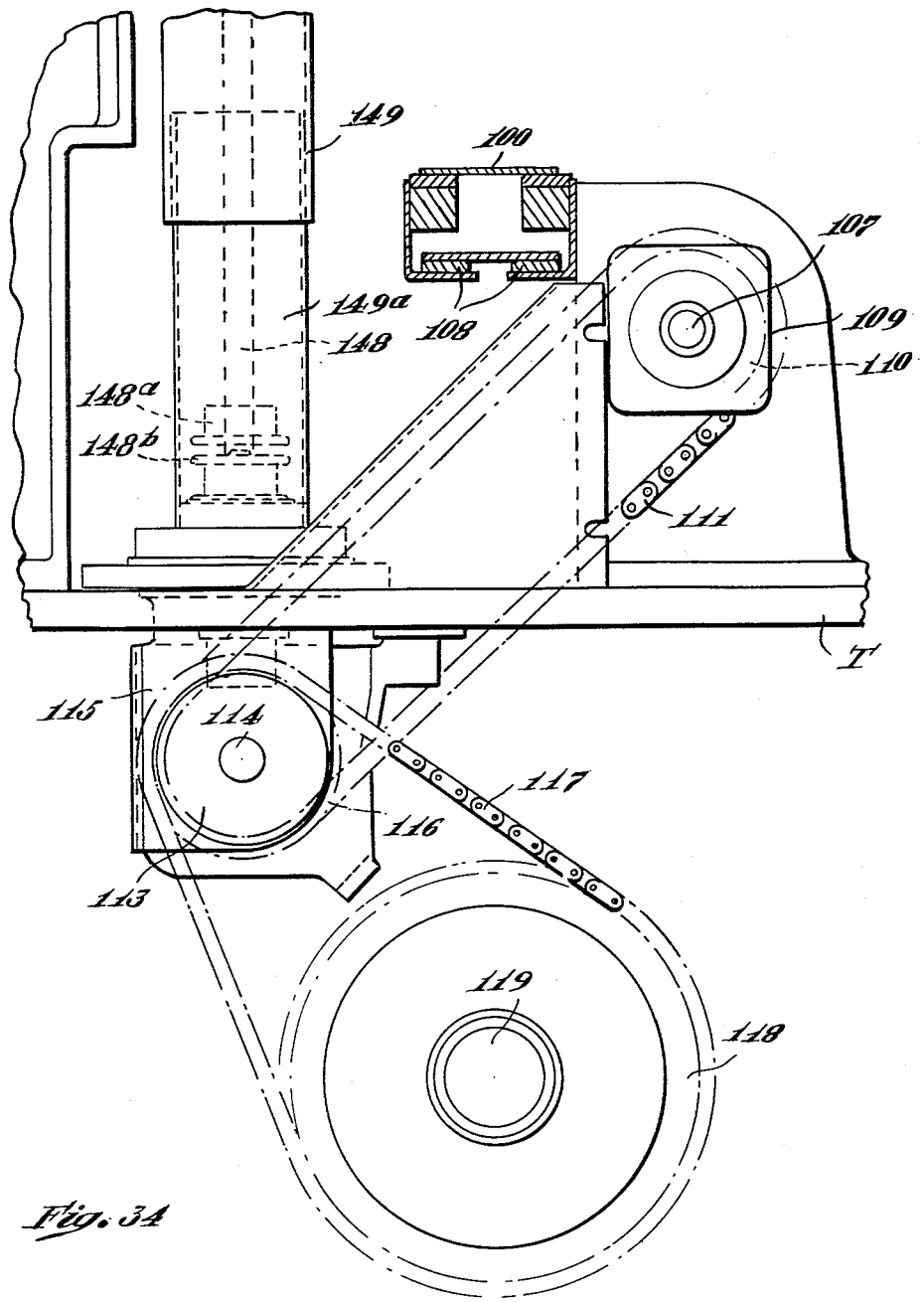

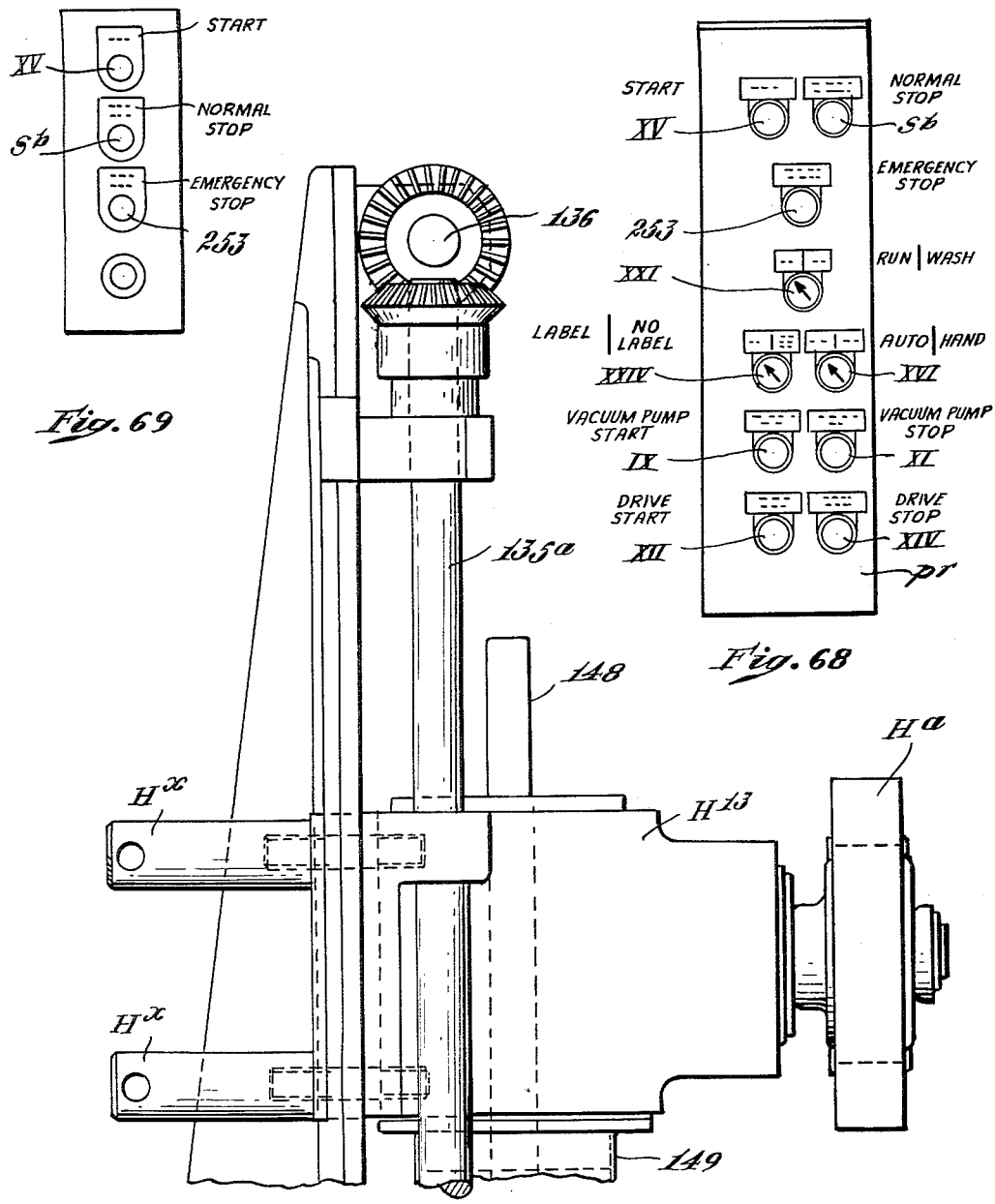

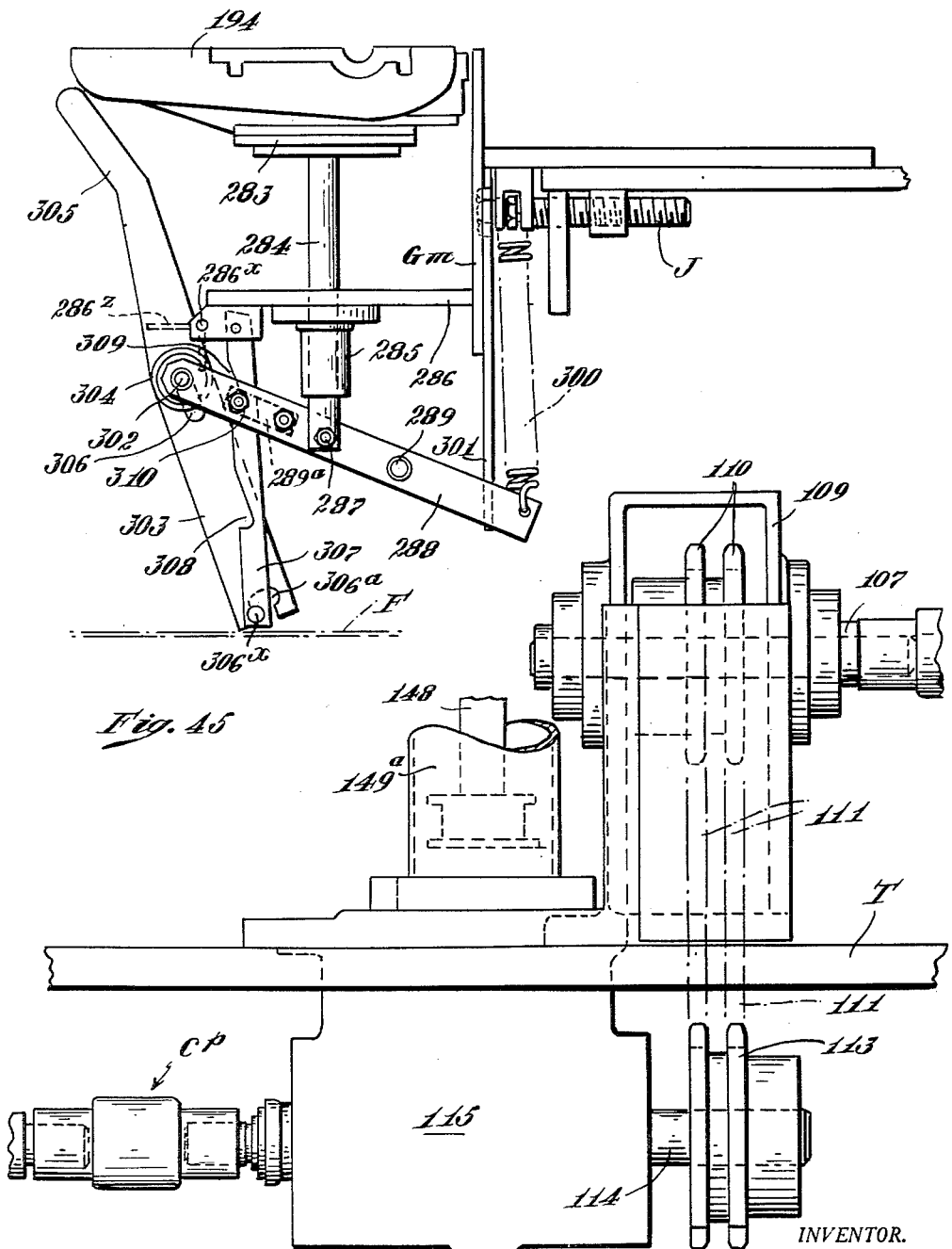

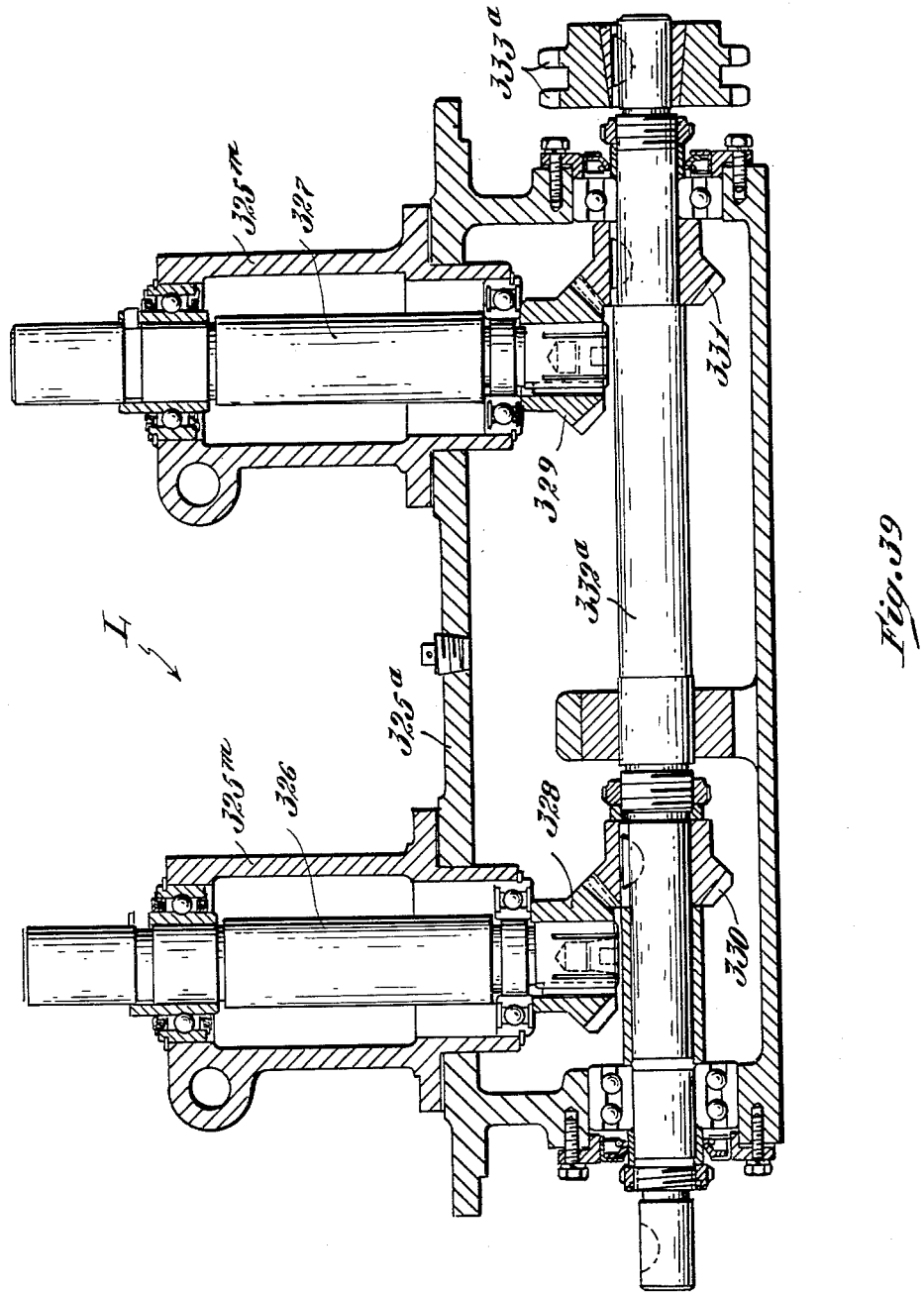

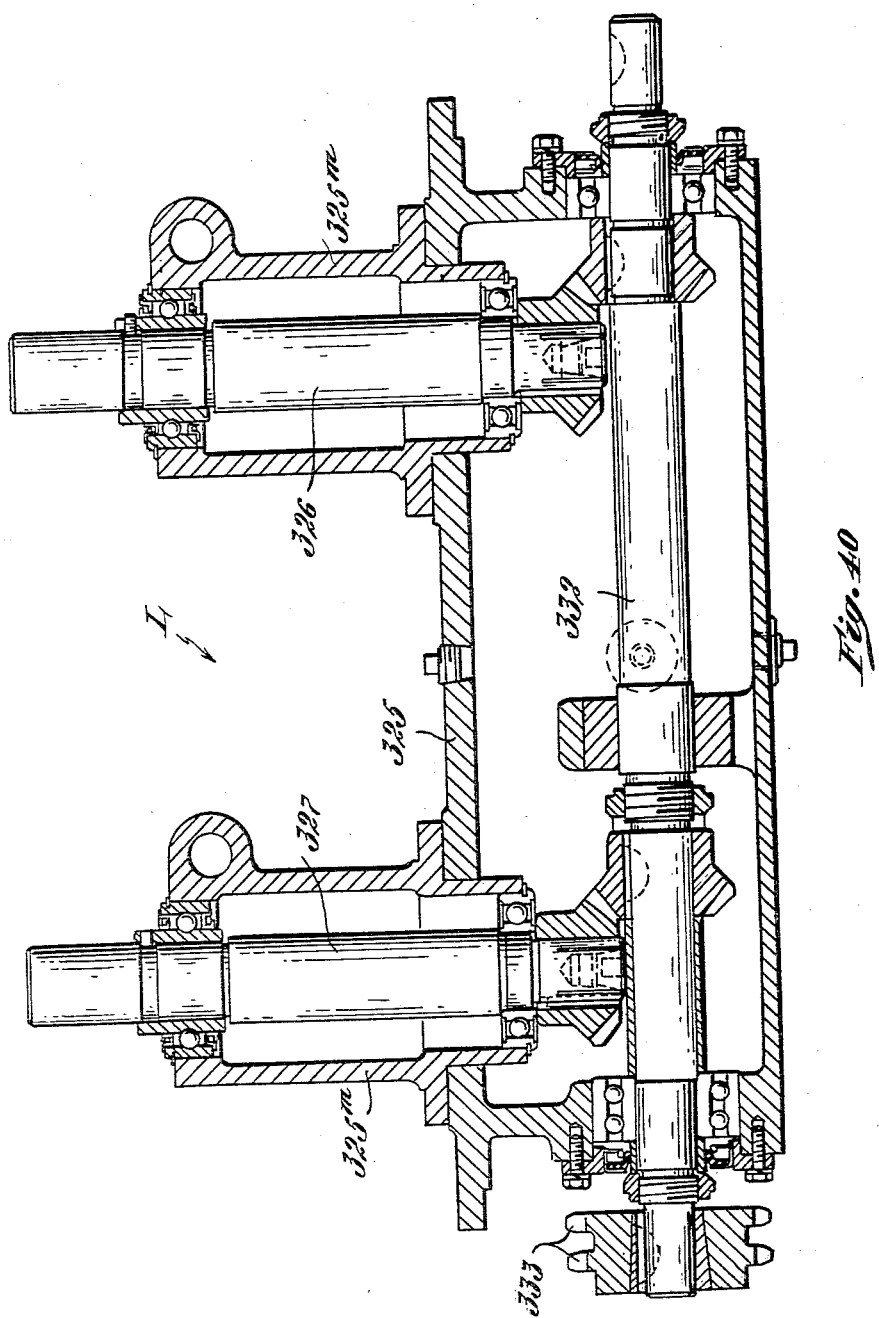

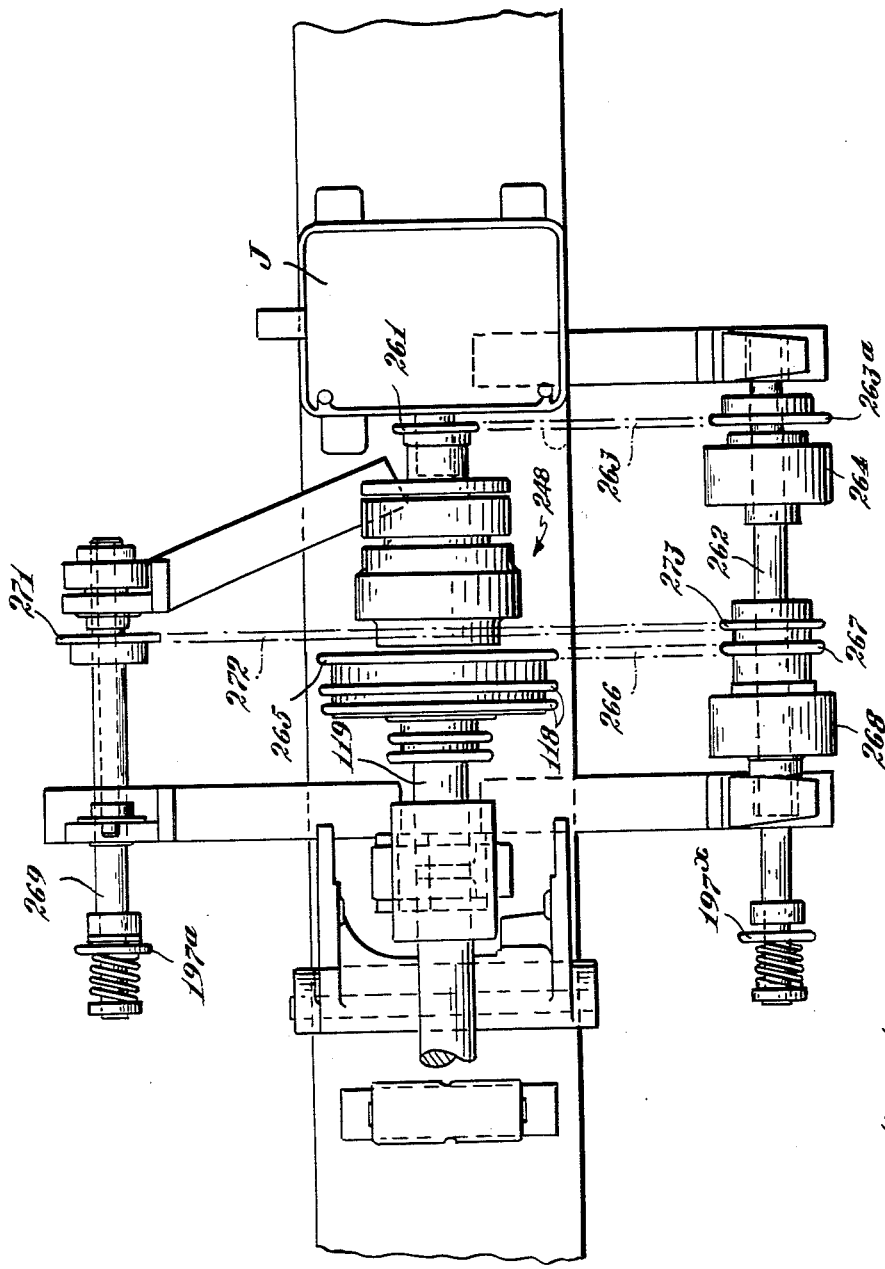

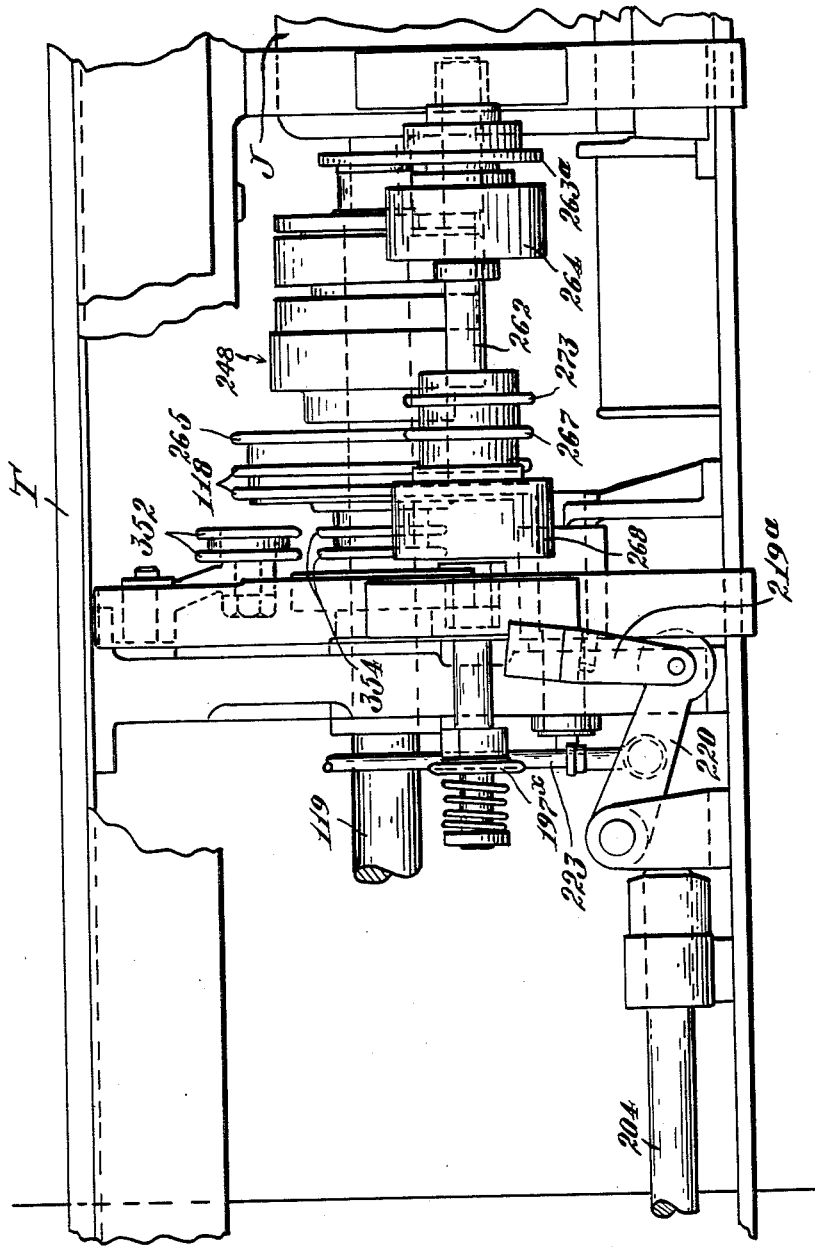

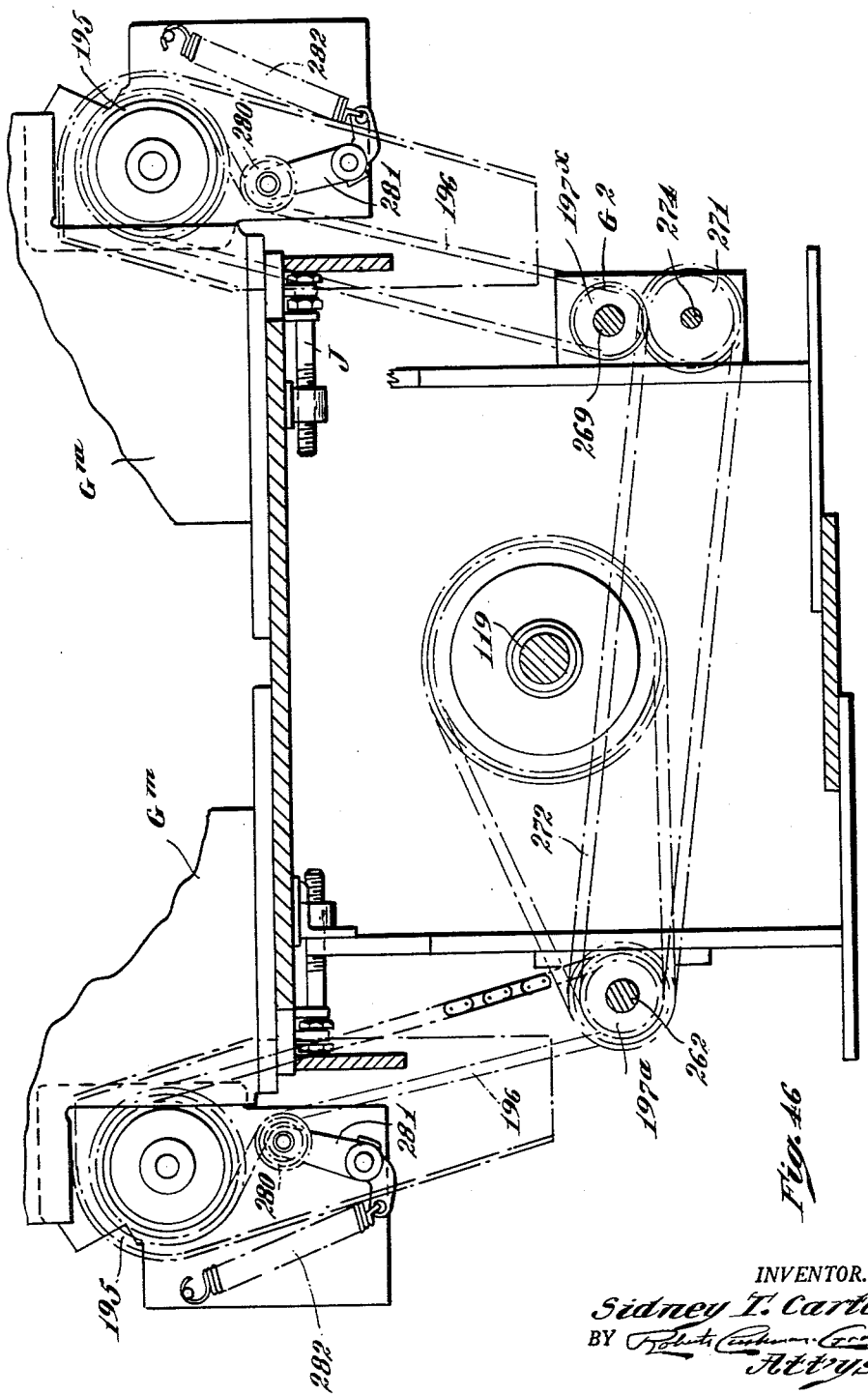

June 14, 1960 S. T. CARTER 2,940,630
LABELING MACHINE
Filed Dec. 5, 1955 45 Sheets-Sheet 35
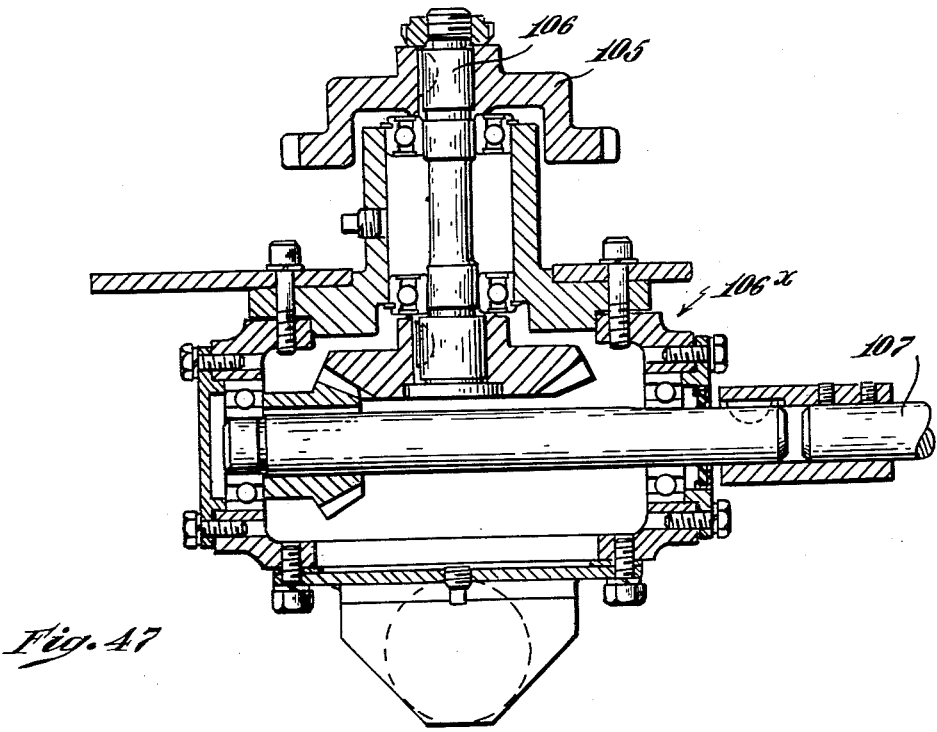
*Fig. 47*
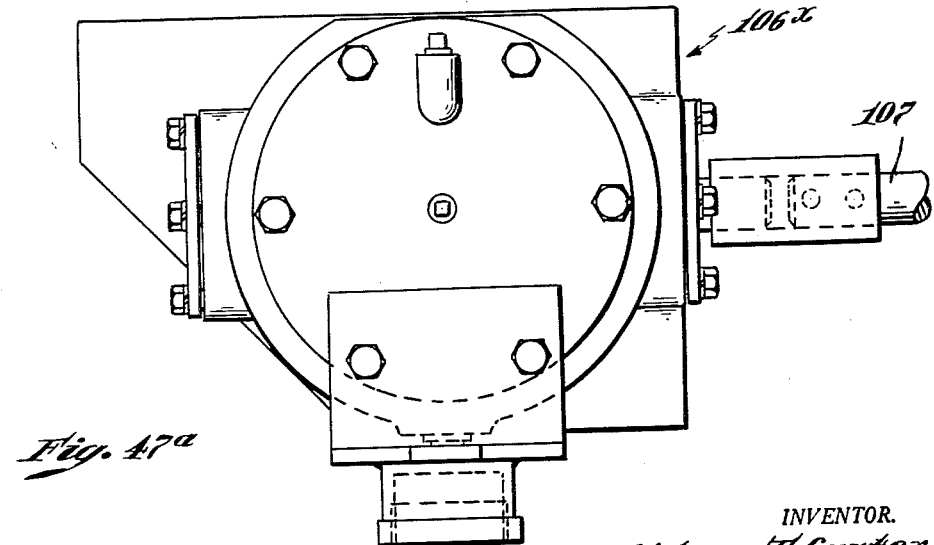
*Fig. 47ª*
INVENTOR.
Sidney T. Carter
BY
Attys June 14, 1960   S. T. CARTER   2,940,630
LABELING MACHINE
Filed Dec. 5, 1955   45 Sheets-Sheet 36

INVENTOR.
Sidney T. Carter
BY
Att'ys

INVENTOR.
Sidney T. Carter
BY
Attys

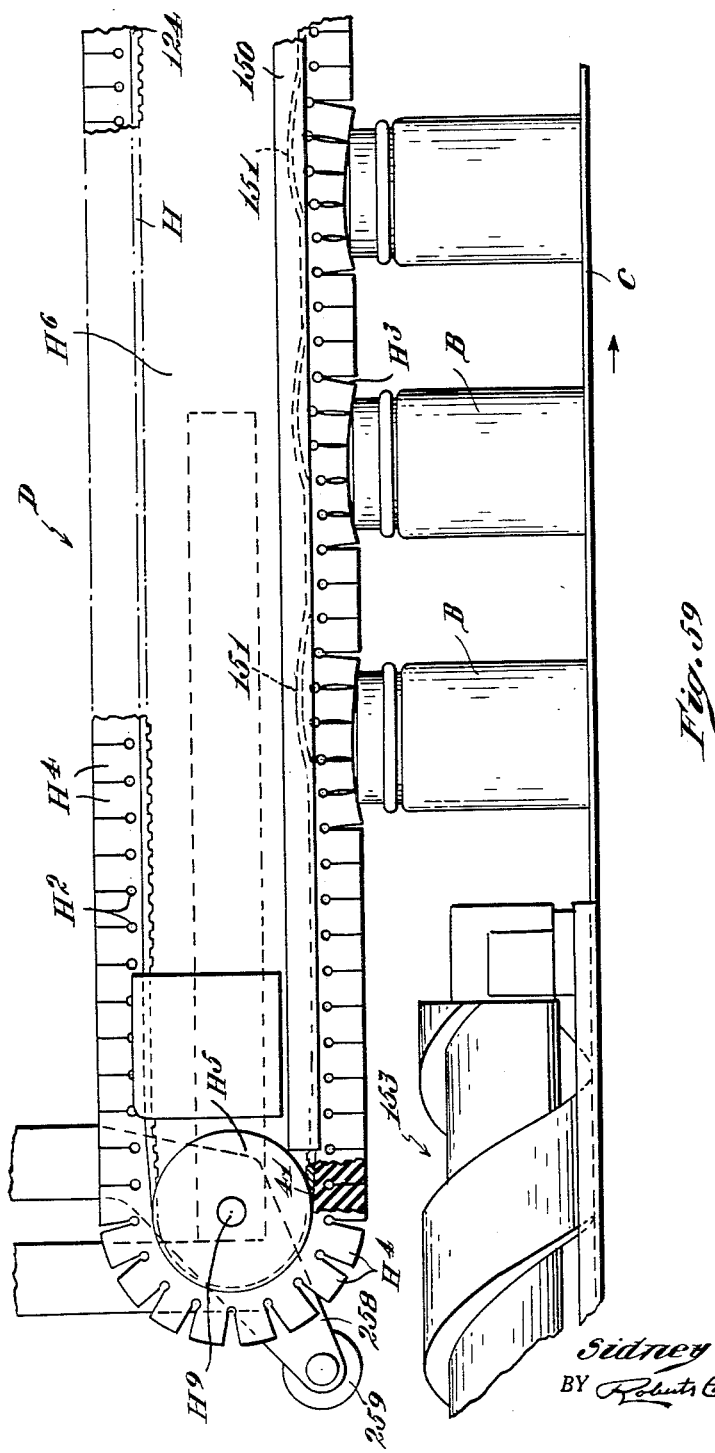

INVENTOR.
Sidney T. Carter

June 14, 1960  S. T. CARTER  2,940,630
LABELING MACHINE
Filed Dec. 5, 1955  45 Sheets-Sheet 45

Inventor
Sidney T. Carter
by
Att'ys

United States Patent Office 2,940,630
Patented June 14, 1960

2,940,630
LABELING MACHINE

Sidney T. Carter, Shrewsbury, Mass., assignor to Geo. J. Meyer Manufacturing Co., Cudahy, Wis., a corporation of Wisconsin Filed Dec. 5, 1955, Ser. No. 551,012

65 Claims. (Cl. 216—13)

This invention pertains to labeling machines of the continuous type in which articles to be labeled are moved in succession along a predetermined path and comprising means for applying one or more labels to each article while said article continues uninterruptedly to move along said path.

The present invention has for objects the provision, in a labeling machine of the continuous type, of means operative to affix a label to each passing article without interrupting or reducing the normal speed of advance of the article as it travels along a predetermined path; to orient the article, while the latter is moving, preparatory to the application of the label, so that the label will be properly located; to provide means operative to prevent approach of the picker to the magazine when no article will arrive at the label-receiving position at the proper time in the cycle to receive a label; to provide means for feeding the articles into the conveyor path so devised as to avoid subjecting the articles to damaging shock; to provide a constantly rotating helix or screw for feeding articles into said path and to provide such a feed screw which is of different pitch at its receiving and delivery ends; to provide hold-down means devised to apply resilient pressure to the top of the article while the latter is in motion along said path; to provide means for applying glue to a label picker, said means comprising a glue box and glue elevating roll, and means operative to turn said roll even though the other elements of the machine have stopped—the glue-applying means being so devised as to facilitate the cleaning of the glue-applying roll and associated parts at the end of a run; and to provide a machine of this type capable of operation at a speed substantially exceeding that of previous machines—for instance to label articles at the rate of three-hundred per minute. A further object is to provide a machine of the above type comprising a grip finger for adhering the label to the article while the latter is moving and which travels with the article for a predetermined distance along said path and then returns to receive another label from the picker; to provide a wiper which moves in a circular path and which while so moving approaches the article, then moves with the article along said path, and then recedes from the article and with means operative to vary the angular velocity of the wiper as it travels along said path so as to insure a suitable period of contact of the wiper with the article. A further object is to provide a machine of the above type wherein the articles are moved by a conveyor along said path and including means operative to drive the conveyor and to actuate the label-applying elements at a speed representing the maximum capacity of the machine, or alternatively at a definite predetermined lower speed, and including automatic means for shifting from one of said speeds to the other in accordance with the rate at which articles are supplied to the machine. A further object is to provide a machine of the above type operative to apply labels to a plurality of articles at the same time while the articles are moving—for example, to apply labels simultaneously to all of the articles forming a group consisting of a predetermined number of successive articles; and to provide a machine wherein the articles are progressed uninterruptedly along a rectilinear path, and comprising means whereby, during each successive cycle of operation, labels are applied simultaneously to each of the articles constituting each respective succession of groups of articles so progressed along said path; and to provide means operative to keep the machine running at the lower speed until articles are being delivered in such closely spaced relation as to constitute such a group of articles properly related for the simultaneous application of labels to each of the articles of the group.

Other and further objects and advantages of the invention will be pointed out in the following more detailed description and by reference to the accompanying drawings, wherein Fig. 1 is a diagrammatic front view of the entire machine, omitting substantially all details, but showing the relative locations of the various stations at which the steps in the labeling operation are performed;

Fig. 2 is a diagrammatic rear view, similar to Fig. 1;

Fig. 4 is a diagrammatic plan view of the machine;

Fig. 5 is a small scale diagrammatic front elevation showing certain of the parts, in particular the main drive shaft, in greater detail than in Fig. 1.

Fig. 6 is a fragmentary front elevation, to larger scale than Fig. 5, showing the left-hand or receiving portion of the article conveyor;

Fig. 7 is a fragmentary front elevation showing the mid-portion of the machine frame and the right-hand portion of the hold-down device;

Fig. 8 is a fragmentary front elevation showing the right-hand or delivery end of the article conveyor;

Fig. 18 is a diagrammatic horizontal section along the axis of the picker shaft;

Fig. 19 is an end elevation of the picker shaft;

Fig. 20 is a section on the line 20—20 of Fig. 18;

Fig. 22 is an end elevation showing the means for rocking the grip fingers;

Fig. 23 is a fragmentary front elevation showing the mechanism whereby the grip fingers are moved longitudinally of the article path;

Fig. 24 is a fragmentary view illustrating the solenoid valve for controlling suction and pressure at the gripper fingers;

Fig. 26 is a diagrammatic front elevation showing the main drive shaft and some of the cams mounted thereon;

Fig. 27 is a diagrammatic front elevation, partly in vertical section, showing the mechanism for varying the speed of the main shaft;

Fig. 27a is an end view to smaller scale of the air cylinder of Fig. 27;

Fig. 28 is a transverse section through the main shaft substantially on the line 28—28 of Fig. 26, showing one of the switches and the cam for actuating it;

Fig. 29 is a perspective view showing a series of switches including that shown in Fig. 28, the cam for actuating one of them being rotatably adjustable on the shaft for proper timing;

Fig. 30 is a fragmentary rear elevation showing the receiving end of the top-grip or hold-down device and the means for keeping it taut;

Fig. 30a is a fragmentary section to larger scale illustrating the construction of the hold-down device;

Fig. 31 is a plan view of the parts shown in Fig. 30, but omitting the belt;

Fig. 32 is a fragmentary section substantially on the line 32—32 of Fig. 31;

Fig. 33 is a fragmentary section on the line 33—33 of Fig. 30, but omitting the belt;

Fig. 34 is a fragmentary elevation, partly in vertical section, looking from the right-hand end of the machine, showing the lower part of the drive mechanism for the conveyor and for the hold-down device;

Fig. 34a is a fragmentary elevation, looking from the right-hand end of the machine, showing the upper portion of the drive means illustrated in Fig. 34;

Fig. 35 is a fragmentary front elevation of parts shown in Fig. 34;

Fig. 39 is a vertical section showing the wiper gear box assembly for the right-hand side of the machine;

Fig. 40 is a view similar to Fig. 39, but showing the wiper gear box for the left-hand side of the machine;

Fig. 41 is a plan view showing the drive for the gum rolls;

Fig. 42 is a front elevation of the parts shown in Fig. 41;

Fig. 45 is a fragmentary transverse section showing means for raising and lowering the gum box;

Fig. 46 is an end elevation, partly in vertical section, showing the drive for the gum rolls at opposite sides of the machine;

Fig. 47 is a fragmentary horizontal section through a gear box which houses the gearing for driving the article conveyor;

Fig. 47a is a rear elevation of the gear box shown in Fig. 47;

Fig. 49 is a vertical transverse section, partly in elevation, showing the secondary spotting device approaching an article as the latter is moved along by the conveyor and showing the concomitant position of the grip finger;

Fig. 50 is a view similar to Fig. 49, but showing the spotting device in actual contact with the article and showing the grip fingers in readiness to contact the article;

Fig. 58a is a view similar to Fig. 58, but showing the other end of the hold-down device;

Fig. 59 is a fragmentary elevation showing the receiving end of the hold-down device and the means whereby the pressure of the hold-down device is relieved at the places where the articles are oriented;

Fig. 61 is a section substantally along the line 61—61 of Fig. 60, but to larger scale;

Fig. 68 is a front elevation of the main control panel;

Fig. 69 is a front elevation of the push-button panel at the receiving end of the machine, and Fig. 70 is a diagram illustrating the means for establishing pressure or vacuum at the grip fingers.

Figure 3:
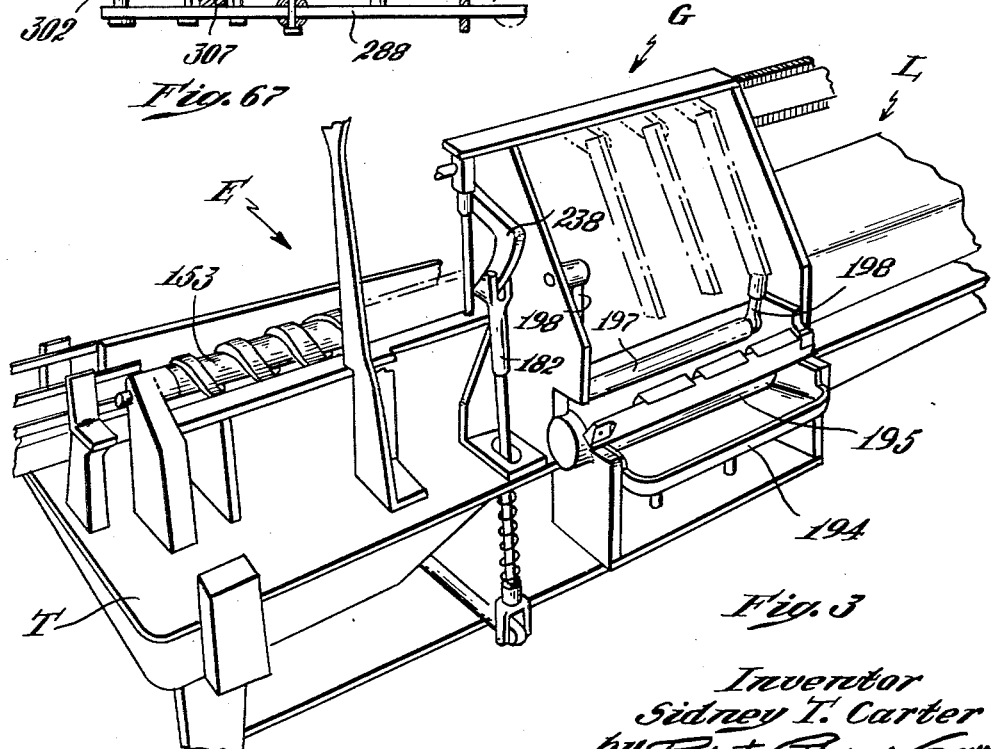
Fig. 3 is a fragmentary perspective view of the same general type as Fig. 1, but to larger scale, looking toward the left forward corner of the machine.

The general appearance of the machine in its commercial form is shown in the photolithographs of Figs. 1, 2 and 3. The operative elements of the machine are supported by a suitable frame whose design is well within the province of the skilled machine builder so that details of the frame need not be described herein except when referred to incidentally in describing individual parts of the operative structure. The frame supports a horizontal table T beneath which the motor M, main drive shaft 119 and most of the motion transmitting connections are located. The drive shaft 119 turns through an angle of 360° for each cycle of operations—that is to say, during that sequence of motions of the essential label-applying devices which includes the application of glue to a picker; removal of a label from a magazine by a picker; the adhering of the label to the article; the wiping of the label by the first set of wipers; and the return of the picker to its initial position. However, the completion of the wiping, by the second set of wipers, occurs during the succeeding cycle.

may apply pressure to the articles while they are moving through the labeling zone.

This hold-down device D (Figs. 7, 30–33, 37, 58 and 58a) comprises an endless belt H having a horizontal run which overlies the article path as defined by the conveyor C, the belt H being driven at the same linear speed as the conveyor C.

The belt H comprises a flexible base portion H' (Fig. 30a) for example of canvas or rubberized fabric. A so-called "Gilmer Timer Belt" which has teeth moulded on its inner surface to provide positive drive similar to that of a sprocket chain has been found very desirable for the purpose. To the outer surface of this flexible base (that is to say, the side opposite the toothed surface of the Gilmer-type belt) there is attached a layer $H^0$ of soft rubber, for example, one inch in thickness, this rubber providing a resiliently yieldable cushion for contact with the tops of the articles to be labeled. In order that this thick belt may have the requisite flexibility to enable it to move freely about the supporting and guiding pulleys the rubber layer is provided at regular intervals, for example, at a distance of ¾" apart with a series of holes $H^2$ (Fig. 30a) extending transversely through the thickness of the rubber layer. A slit $H^3$ extends inwardly from the outer surface of the rubber layer to each of these holes $H^2$. These slits thus divide the rubber layer into substantially rectangular blocks $H^4$.

Figure 58:
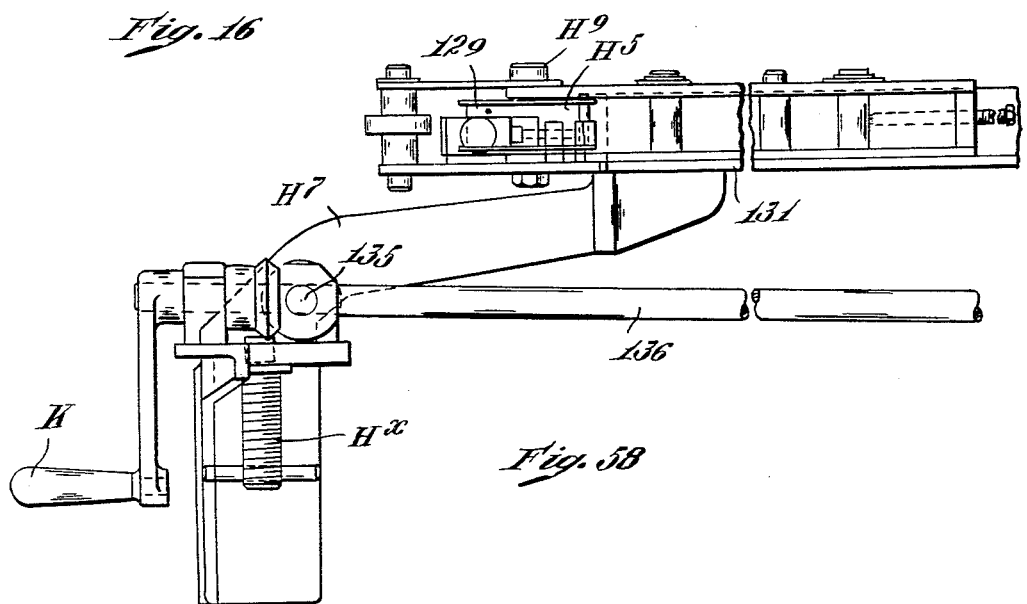
Fig. 58 is a fragmentary plan view showing one end of the hold-down device and means for adjusting its elevation.
Figures 17, 17A:
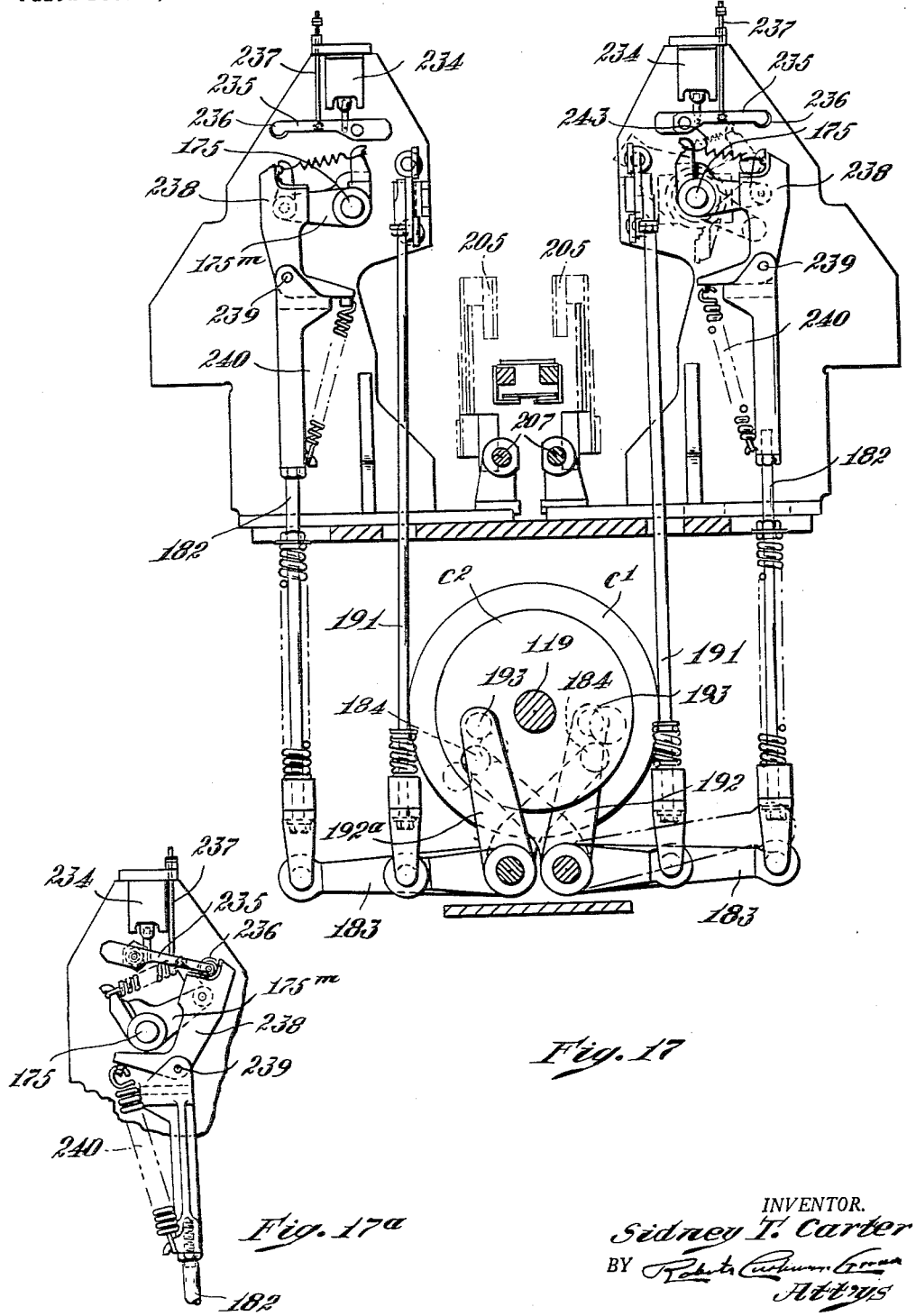
Fig. 17 is an end elevation, omitting parts, showing the means for actuating the pickers.
Fig. 17a is a fragmentary view similar to Fig. 17, but showing the picker actuating parts in a different relative position.
Figure 21:
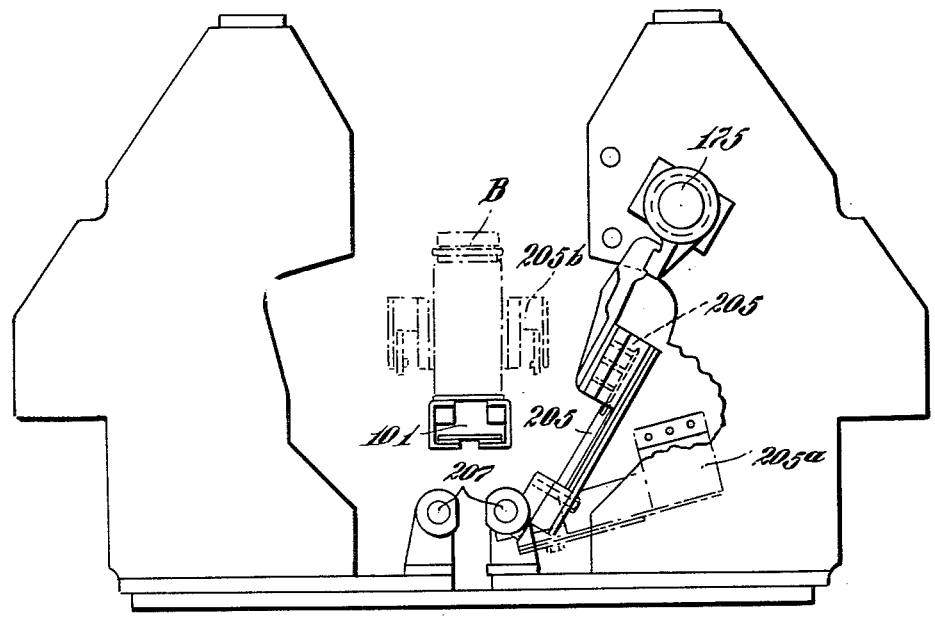
Fig. 21 is a diagrammatic end elevation, omitting parts, showing the picker and grip finger at one side of the machine in transfer relation.
Figure 60:
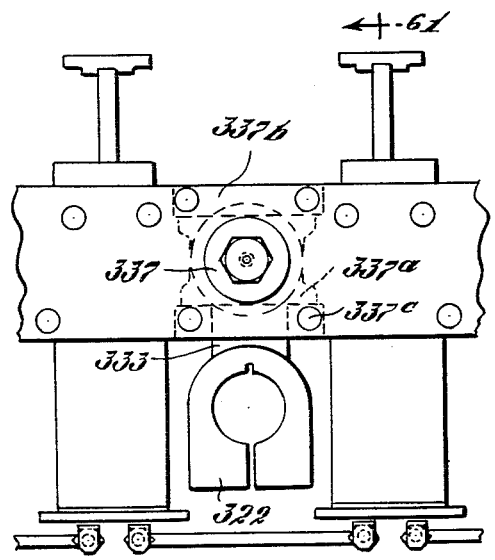
Fig. 60 is a fragmentary plan view of the wiper carriage.
Figure 37:
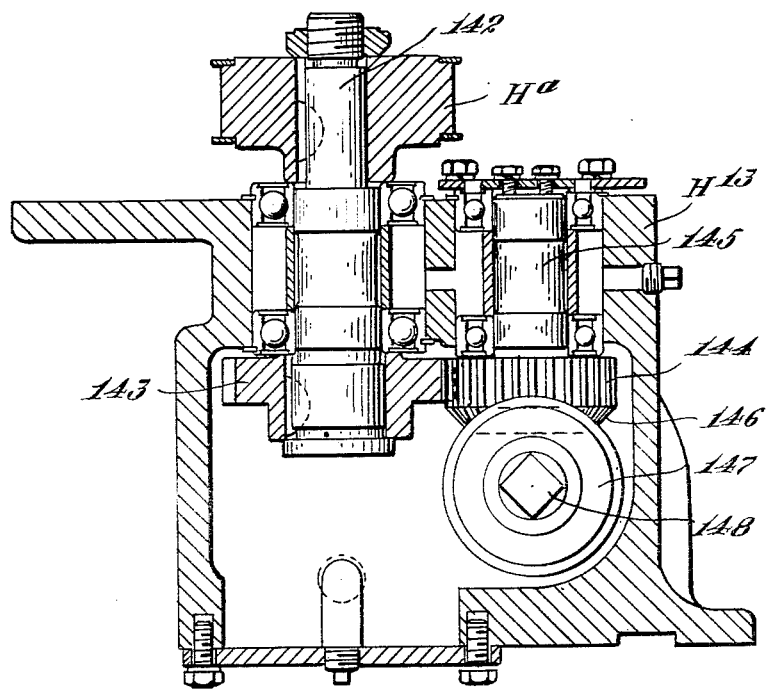
Fig. 37 is a horizontal section showing the gear box through which the hold-down device is driven.
Figure 38:
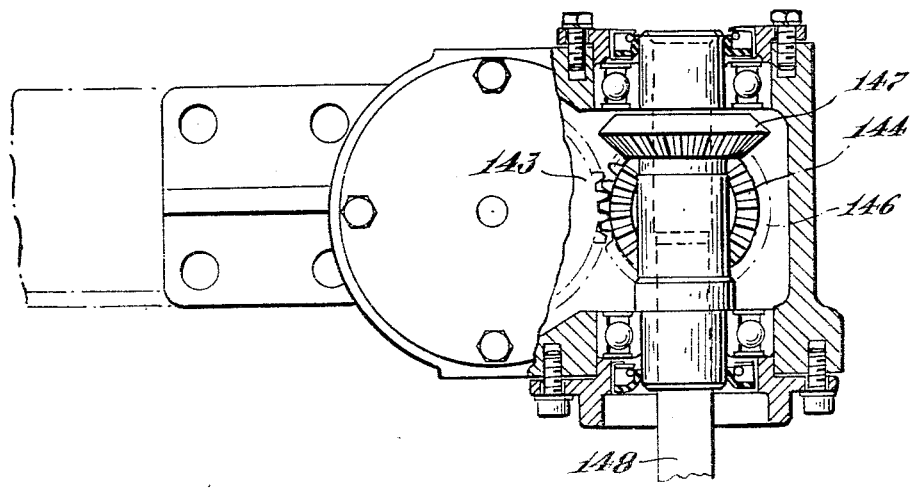
Fig. 38 is a rear elevation, partly in vertical section, of the gear box of Fig. 37.

At its left-hand end, which is adjacent to the point at which the articles are delivered by the feeding means into the receiving end of the article path the belt H passes about a guide pulley $H^5$ (Figs. 30 and 58), and at its right-hand end, which is located beyond the labeling station G, in the direction of travel of the article, the belt H passes about a drive pulley $H^a$ (Figs. 7, 58a and 37).

An elongate rigid frame $H^6$ is supported at its opposite ends by brackets $H^7$ and $H^8$ respectively (Figs. 58 and 58a) which are vertically adjustable by means of parallel, rotatable, screw-threaded shafts 135 and 135a respectively. These shafts are provided with gears which mesh with gears fixed to a rotary shaft 136 having a crank handle K at one end. By turning this crank the frame may be adjusted vertically while remaining horizontal in all positions of adjustment. Suitable clamping means $H^x$ (Figs. 7, 58 and 58a) is provided for securely holding the frame in adjusted position. At its left-hand end (Fig. 59) this frame $H^6$ supports bearings for the shaft $H^9$ on which the guide pulley $H^5$ is mounted. Desirably this shaft $H^9$ is supported by a part $H^{10}$ (Fig. 30) which telescopes relatively to the frame $H^6$, this telescoping part being urged by the spring $H^{11}$ in a direction such as to keep the belt taut. One end of the spring $H^{11}$ is connected to a pin $H^{12}$ fixed to the main part of the frame $H^6$, while the other end of the spring is attached to a pin 137 secured to the telescoping part $H^{10}$ of the frame. This telescoping part $H^{10}$ is provided with a screw-threaded opening which receives a long adjusting screw 140 whose inner end is engageable with a stop member 141 secured to the frame $H^6$. If at any time it be necessary to remove the belt, the screw 140 may be advanced into contact with the stop 141, and by continued rotation the telescopic part $H^{10}$ of the frame can be moved to the left, as viewed in Fig. 30, thus decreasing the effective length of the belt.

The drive pulley $H^a$ for the belt is keyed to a shaft 142 (Fig. 37) which turns in bearings in a gear box $H^{13}$ which is attached to the movable frame $H^6$ and which moves up and down with the frame $H^6$. Within the gear box the shaft 142 carries a spur gear 143 which meshes with a spur gear 144 on a shaft 145, also journaled in the box $H^{13}$, and which carries a beveled gear 146 which meshes with a beveled gear 147 having a square bore which provides a sliding fit between the gear and a vertical square shaft 148. This shaft 148 (Fig. 34) has a coupling element 148a at its lower end which engages a complementary coupling element 148b (Fig. 36) fixed to the upper end of a vertical shaft 115a journaled in gear box 115 and which is driven by intermeshing bevel gears from shaft 114. Thus the hold-down device D is positively driven in accurate, timed relation to the conveyor chain. The shaft 148 passes through a telescopic housing comprising upper and lower parts 149 and 149a attached respectively to the gear box $H^{13}$ and to the table T.

The frame $H^6$ carries a horizontal, rigid guide shoe 150 (Figs. 30 and 59) for the lower run of the belt H so that the lower surfaces of the blocks $H^4$, constituting the effective portion of the lower run of the belt, are disposed in a horizontal plane parallel to the article-supporting surface of the conveyor C.

As hereafter described, it may become necessary to orient the articles slightly as they leave the feed screw, and in order to permit such orientation, the undersurface of the guide shoe 150 is provided with clearance spaces 151 (Fig. 59), in number corresponding to the number of articles which receive labels at the same time. These clearance spaces relieve the pressure on the tops of the articles sufficiently to permit them to be oriented to the required amount.

At the entrance end E of the machine, the articles supplied by the conveyor S' are engaged by a rotating feed screw or helix 153 (Figs. 4, 5, 10 and 11) located at one side of the article path. This feed screw has journal portions at its opposite ends which turn in bearing boxes 154 and 155 respectively, (Fig. 10) carried by the frame. The bearing box 154 is carried by a casing 154a shaped to provide a housing for a sprocket wheel (not shown) fixed to the screw shaft, and which is engaged by a sprocket chain which passes down through an opening in the machine table and which embraces a sprocket wheel fixed to the main shaft 119 so that the screw 153 is constrained to turn in accurately timed relation to the conveyor and to the hold-down device. The gearing through which the feed screw is driven is so designed that the feed screw makes three revolutions for each cycle of the machine, that is to say, for each revolution of the main shaft.

The machine as here illustrated is designed to apply labels to three bottles at the same time, but if the machine be so altered as to apply two labels at the same time instead of three (which is contemplated as within the scope of the invention), then the feed screw will be so driven as to make two complete revolutions for each cycle of the machine instead of three. The machine as here illustrated is designed to place labels on bottles which are spaced apart on the conveyor a distance of five and one-half inches, and the speed of the conveyor is such as to carry three-hundred bottles through the labeling station per minute when running at full capacity. If the bottles were to be fed into the conveyor path at random at this speed, difficulty might be experienced if a bottle did not enter the helical groove in the feed screw at exactly the right time. To permit the bottle to move laterally away from the screw under such circumstances, a gate 156 (Fig. 10) is provided at the opposite side of the conveyor path from the screw, this gate being hinged at 156x and normally held yieldingly in parallel relation to the conveyor path by means of a spring 157 which embraces a rigid guide bar 158 secured at its inner end to the gate 156 and which passes out through an opening in fixed guide member 158a.

Figure 9:
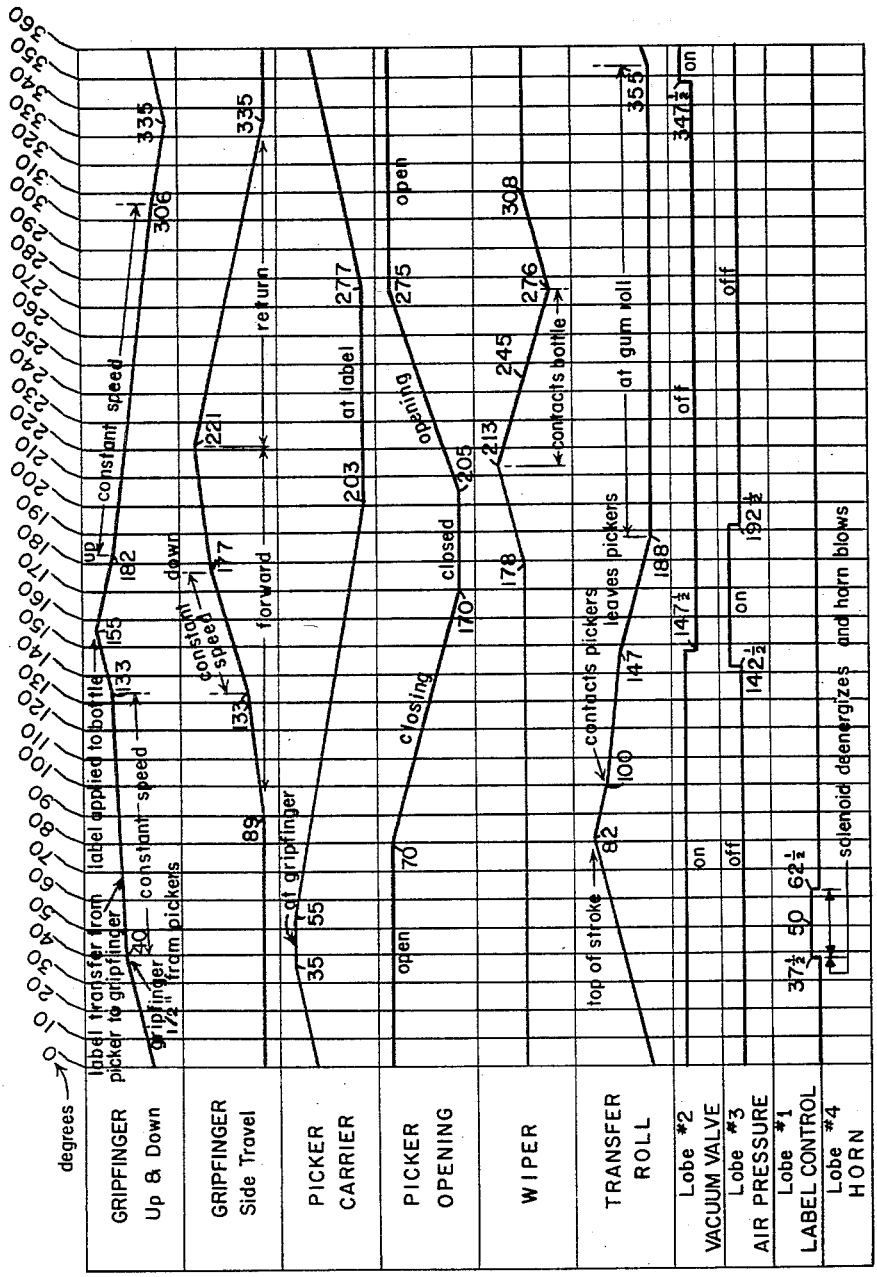
Fig. 9 is a timing chart showing the relation of the several essential elements of the machine when referred to a single cycle of the main shaft.

As just above referred to, the machine is designed to run at very high speed under optimum conditions, that is to say, a speed such that three-hundred bottles will pass through the labeling station per minute. However, under practical working conditions it may happen that the machines which precede the labeling machine may not always be able to supply bottles uninterruptedly at this rate, and to avoid certain undesirable consequences of Fig. 9 is a timing chart showing the exact point (in degrees of rotation of the main shaft 119) at which the several essential operations commence and terminate. Gears and appropriate cams, turning in time with the shaft 119, actuate the essential parts involved in the application of a label to the article being labeled. It is well within the province of the skilled machine designer, by reference to this chart, to design cams of proper contour and gear connections of the proper ratio to actuate said essential elements for applying the label in the proper sequence, and for this reason, and to avoid undue complexity of description and drawings, specific illustration and description of many of these cams and gear connections including chain drives has been omitted.

The machine is designed to receive articles to be labeled (hereinafter referred to for convenience, but not by way of limitation, as "bottles") from a suitable supply and to deliver them, after the labels have been applied, to a conveyor or stack or any other suitable receiver. Usually the machine will be interposed between (that is to say, arranged in series with) other machines, for instance, between a bottle capping machine which constitutes the supply and a packaging machine which constitutes the receiver. Since the supply, at times, may fail to deliver articles as fast as the labeling machine can handle them, and since the receiver may not at times be able to care for all of the articles delivered by the labeler (when the latter is run at maximum speed), provision is made, in accordance with the present invention, for automatically varying the speed of the labeling machine or stopping it to coordinate its operation with the other machines with which it is associated.

As diagrammatically illustrated in Figs. 4 and 5, the articles are supplied to the machine by a conveyor S, which as illustrated is laterally offset from the center line A—A' of the article path. Such offset arrangement, whether to the right or left of the article path, is sometimes desirable, for example to conserve space, but the supply conveyor may be aligned with the article path if desired. As here illustrated, the articles, after receiving their labels, are discharged onto a receiving conveyor R which is also here shown as laterally offset from the center line A—A' of the article path, but this receiving conveyor may be aligned with the article path if preferred. From the supply conveyor S the articles are diverted into the article path of the labeling machine by properly arranged guides S' and from the article path of the labeling machine the articles are diverted to the receiving conveyor R by properly arranged guides R'.

The entrance portion of the article path is indicated at E (Fig. 4); the gumming and label-applying station is indicated at G; and the wiping station at L.

For moving the articles along in the article path there is provided an endless conveyor C comprising a link chain 100 (Figs. 5, 6 and 8), each link of which is provided with a flat plate 101. These plates, in the upper horizontal run of the conveyor, collectively provide a support on which the articles B (Fig. 59) rest as they are moved along the article or conveyor path, the conveyor thus constructed being of generally conventional type. While, in the machine as herein illustrated, the conveyor path is rectilinear and the conveyor is an endless chain, certain features of the present invention are useful in machines wherein the conveyor path is other than rectilinear and where the conveyor may be a rotary table.

For confining the articles and steadying them as they move along the article path appropriate guide rails 102 and 103 are provided with provision for adjusting their height as is customary in machines of this type. At the left-hand end of the machine (Fig. 6) a horizontal shaft 104 carries a guide sprocket about which the chain 100 passes. At the right-hand end of the machine (Fig. 8) the chain passes about a drive sprocket 105 (Figs. 47 and 47ª) mounted on a shaft 106, which, by means of bevel gearing contained in a gear box 106ˣ is driven by a shaft 107.

Figure 11:
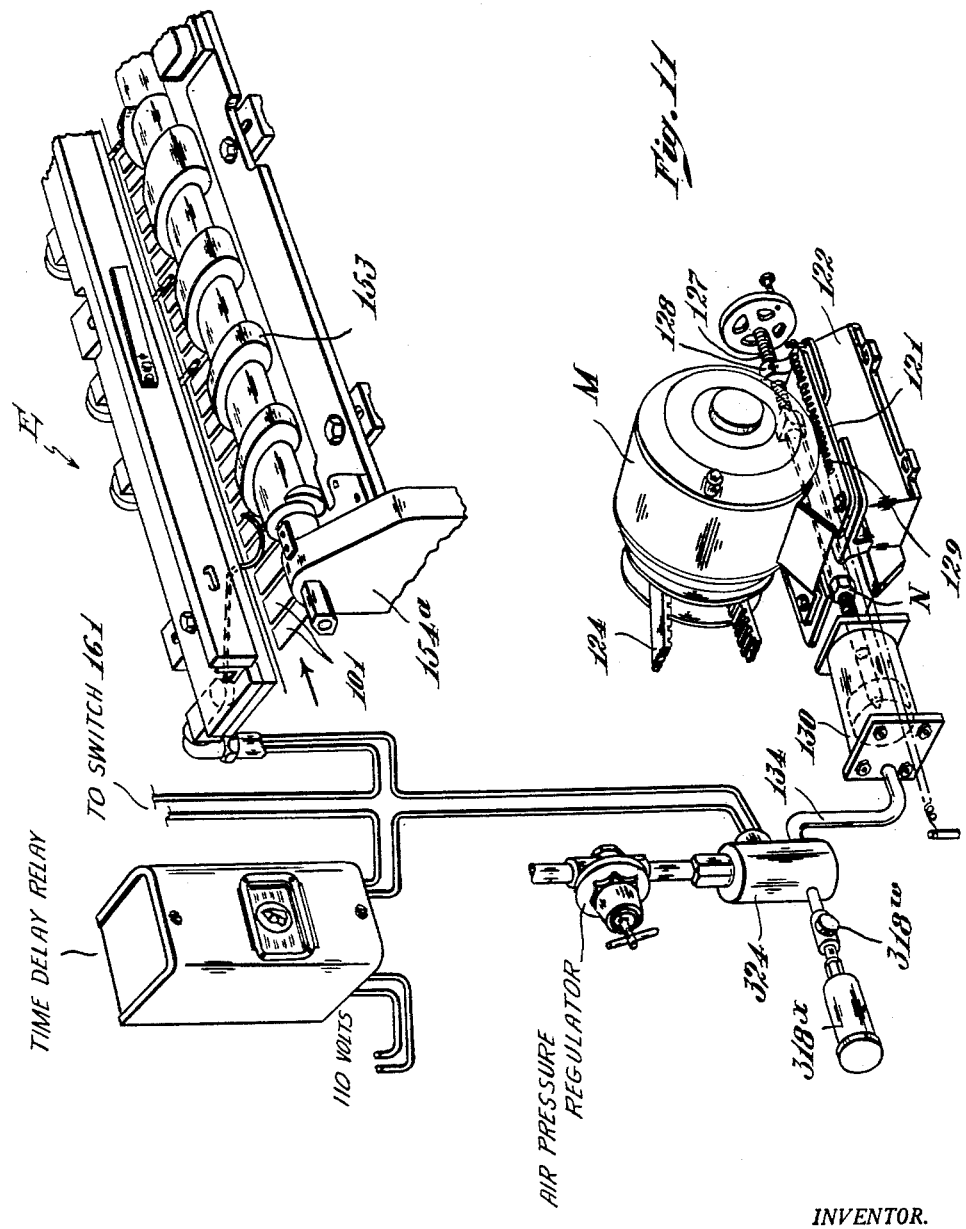
Fig. 11 is a fragmentary diagrammatic perspective view illustrating means whereby the speed of the machine is automatically varied in response to the rate at which articles are supplied.
Figure 35A:
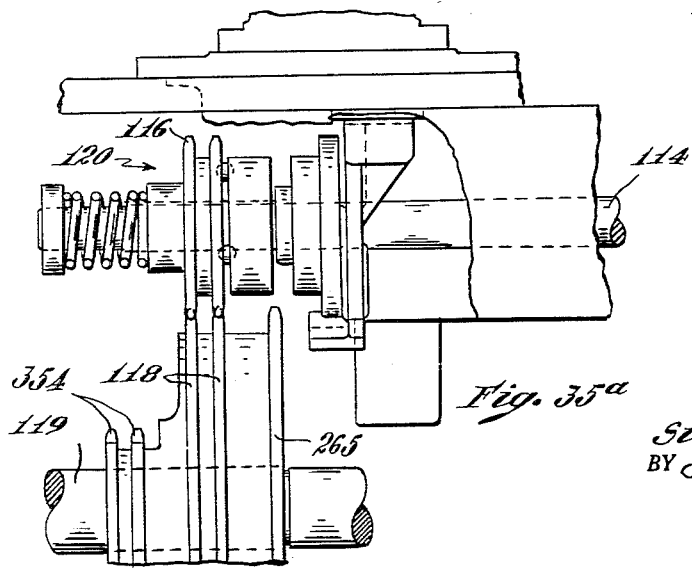
Fig. 35a is a fragmentary front elevation, partly in vertical section, showing the means for driving the horizontal shaft shown in Fig. 35 below the machine table.
Figure 36:
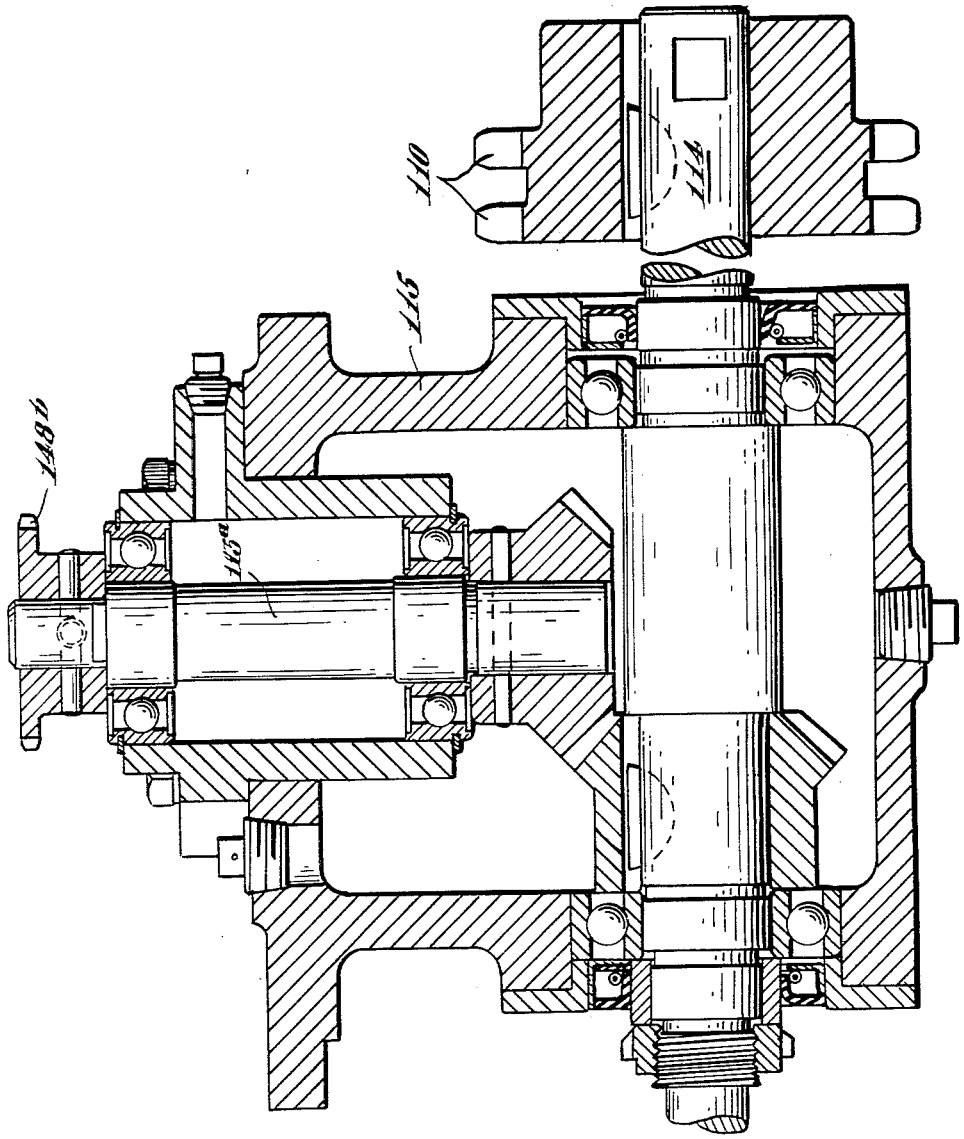
Fig. 36 is a vertical section to larger scale, showing the gear box which is shown below the machine table in Fig. 35.

The upper run of the chain rests upon horizontal supporting rails whereby the upper run is kept horizontal. The lower run rests upon supports 108 (Figs. 6 and 8), the ends of these supports being deflected downwardly as shown at 108ª and 108ᵇ respectively, to guide the lower run of the chain in approaching and leaving the support 108. The shaft 107 extends to the left (Fig. 8) to a gear box 109 (Fig. 34) where it is connected to a shaft on which is fixed a sprocket 110 about which a sprocket chain 111 passes. This chain extends down through an opening in the table T of the machine and embraces a sprocket 113 (Fig. 34) on a shaft 114 journaled in a gear box 115 (Figs. 34, 35 and 36). This shaft preferably comprises a plurality of aligned sections, united by couplings, as shown at Cᵖ, Figs. 35 and 36. A sprocket 116 (Fig. 35ª) fixed to the left-hand end of the shaft 114 is embraced by a sprocket chain 117 (Fig. 34) which passes about a double sprocket 118 on the main drive shaft 119. The sprocket 116 (Fig. 35ª) is connected to the shaft 114 by a spring-pressed slip clutch indicated at 120. Power for driving the main shaft 119 is provided by the electric motor M (Figs. 5, 11 and 27). This motor forms an element of a speed changer of the so-called Reeves type, the motor being mounted on a carriage 121 which slides on the fixed base 122 having guides so arranged as to guide the carriage to move in a direction perpendicular to the vertical plane of the axis of the motor shaft 123. A V-pulley of the Reeves type is fixed to the motor shaft and is embraced by a Reeves type belt 124 which passes about a pulley 125 (Fig. 27) on a shaft 126 mounted to turn in fixed bearings supported by the machine frame and which is connected by means of a magnetic clutch 248 (Figs. 41, 42 and 25) and by suitable reduction gearing J to the main drive shaft 119. The numeral 127 indicates the usual adjusting shaft of the Reeves variable speed drive whereby the motor is usually moved by hand so as to tension the belt 124 more or less and thus vary the speed of the driven pulley 125. However in the present instance the hole in the boss 128 on the motor carriage is reamed out so that the screw-threaded part of the shaft can slide freely through it. The hand wheel W may be adjusted along the screw-threaded end portion of the shaft to provide an adjustable stop, cooperative with part 128 to fix the maximum speed. A long tension spring 129 (Fig. 11) is connected at one end to the motor carriage and at its other end to a fixed part of the frame and is so arranged that it constantly tends to increase the speed of the driven pulley 125. At its rear end the shaft 127 extends into a pneumatic cylinder 130 (Fig. 27) which is fixed to the frame of the machine and in which there is arranged a piston 131 which is secured to the end of the rod 127, the latter passing through an opening in the right-hand cylinder head. A pipe 134 enters the cylinder at its left-hand end as viewed in Fig. 11 and provides for admission of air into the cylinder 130 at the left-hand side of the piston whereby the rod 127 is moved to the right, thus moving the motor to the right and decreasing the speed of the pulley 125. A nut N adjustable along rod 127 constitutes a stop to fix the minimum speed. The means for controlling the admission of air to the cylinder 130 will be described in detail hereafter.

It is customary in labeling machines to provide hold-down means for applying downward pressure to the tops of the articles which are being labeled in order to prevent the articles from tipping when subjected to the lateral thrust imposed in applying a label to the side of the article. Since in the machine of the present invention the articles are moving uninterruptedly along the article path while the labels are being applied, it is necessary that the hold-down means be of a character such that it stopping the labeling machine completely at intervals, the present machine is designed under certain circumstances to run at a much slower rate, for example, at the rate of seventy-five bottles per minute, this change in speed being accomplished either manually or automatically by means of the drive connections above referred to and illustrated in Fig. 11. However, in response to the failure of the following machine or stack to receive bottles as fast as delivered by the labeler, the latter is automatically stopped.

When the machine is working at its maximum speed, and if the bottles from the supply do not form a solid column with one bottle contacting the next, an advancing bottle may not be in proper time with the feed screw which may result in breakage. To assure the presentation of a solid column of bottles to the feed screw, two switches 160 and 161 (Figs. 10 and 25) are provided at the entrance end of the machine, these switches having actuating feeler fingers 162 and 163 respectively (Fig. 10), which extend transversely into the conveyor path, and which are so spaced apart longitudinally of the conveyor path that except a solid column of bottles intervene between the switches such as to swing both feeler arms 162 and 163 simultaneously out from the conveyor path, the circuit (Fig. 25) controlled by the switches will be such as to position the drive as illustrated in broken lines in Fig. 27, in the low speed position. At this low speed, bottles may enter the conveyor path and engage the feed screw without danger of breakage, even though they may not be in exact time with the feed screw. When there is a solid column of bottles in the entrance to the conveyor path and both feelers 162 and 163 are thus pushed out of the conveyor path, the machine is automatically brought up to full speed after a predetermined time delay and continues at this speed until, through failure of the supply means to provide bottles with sufficient rapidity, the feeler arm 162 of switch 160 moves inwardly across the conveyor path, whereupon the speed of the machine will drop back to its lower rate automatically and will continue at this low speed until a solid column of bottles has again been built up between the switches 160 and 161. By this arrangement it is possible to run the labeling machine under normal conditions slightly faster than the machine which precedes it in the production line, but since the speed drops automatically in response to a drop in the rate of supply, it is possible to allow the labeling machine to run uninterruptedly. This has certain advantages, for example, were the machine to stop completely, the glueing mechanism would dry out more or less, so that before normal operations were resumed, it would be necessary to run the machine empty until the glue-applying elements had become properly coated with fresh glue.

The feed screw 153 (Fig. 10) comprises a delivery portion 164 which is of constant pitch and which, in the present machine, is a five and one-half inch pitch, so that as the bottle is moved along by this portion of the feed screw, it is moved at the same linear velocity, longitudinally of the article path, as the conveyor chain and the hold-down belt. To insure proper engagement of the bottle with the feed screw at this part of the latter, a leaf-spring 165 is arranged to press against the bottles diametrically opposite to the feed screw.

The first part 166 of the feed screw is of a constant pitch equal to the diameter of the bottle so as to insure smooth action of the bottles as they enter the screw. The middle section 167 of the feed screw has a pitch which gradually increases from that of the first section 166 to that of the delivery section 164. It is quite desirable, in order to insure smooth entry of the bottles into the feed screw, that the section 166 be of a pitch equalling the diameter of the bottle, since, if the pitch is slightly more than the diameter of the bottle, the bottles will jump ahead and the following bottles will be set into vibration. The hold-down device H is so located that it contacts the tops of the bottles before the latter leave the feed screw.

Figure 10:
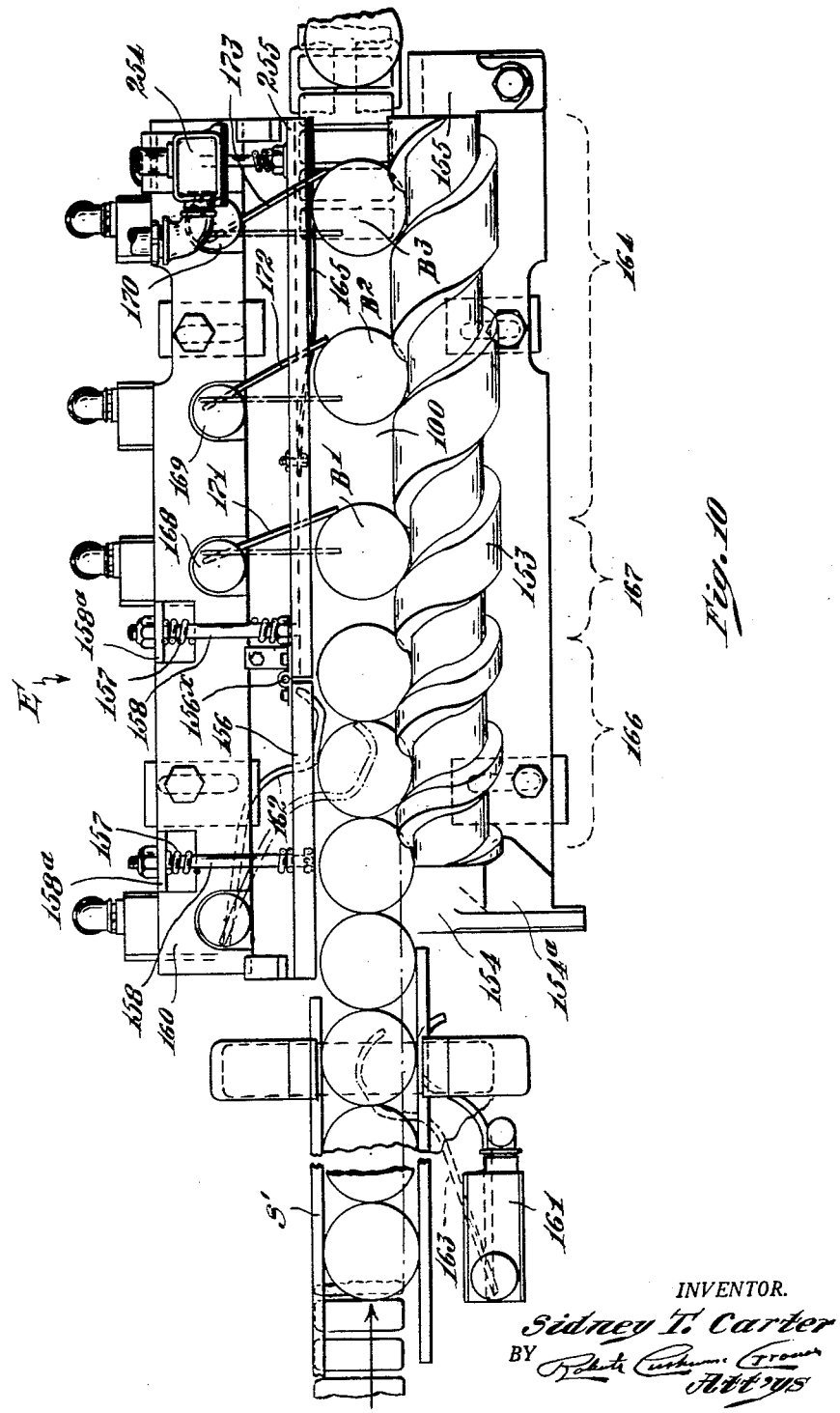
Fig. 10 is a fragmentary plan view showing the entrance end of the article path with the feed screw, escape gate and detector elements.

In Fig. 10 of the drawings three bottles or jars B', B² and B³ are shown in engagement with the feed screw and with their centers spaced apart in the section 164 the proper distances, so that they may receive labels simultaneously in passing through the labeling station. At this part of conveyor path, and at the opposite side from the feed screw, three switches 168, 169 and 170 (Figs. 10 and 25) are arranged having feeler fingers 171, 172 and 173 respectively, which, when engaged by bottles properly positioned, are swung from their normal broken line positions to their full line positions by contact with the bottles. Such movement of a feeler arm from the dotted line to the full line position acts to close the respective switch. These three switches are in series, so that unless all three of the feeler arms are simultaneously disposed in the full line positions, this circuit will be broken. The purpose and mode of operation of these switches will be described hereafter.

The general structure of the machine is such that, if desired, it may be arranged to apply labels simultaneously to opposite sides of the same bottle as the bottle travels along the article path. This involves merely a duplication of the parts at the stations G and L. In Fig. 4 such duplication of parts at the wiping station L is illustrated, although the parts constituting the station G are indicated at one side only. It is thus to be understood that if it is not desired that the machine apply labels to opposite faces of the article the parts constituting the station G may be omitted from one side of the article path, although in the machine here shown, where the wipers of the rear side are depended upon to keep the articles properly positioned during wiping, it is necessary to have a wiping station L at the back as well as at the front. The basic machine is desirably provided with means for actuating the parts constituting stations G at both front and rear.

Figure 12:
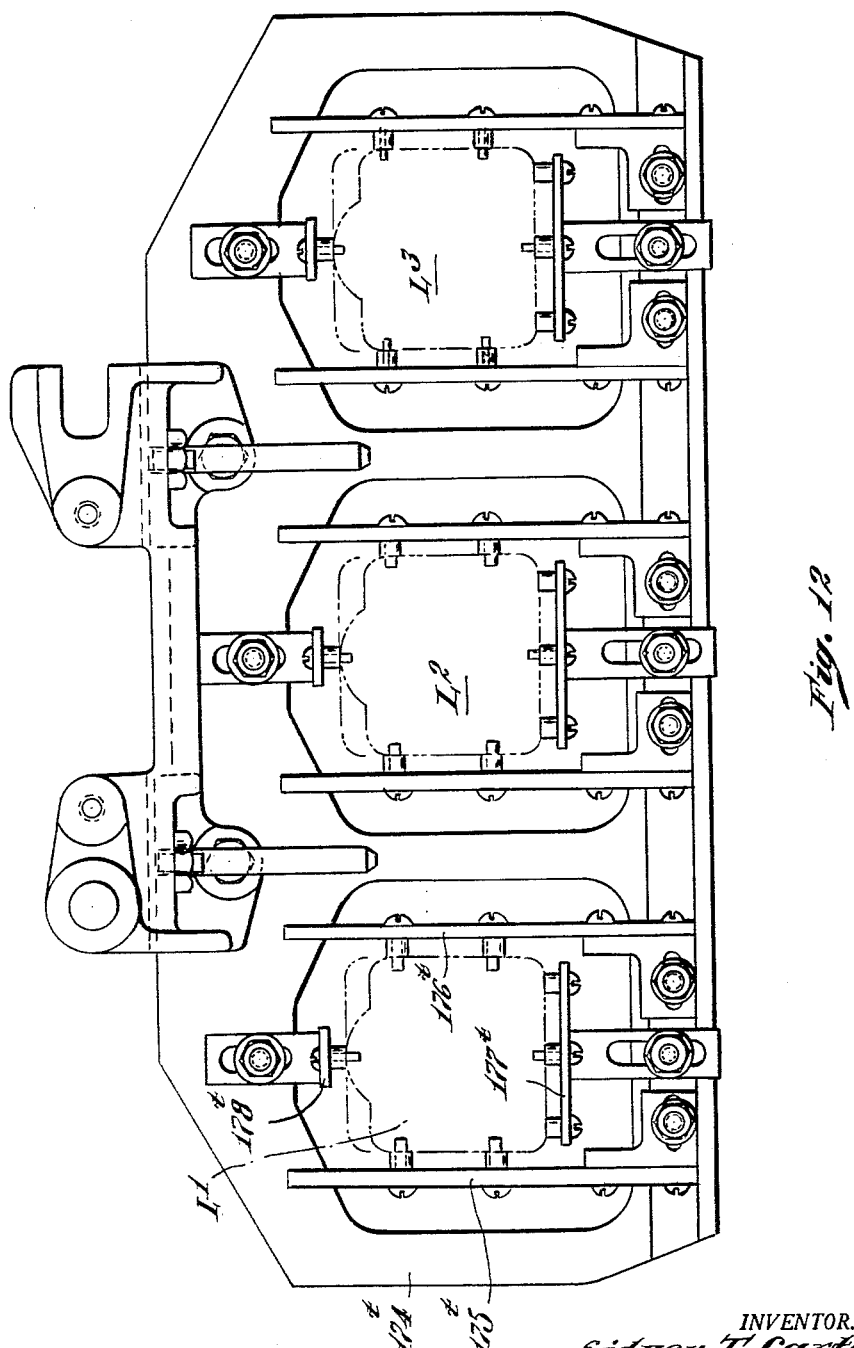
Fig. 12 is a plan view of the label holder assembly.
Figure 15:
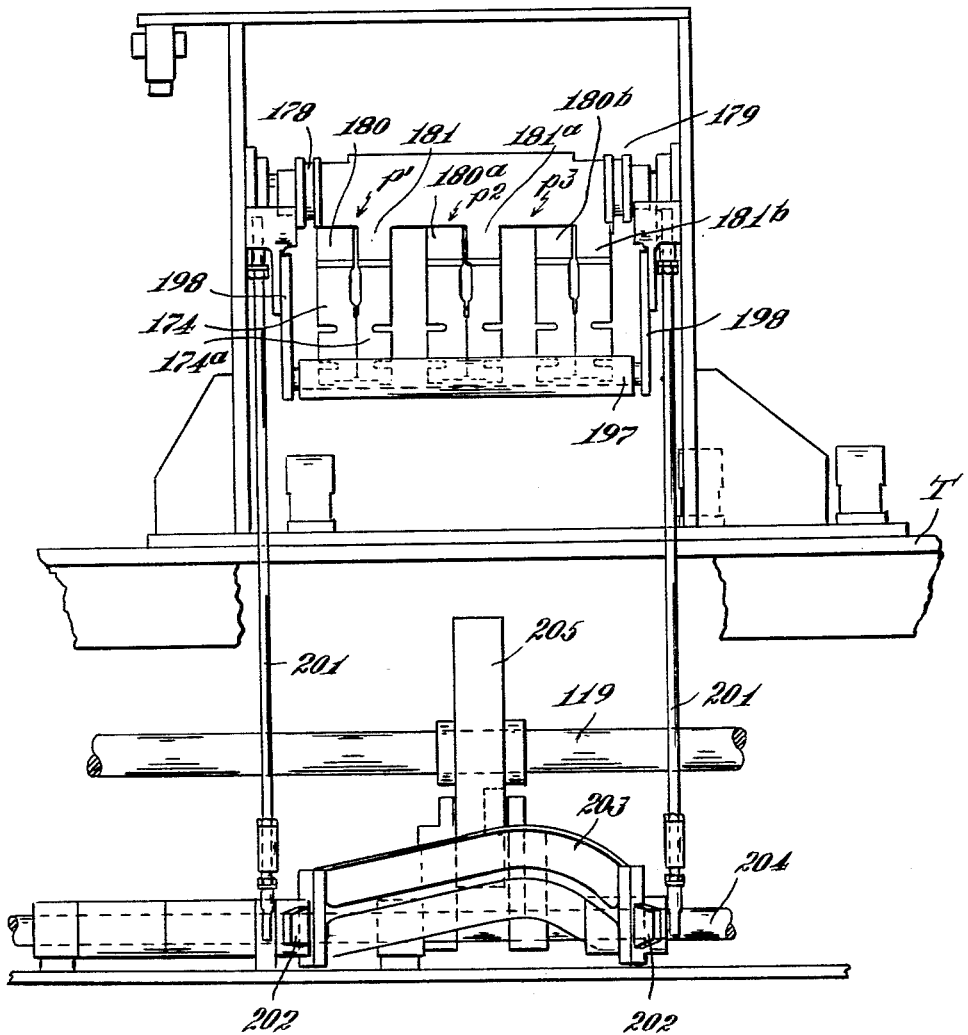
Fig. 15 is a diagrammatic fragmentary front elevation of the parts shown in Fig. 14.

At the gumming station G suitable means is provided for supplying and gumming the labels. A label holder assembly is shown in plan in Fig. 12, for example. This assembly comprises a frame 174$^t$ which supports three label magazines, each designed to contain a stack L', L² and L³ respectively, of labels in readiness to be applied to the bottles, the three magazines making it possible to supply labels simultaneously for application to three successive bottles in the conveyor path. Each of these magazines, as illustrated in Fig. 12, comprises customary label-positioning elements 175$^t$, 176$^t$, 177$^t$ and 178$^t$, which are relatively adjustable as is customary in apparatus of this type to accommodate labels of different sizes within a predetermined range, and also to permit the proper location of the labels with respect to the point of application. Preferably the label follower for each magazine (which is a customary part of such label holders) is mounted on a pivoted arm (not shown) which permits the follower to be lifted out of normal position while the machine is running, so that additional labels may be placed in the magazine. Associated with each magazine is a picker P', P², P³ (Fig. 15). As above noted, it is contemplated that the machine may be employed to apply labels to both front and rear of each bottle, and for such use, picker-actuating parts are provided at front and rear.

Each picker comprising a pair of relatively movable blades 174 and 174$^a$ (Fig. 15) disposed in the same plane and which are mounted to oscillate simultaneously about the axis of the picker shaft 175, and also to move toward and from each other axially of the picker shaft. Each picker shaft 175 (Figs. 17, 18, 19 and 20) is mounted in bearings in a suitable frame at the gumming station and on this shaft 175 are mounted two sleeves 176 and 177 (Fig. 18) which are slidable axially of the shaft toward and from each other, but which are constrained to turn with the shaft by means of transverse pins 176$^x$, 176ʸ (Fig. 20) which pass through the shaft and whose opposite ends are provided with cylindrical rolls 177ˣ and 177ʸ which are interposed between spaced parallel rails R' and R², the rails having clearance spaces at their opposite ends, respectively, one such space being shown (Fig. 20) at C⁸, the rails being attached to the respective sleeves 177 and 176. The pickers are of the general type disclosed in the patent to Holm 1,901,101. The sleeves 176, 177 are provided at their opposite ends with parts having circumferential grooves 178 and 179, and each sleeve (Fig. 15) has three downwardly directed bosses 180, 180ᵃ and 180ᵇ; and 181, 181ᵃ and 181ᵇ respectively, to which the picker plates are secured, it being noted (Fig. 15) that the bosses carried by the respective sleeves alternate with each other. Thus, for example, the bosses 180 and 181 carried by the sleeves 176 and 177 respectively, support the adjacent blades 174 and 174ᵃ of the picker P'.

Each picker shaft 175 is provided with a crank arm 175ᵐ (Fig. 17) which is pivotally connected to the upper arm 238 of a bell crank lever which is pivoted at 239 to the upper end of a resiliently yieldable link 182 whose lower end is pivoted to one arm 183 of a bell crank lever whose other arm carries a cam roll 184 which engages a cam C' (Fig. 17) on the main shaft 119.

Figure 13:
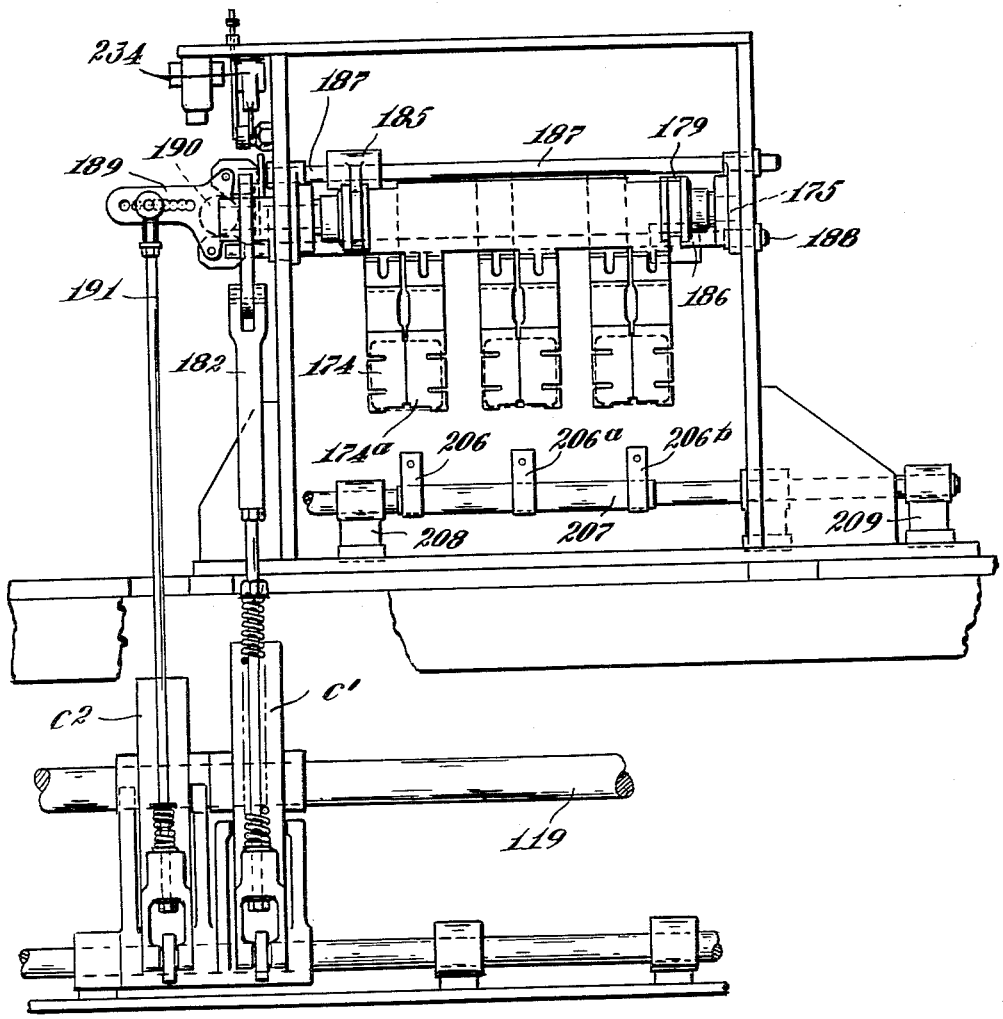
Fig. 13 is a fragmentary front elevation showing the pickers with their blades closed in position to receive glue.

The circumferential grooves 178 and 179 in the sleeves 176 and 177 receive the tines of forks or yokes 185 and 186 (Fig. 13) which are fixed to slidable rods 187 and 188, respectively, parallel to the picker shaft and at opposite sides of the latter, and these rods are pivotally connected at their left-hand ends, as viewed in Fig. 13, to the upper and lower arms of a rocker member 189 pivoted at 190 and which is connected by a link 191 to one arm 192 of a bell crank lever having a second arm 192ᵃ (Fig. 17) carrying a cam roll 193 which engages a cam C² to the main shaft 119.

Figure 14:
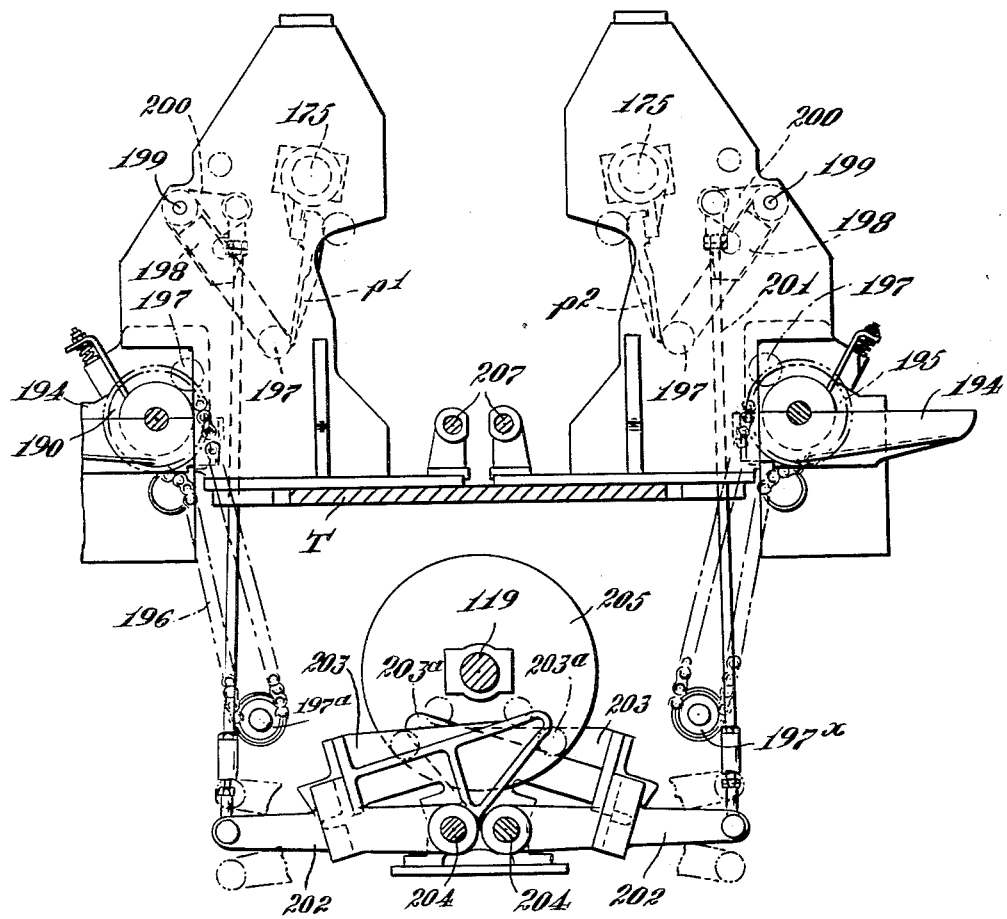
Fig. 14 is a fragmentary end elevation showing the transfer roll applying glue to the pickers.

At the gumming station G there is also provided (Figs. 4 and 5) a gum box 194 (at the front and back respectively of the machine) into which dips a horizontal, gum-elevating roll 195 (Figs. 14 and 46) which is constantly turned at low surface velocity.

Figure 44:
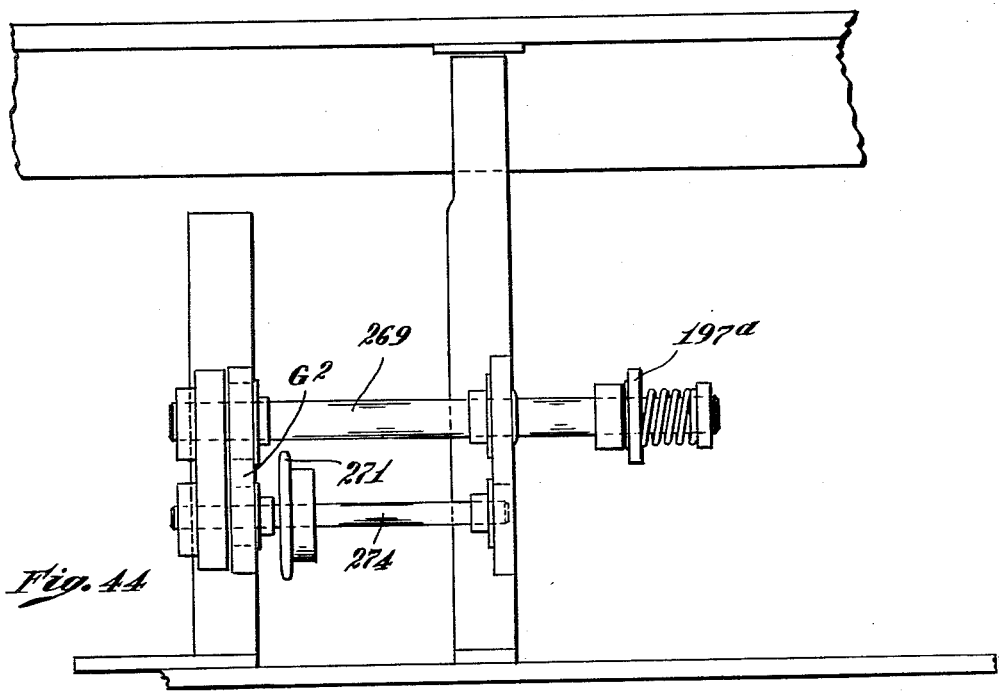
Fig. 44 is a fragmentary elevation looking from the rear of the mechanism shown in Fig. 41.
Figure 43:
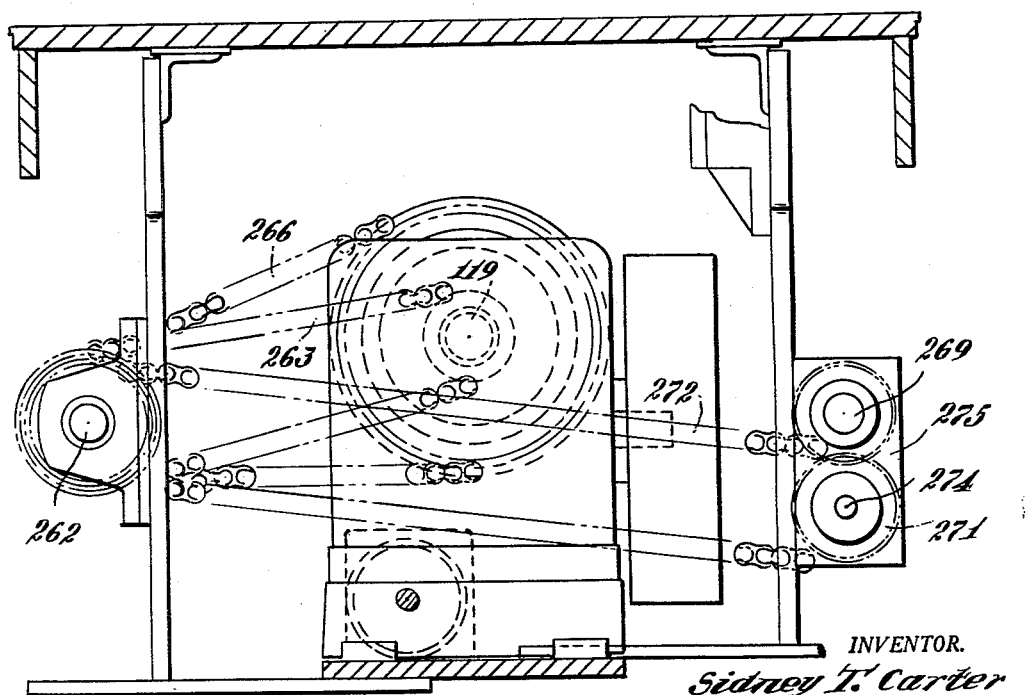
Fig. 43 is an end elevation partly in vertical section of the parts shown in Fig. 42.

The two rolls 195 at the front and rear of the machine, respectively, are driven by sprocket chains 196 which pass about sprockets 197 and 197ᵃ respectively. Provision is made whereby, when the labeling device is stopped, the rolls 195 continue to rotate but at a slower than normal speed. This is to keep the gum in the gum boxes agitated so that it will not crust over on its surface. It is also desirable to run the rolls at slow speed so that the gum will not become more viscous as would be true if it were violently agitated. The means for driving the rolls 195 is more particularly illustrated in Figs. 41–46. Power for driving the gum rolls is taken under different conditions from the opposite sides of a clutch 248 (Figs. 41 and 42) whose driving and driven elements are fixed to the output shaft of the speed reducer J and the main shaft 119 respectively. When clutch 248 is disengaged and the drive motor M is still running, a sprocket 261, by means of a chain 263, continues to turn an auxiliary drive shaft 262, the chain 263 passing about a sprocket 263ᵃ connected to shaft 262 by an over-running clutch 264. When the clutch 248 is engaged, and the main shaft 119 is running, then the shaft 262 is driven by means of a sprocket 265, chain 266 and sprocket 267, the latter being fixed to the shaft 262, the sprocket 267 being connected to the drive element of an overrunning clutch 268 whose driven element is fixed to the shaft 262. The drive sprocket 265 is much larger than the driven sprocket 267, and the drive sprocket 261 is smaller than the driven sprocket 263ᵃ. It follows from this that when the clutch 248 is engaged, shaft 262 is turning at a much higher speed than it is when the clutch 260 is disengaged. The sprocket 197ˣ is connected to the shaft 262 by means of a spring-pressed slip clutch, and this sprocket 197ˣ drives the chain 196 which turns the gum roll 195 at the front side of the machine. The sprocket 197ᵃ (Fig. 41) which drives the chain 196 (Fig. 46) for the gum roll at the other side of the machine is connected by a slip clutch to one end of a shaft 269 (Fig. 41) at the opposite side of the machine from the shaft 262. A sprocket 273 on shaft 262 is connected by a chain 272 (Figs. 41 and 46) to a sprocket 271 on a shaft 274 (Fig. 43) below and parallel to the shaft 269 and which is connected to the latter by spur gears (G², Figs. 44 and 46) which cause the shaft 269 to turn in the opposite direction from the shaft 274. Thus the gum rolls at opposite sides of the machine turn in opposite directions and at the same speed.

Since the machine of the present invention is designed to handle articles of various sizes, the gum box assemblies are arranged to be moved horizontally in and out to accommodate the various sizes to be labeled. For this purpose a supporting housing for each gum box assembly, a portion of which is indicated at Gᵐ (Fig. 46), is adjustable horizontally by a jackscrew J which may be turned in any convenient manner. To accommodate such adjustment of the gum box assembly, a take-up sprocket 280 (Fig. 46) is arranged to engage each of the sprocket chains 196, each take-up sprocket 280 being mounted on one arm of a bell crank lever 281 to whose other arm a strong coiled spring 282 is secured. Thus, regardless of the position of the gum box assembly, the chain 196 will be kept taut for driving the gum rolls.

Figure 67:
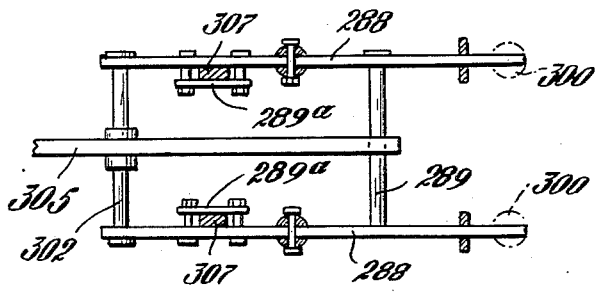
Fig. 67 is a section on the line 67—67 of Fig. 65.

For supporting the gum box 194, vertically movable cradles 283 (Fig. 45) are provided, the two cradles at each side respectively of the machine being mounted on the upper ends of vertically movable rods 284 which slide in suitable guides 285 carried by a horizontal shelf 286. The lower ends of the rods 284 are pivotally connected to rocker arms 288 whose rear end portions are movable to a limited extent vertically in guide slots in the lower ends of fixed posts 301 depending from the housing Gᵐ. Tension springs 300 attached to the extreme rear ends of the rocker arms tend to move the arms to the upper ends of the guide slots. The forward ends of the rocker arms are connected by a horizontal rod 302 which passes through an elongate slot in the mid-portion of an actuating lever 303 having a handle 305 at its upper end, the rod being provided with collars 304 at opposite sides of the lever 303 to keep the latter properly centered. Rigid supporting struts 307, one adjacent to each of the rocker arms 288, are each pivoted at their upper ends respectively, to the shelf 286. Each of the struts 307 is provided at its forward edge with two vertically spaced hook-like notches 310 and 308. Each of the rocker arms 288 is provided at its inner side with an elongate retaining plate 289ᵃ (Fig. 67) spaced from the rocker arm proper and held in place by bolts at its opposite ends, the spacing of this plate from the rocker arm providing a slot through which the corresponding strut 307 passes with limited freedom of motion in the front-to-rear direction. The lever 303 is provided at its lower end with a notch 306ᵃ which is designed at times to engage a bar 289 connecting the rocker arms 288. An actuating bell 286ᶻ crank is pivoted at the shelf 286 at 286ˣ (Fig. 45) adjacent to each strut 307 respectively, each bell crank having a forward arm 286ᶻ constituting a handle and also having a normally vertical downwardly directed arm which is engageable, by swinging the handle 286ᶻ downwardly, with the edge of the corresponding strut 307 thereby to rock the strut rearwardly.

Figure 65:
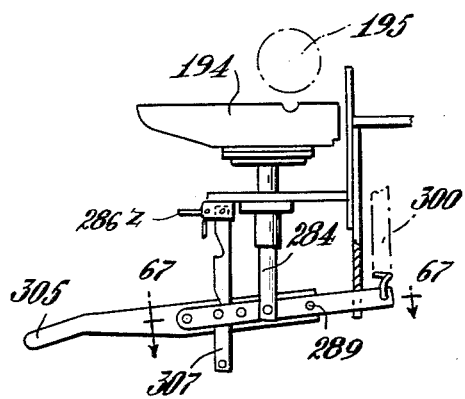
Fig. 65 is a fragmentary view, generally similar to Fig. 45, but showing the parts associated with the gum box in a different position.
Figure 66:
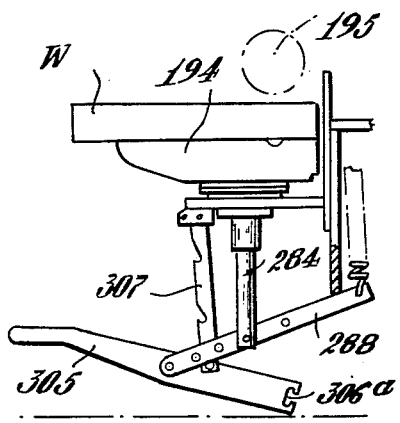
Fig. 66 is a view similar to Fig. 65, but showing the parts in still another position.
Figure 64:
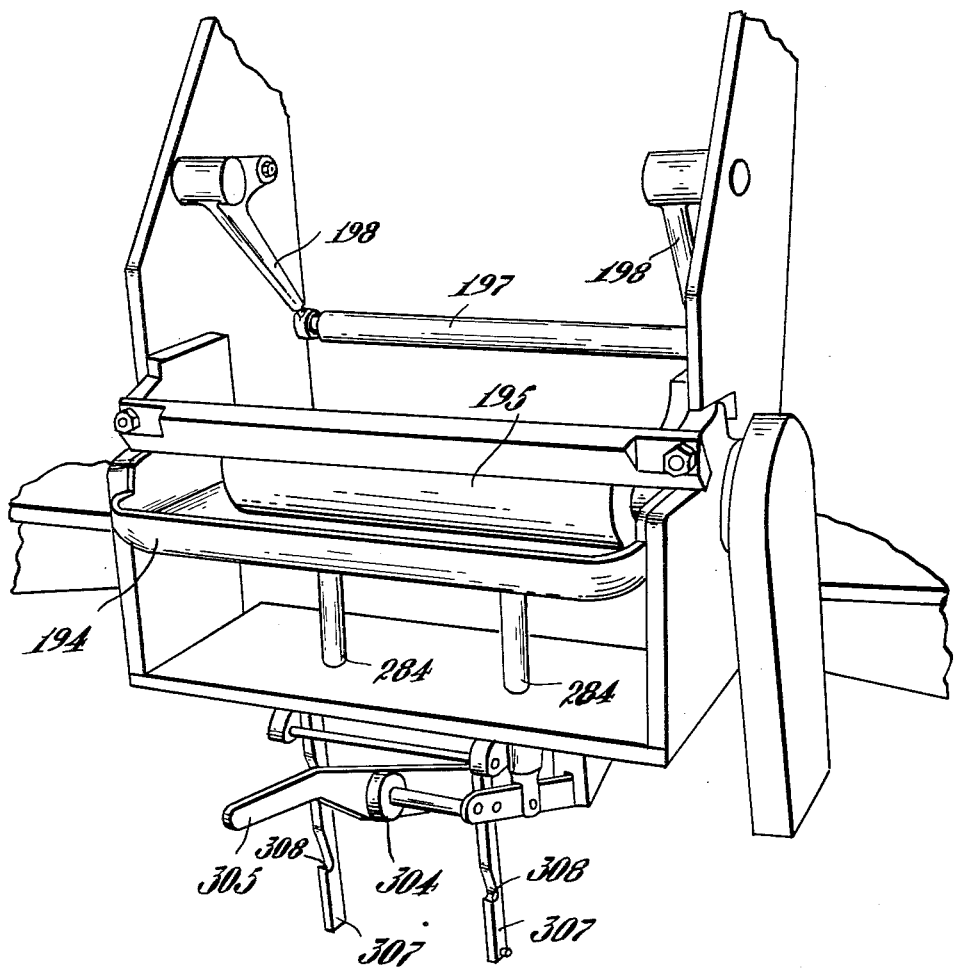
Fig. 64 is a perspective view of one of the gumming stations, showing the gum box in operative position and with the transfer roll in position to apply gum to the pickers.

Normally, when the gum box is in use, the parts occupy the positions indicated in Figs. 45 and 64, wherein the lower ends of the struts 307 are just above the floor F and the lever 303 is in upright position with the bolts at the forward ends of the retainer plates 289ᵃ in the uppermost of the notches in the legs, and upward motion of the gum box, in response to the action of springs 300 is limited by stops (not shown). This position of the gum box and associated parts are shown in Fig. 64 of the drawings. By pulling the handle 305 downwardly it may be brought into position to engage its notch 306ª with rod 289. Then by actuation of handles 286ᶻ the struts 307 may be swung to disengage the bolts at the forward ends of retainer plates 289ª from the upper notches 310 and then by swinging the handle 305 further down the lower notch 308 of the struts may be engaged with said bolts, thus holding the gum box in the position of Fig. 65. When the gum box is in the position illustrated in Fig. 65 it may form a support for a washpan W shown in Fig. 66, which is slid in over the gum box and beneath the gum roll 195 and which may then be supplied with water for washing gum from the roll, the drive for the roll 195 being continued at low speed until the roll has been thoroughly cleaned. If desired, means may be provided for circulating water through the washpan so as to keep the water sufficiently dilute to insure proper cleaning of the roll.

The gum box is preferably provided at its underside with dovetailed grooves for the reception of the supporting cradles 283 so that the box may be slid easily in or out of the gum box housing. Desirably, suitable latch means of any conventional type may be used for holding the gum box in proper position on the supports 283, for example, during the removal of the washpan from the gum box.

For conveying gum from each roll 195 to the corresponding pickers there is provided a transfer roll 197 (Figs. 14 and 64) which is journaled at its opposite ends in rock arms 198 each mounted to turn on a stub shaft 199 fixed to the machine frame. This roll 197 is necessarily of substantial length in order to supply gum simultaneously to the three pickers P′, P² and P³, and in order to insure that the axis of this roll 197 will remain horizontal under all circumstances, each rock arm 198 is provided with an actuating crank 200 (Fig. 14), and each crank is connected by a rigid rod 201 to a corresponding arm 202 (Figs. 15 and 64) of a rigid rock frame fixed to a rock shaft 204. Each frame has a cam follower roll 203ª which engages a cam 205 mounted on the main shaft 119.

Figure 16:
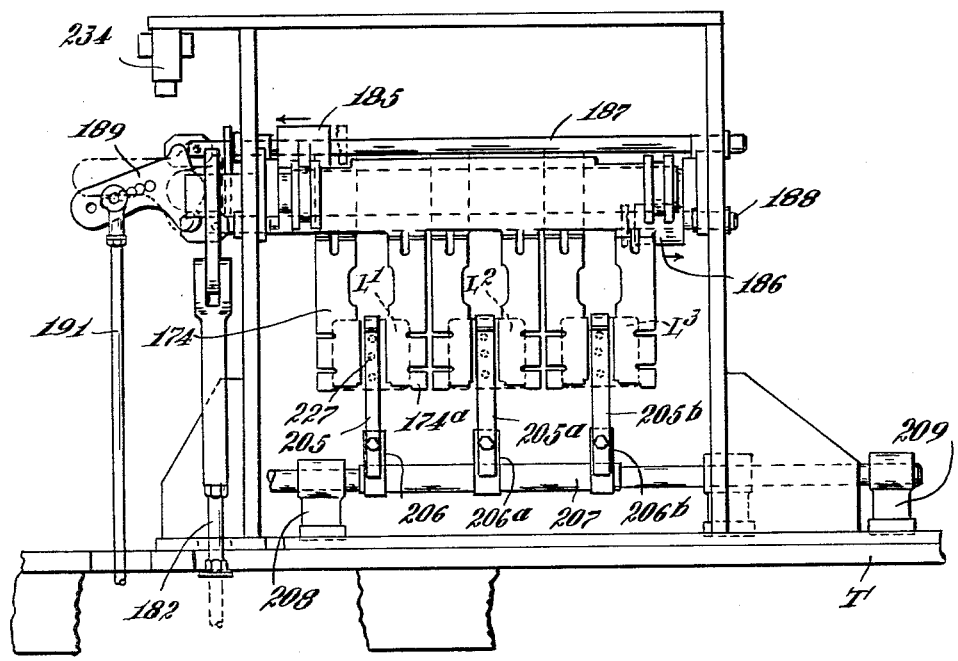
Fig. 16 is a fragmentary front elevation showing the picker blades separated to permit the grip fingers to pass between them.

As the pickers travel up toward the label holder, the transfer roll 197, which has previously received a coating of gum and which has moved up to its uppermost position, moves down and in so moving deposits a coat of gum on the faces of the pickers. The transfer roll 197 continues on down and into contact with the gum roll 195 to receive a fresh supply of gum while the picker continues up to take a label from the magazine. While receiving the gum the blades of each picker are disposed in edge-to-edge contact, but as the picker blades contact the label in the magazine they separate, thus assisting in uniformly spreading the adhesive over the label surface and at the same time leaving a space between the blades through which the grip finger may pass in order to strip the label from the pickers. In Figs. 13 and 15 the picker blades are shown in edge-to-edge contact to receive the coating of gum from the transfer roll, but in Fig. 16 the blades of each picker are shown as separated to allow the grip fingers 205, 205ª and 205ᵇ to pass between the blades of the respective pickers to take the labels L′, L² and L³ from the pickers and to carry them over into adhering contact with the bottles. Since the bottles are moving without interruption along the conveyor path, it is necessary that the grip fingers, while they are applying the labels to the bottles, move simultaneously with the bottles and at the same speed longitudinally of the conveyor path. Thus the grip fingers in the present machine must not only oscillate in carrying the labels from the transfer position over to the conveyor path, but while in the latter position they must move lengthwise of the conveyor path.

The grip fingers 205, 205ª and 205ᵇ (Figs. 16, 17, 21, 49, 50) are secured at their lower ends (Figs. 13 and 16) to arms 206, 206ª and 206ᵇ respectively, which are fixed to a shaft 207 which is arranged to rock and also to move endwise in bearings 208 and 209. The shaft 207 (Fig. 23) is pivotally connected at one end to a link 210 whose opposite end is connected by a ball joint 211 to the upper arm of a rocker 212 whose lower arm is connected by a link 213 to a slidable bar 214 which carries a cam follower roll 215 which engages a cam groove 216 in a cam 217 fixed to the main shaft 119. By this means axial motion is imparted to the shaft 207 and thus the grip fingers are moved back and forth longtudinally of the article path. A crank 218 (Fig. 23) fixed to each shaft 207 is connected by resiliently yieldable links 219 of adjustable length to a rocker 220 (Figs. 22 and 23) pivoted at 221 on a bracket 222, and this rocker 220 is connected by a link 223 to a rock arm 224 (Fig. 22) pivoted on a bracket 225, fixed to the underside of table T. The arm 224 carries a cam follower roll 226 which engages a groove in a cam 226ª fixed on the main shaft 119. By this latter means oscillating motion is imparted to the shaft 207 thereby to rock the grip fingers from the transfer position toward the article path and back again. The cam 226ª is so contoured that when the grip finger first contacts the label it dwells momentarily to permit the vacuum at the suction orifices of the grip finger to build up to its maximum before the grip finger passes through between the picker blades, thus to insure proper label registration and to make sure that the label will be gripped firmly by the grip finger.

Figure 25:
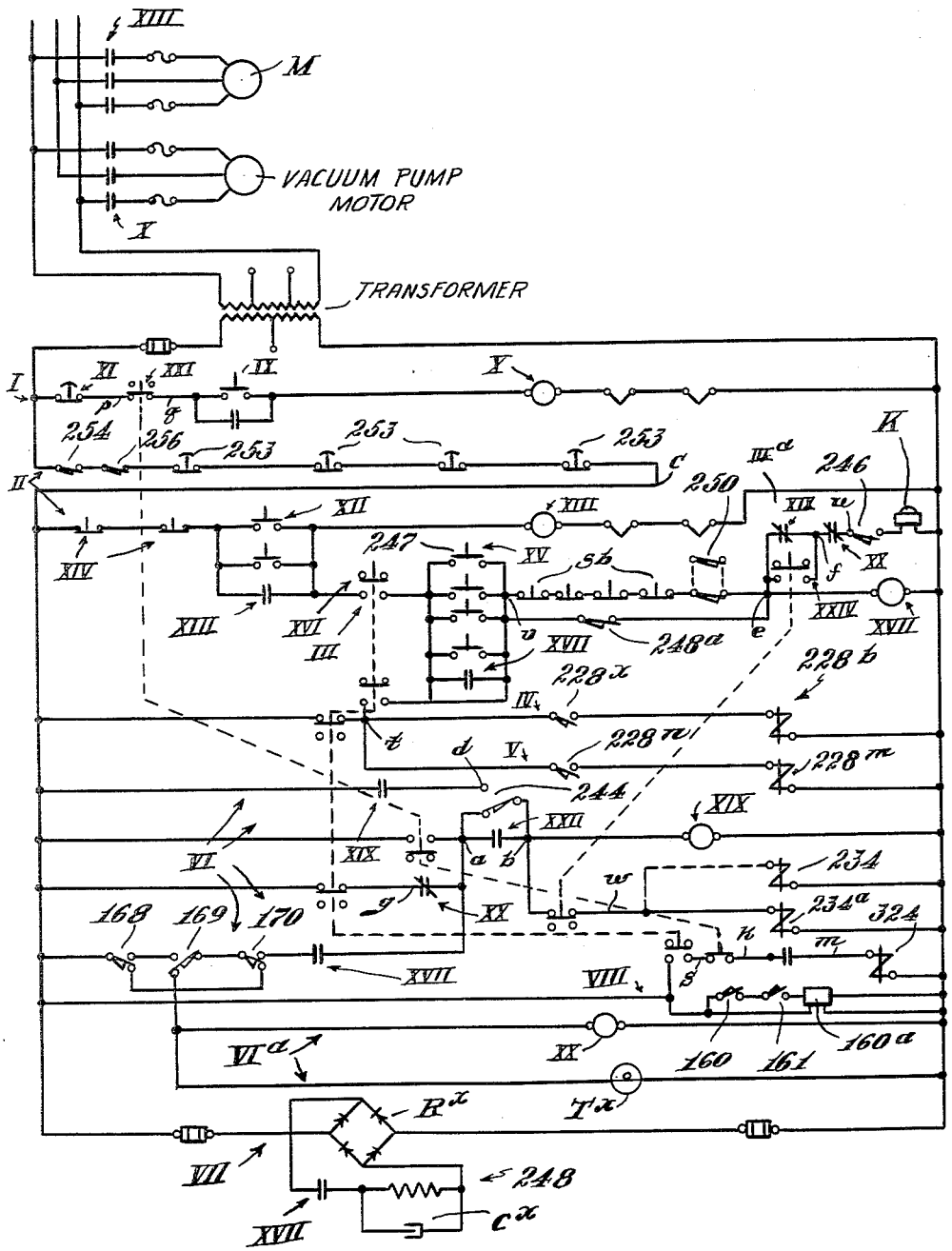
Fig. 25 is a wiring diagram showing the electrical connections included in the machine.

Each of the grip finger supporting arms 206, 206ª and 206ᵇ (Fig. 23) has a longitudinal interior passage which communicates with a plurality of suction ports 227 (Fig. 16) in the respective grip fingers. That portion of the shaft 207 (Fig. 23) to which the grip fingers are attached is provided with an interior passage 228 which communicates with the suction ports 227. Said interior passage 228 (Fig. 23) communicates with a flexible hose 228ª which is connected to a solenoid actuated valve 228ᵇ. This valve is a three-way valve, which may be of a conventional type, having a port which is connected to a source of air pressure and another port which is connected to a vacuum system. A third port communicates with the hose 228ª. This solenoid actuated valve is so timed, by means hereinafter more fully described, that vacuum is established in the passage 228 just before the grip fingers contact the label held by the pickers. As above noted, the grip finger dwells momentarily just before contacting the label to insure that full vacuum has been built up, so that the grip finger will positively grip and hold the label. Just as the grip finger contacts the label with the bottle, suction is broken at the solenoid valve and the grip finger is connected to the air pressure line. Thus all trace of vacuum is first removed and then a slight pressure is built up to insure positive transfer of the label from the grip finger to the bottle. This air pressure is maintained for a short period, after the label has been adhered to the bottle and while the grip finger is starting to move in the opposite direction, so as to clean out the passages in the grip finger assembly. If this were not done, the constantly maintained vacuum would tend to pull particles of paper and other foreign matter into the passages and thus block the suction orifices. The solenoid valve 228ᵇ is actuated to establish suction by a microswitch 228ˣ (Figs. 25 and 29). The delivery of air under pressure is controlled by a second solenoid actuated valve 228ᵐ (Fig. 70), this being a two-way valve which is controlled by a microswitch 228ⁿ. At approximately 5° of rotation of the main shaft, which carries the control cams, before the valve 228ᵇ is actuated to break the vacuum, the valve 228ᵐ is opened to deliver air under pressure and this pressure remains on for approximately 50° of the main shaft. This is to insure positive air pressure on the pressure side of the three-way valve 228ᵇ when the latter is turned from vacuum to pressure. The microswitches 228$^x$ and 228$^n$ are actuated by cams on the main shaft 119.

Figure 62:
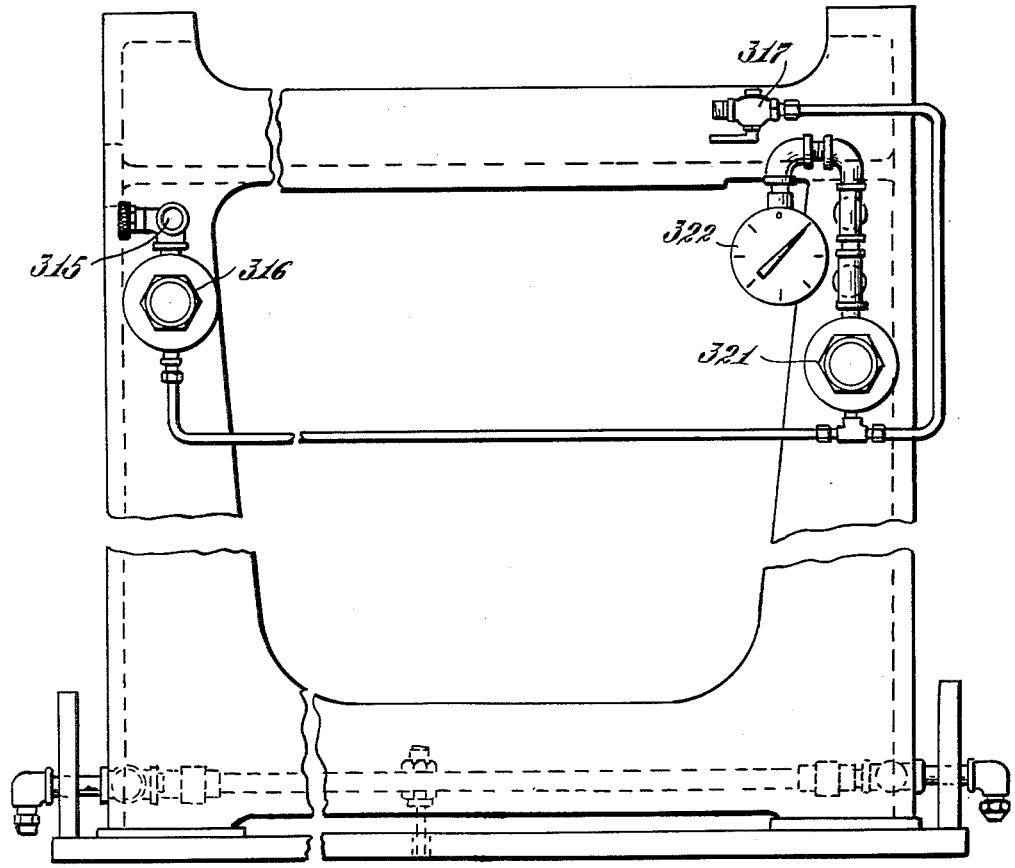
Fig. 62 is a fragmentary plan view showing some of the fluid pressure conduits.
Figure 63:
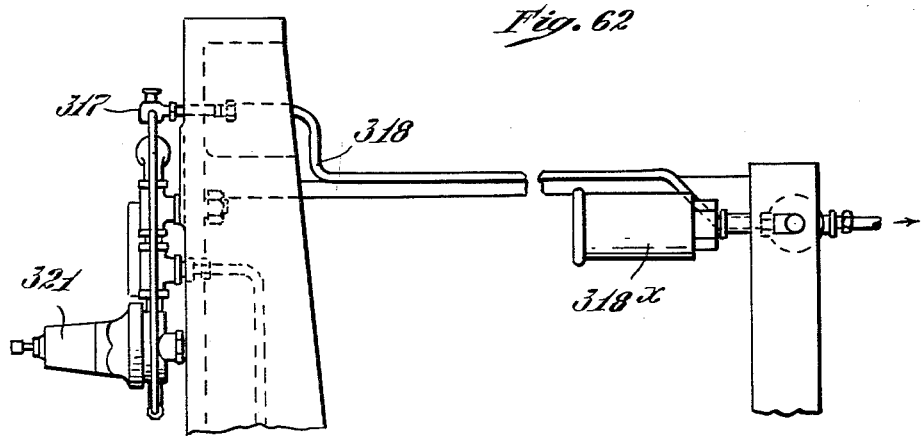
Fig. 63 is a fragmentary elevation showing certain of the pressure control valves.

Referring to Figs. 62 and 63, there are shown the connections for supplying compressed air to various parts of the machine. The piping illustrated at these views is located near the delivery end of the machine and is supplied with compressed air at between 45 and 65 pounds per square inch by connection 315. The air pressure is first reduced to approximately 40 pounds in passing through the reducing valve or regulator 316 from which the air is piped directly to the valve 317 which delivers the air into the pipe 318 (Fig. 63) which leads to the speed control cylinder 130 above described. The air regulator 316 controls the pressure at the speed control cylinder, the amount of pressure determining the time at which the speed will change from high to low.

The pressure regulator 316 is so arranged as to allow enough air to enter the speed changing cylinder, when the operation of switch 161 causes the machine to slow down, so that it will attain its low speed before the roll 236 on the lever 235 (Fig. 17$^a$) engages the notch in the upper end of lever 238. However, it is not necessary for the machine to go from high to low speed instantly. The air which leaves the regulator 316 goes through valve 317 and into the pipe 318. The purpose of valve 317 is to shut off the air to the pipe 318 and allow it to exhaust so that the machine can be brought up to high speed manually without having a bottle in the machine. This can also be done by manual actuation of switches 160 and 161. A second pressure reducer 321 (Fig. 62) is also connected to the air line between the parts 317 and 316. This controls the air pressure to the wipers and this pressure is recorded on a gauge 322. A pressure of 25 pounds at the gauge indicates a total of 50 pounds pressure at each wiper. The gauge is equipped with an index mark (not shown) to show the operator when the pressure has been built up to the safe maximum. Pipe 263 extends to the center of the machine where it is connected to another pressure regulator (not shown) where the pressure is reduced to from 15 to 20 pounds, the air from this regulator being delivered to the above two-way solenoid valve 228$^m$ (Fig. 70).

Figure 52:
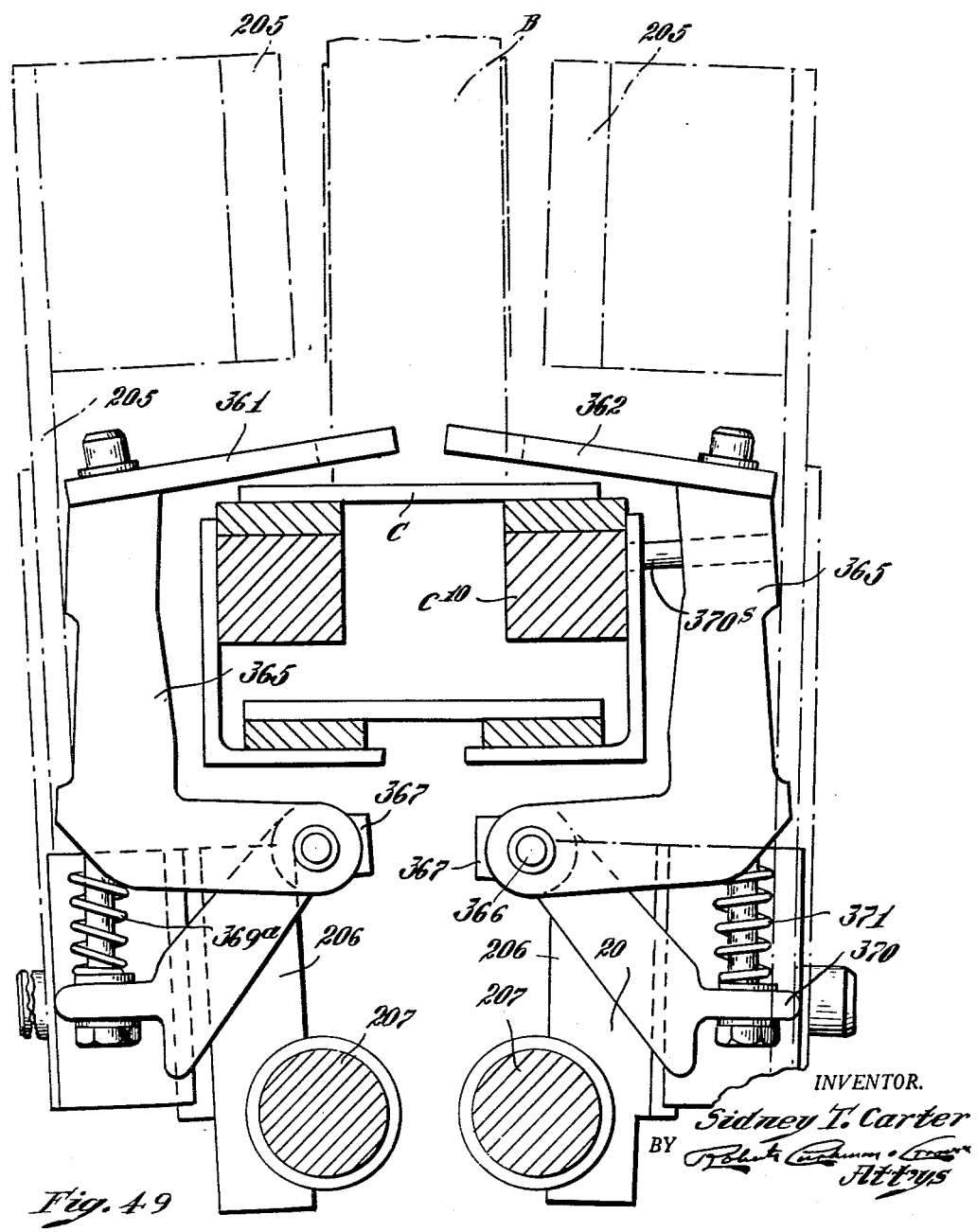
Fig. 52 is a plan view showing six wipers at each side of the machine, the wipers being about to move in toward the article path.
Figure 53:
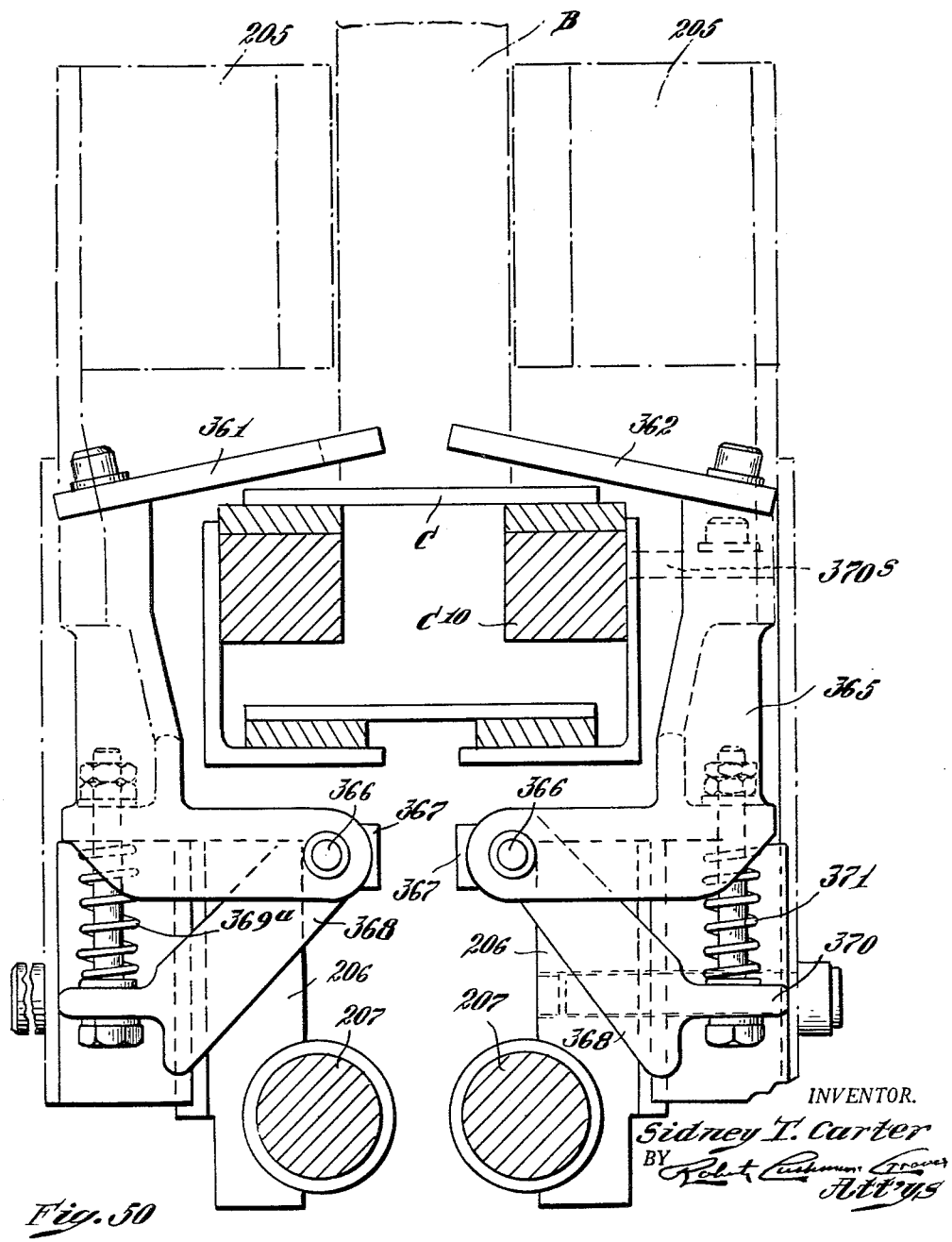
Figs. 53, 54 and 55 are diagrammatic plan views showing the wipers in successive positions of operation.
Figure 54:
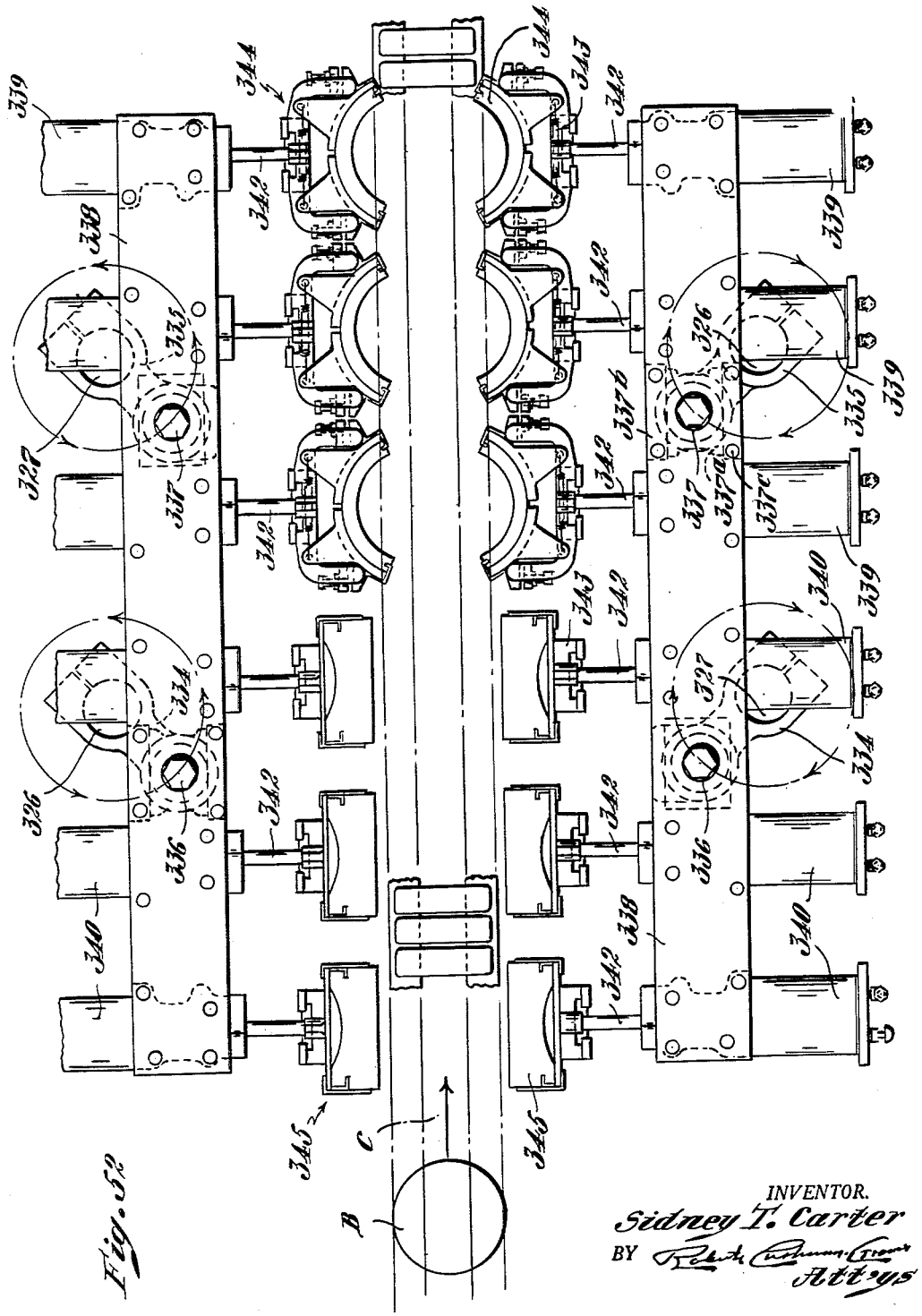
Figure 55:
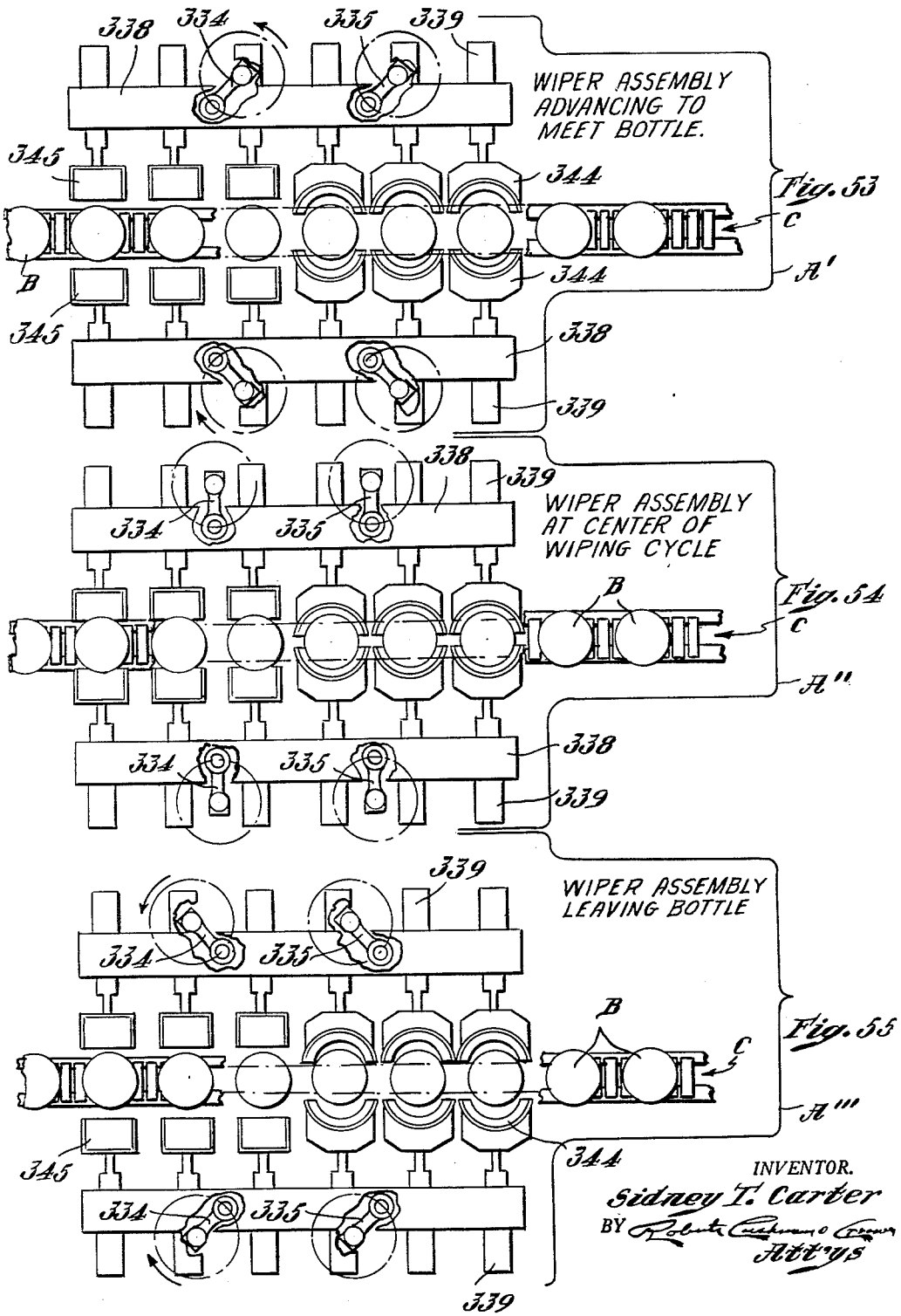

Outside of the article path, at the front and rear wiping stations L (Figs. 39 and 40), there are provided elongate casings or housings 325 and 325$^a$, respectively, each casing having bearings fixed in upstanding hollow casings 325$^m$ for a pair of vertical shafts 326 and 327 respectively. Since the wiping devices at opposite sides of the machine are identical in construction, the arrangement shown in Fig. 39 will be described, but reference characters indicating similar parts are applied to the arrangement shown in Fig. 40. At their lower ends the shafts 326 and 327 are provided with beveled gears 328 and 329 respectively, which mesh with corresponding bevel gears 330 and 331 keyed to a horizontal shaft 332 provided at its outer end with a double sprocket 333 which receives a sprocket chain (not shown) passing about a sprocket wheel fixed to the main shaft 119 of the machine, the gearing ratio being such that each shaft 326 and 327 turns once for each rotation of the main shaft. To the upper end of each of the shafts 326 and 327 there is secured a crank arm 334 and 335 respectively (Fig. 52), each provided with a crankpin 336 and 337 respectively. The parts are so arranged that lines drawn through the centers of the cranks and their corresponding crankpins will be parallel to each other in all positions of the shafts 326 and 327. The crankpins 336 and 337 are journaled in suitable bearings provided in an elongate housing 338 (Figs. 52 and 61) which extends throughout the length of the wiping station, and which supports two sets of cylinders 339 and 340, each set, as illustrated in Fig. 52, consisting of three cylinders with their axes parallel and horizontal, the axes of these cylinders being spaced apart a distance equal to the spacing of the articles which are to be labeled simultaneously. Within each of the cylinders (Fig. 61) there slides a piston 341 having a piston rod 342. The outer ends of these piston rods carry brackets 343 supporting the wipers 344 or 345, the wipers which are carried by the piston rods of the first three cylinders being preliminary wipers, for example of the resilient cushion type, while the wipers 344 carried by the pistons of the last three cylinders 339 may be of another type, for example of that type in which spring-pressed arcuate arms carry a flexible pad adapted to embrace a substantial arc of the periphery of the bottle. However, while these particular types of wiper are herein shown by way of example, it is to be understood that any desired type of wiper may be employed. Moreover, as above suggested, the number of wipers in each set may be varied as desired, for example, there may be more than three or less than three in each set, depending upon the type of article to be labeled and the character of the label to be applied. Each wiping device is designed to compress approximately ⅜″ when contacting the bottle. Since the bottle-contacting face of the wiper is of rubber or similar resilient material and must be compressed before the piston starts to move, the air pressure is such that the wiper itself compresses a distance of from 3/16″ to ¼″ and the rest of the compression is taken up by the air in the cylinder. Thus as soon as the piston 341 starts to move, there is a maximum compression against the bottle which is determined by the air pressure in the line. The cylinders 339 and 340 are of substantial length to allow a substantial movement of the wiper in the event that it should contact a bottle which is not properly positioned, thus avoiding breakage of the bottle or of the machine.

As above noted, since the bottle is traveling along the article path at a uniform linear velocity, and since the wiper-supporting housing 338 has a rotary motion in a horizontal plane, being supported by the parallel cranks 334 and 335, it follows that if the cranks were to turn at uniform angular velocity there would be only one point in the cycle at which the wiper and bottle would be moving at the same speed. For example, assuming that the bottles are spaced 5½″ on center and there are three bottles to be labeled at the same time, the circumference of the crank arm must be approximately 16½″, which is equal to three times the 5½″ spacing. Obviously, to insure application of the label, the bottle must be wiped during an interval of time exceeding that at which the wiper and bottle would be traveling at the same speed if the crank arms were turning at uniform angular velocity. Mathematical calculations and actual tests have shown that the wiper should have a theoretical compression of ⅜″ on each side, that is, if the wiper were solid and not itself yieldable so that the entire motion would be absorbed in the travel of the air cylinder.

In accordance with the present invention provision is made for varying the angular velocity of the cranks during each cycle of operation. In the present machine the wiper first contacts the bottle at the point indicated on the timing chart (Fig. 9) at 213° and it leaves the bottle at the point 276° on the same chart.

To avoid the necessity for an impractical degree of accuracy in the spacing of the axes of shafts 326 and 327 (Fig. 39) and the crankpins 336 and 337 (Fig. 52), the bearing for the crankpin 37 (Fig. 52) is arranged to slide between two parallel plates 337$^a$ and 337$^b$ fixed to the wiper assembly housing 338. Although the motion of the bearing 337$^a$ relatively to the guide plate is very small, for example, two or three thousandths of an inch, it is sufficient to avoid cramping of the parts, even though the axes of the shafts and cranks may not be spaced exactly the same distance apart. In order to permit the several cranks to be adjusted to the proper relative positions, each crank arm may be split, at that portion having the opening for the reception of the shaft 326 or 327 respectively, and bolts may be provided for drawing together the portions of the crank at the opposite sides of the split, this being a conventional method of securing a crank arm to a shaft with provisions for adjustment.

Figure 56:
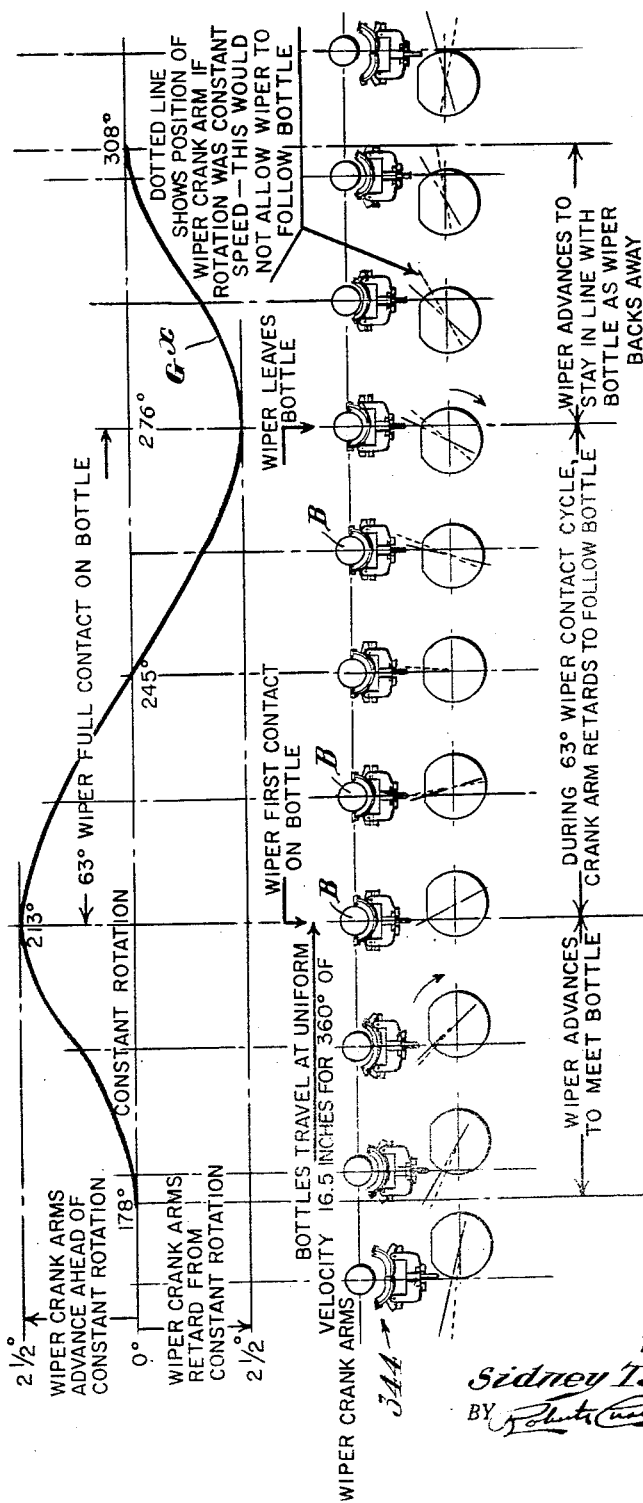
Fig. 56 is a diagram illustrating the paths of movement of the wipers as they move from inoperative position into contact with the article and then recede from operative position.

As above noted, it is necessary that the wipers travel in contact with the bottles for a substantial distance to insure proper adhesion of the labels, and in order to accomplish this result provision is made for turning the shafts 326 and 327 at a varying angular velocity during each cycle of the machine, although the shafts receive their drive from the main shaft which turns at constant angular velocity. Figs. 52 to 56 of the drawings illustrate the relative motions of the wipers and the bottles during a cycle of operation. In Fig. 56 the graph $G^x$ indicates those portions of the cycle during which the crank arms 334 and 335 are swinging toward the article path and away from the article path respectively, while in the lower part of the same figure the positions of successive bottles moving along the article path are indicated with the corresponding positions of the crank arms, the dotted lines indicating the positions of the crank arms if the cranks were driven at a constant angular velocity, while the full lines indicate the actual positions of the crank arms by reason of the variable speed mechanism of the present invention.

Figure 57:
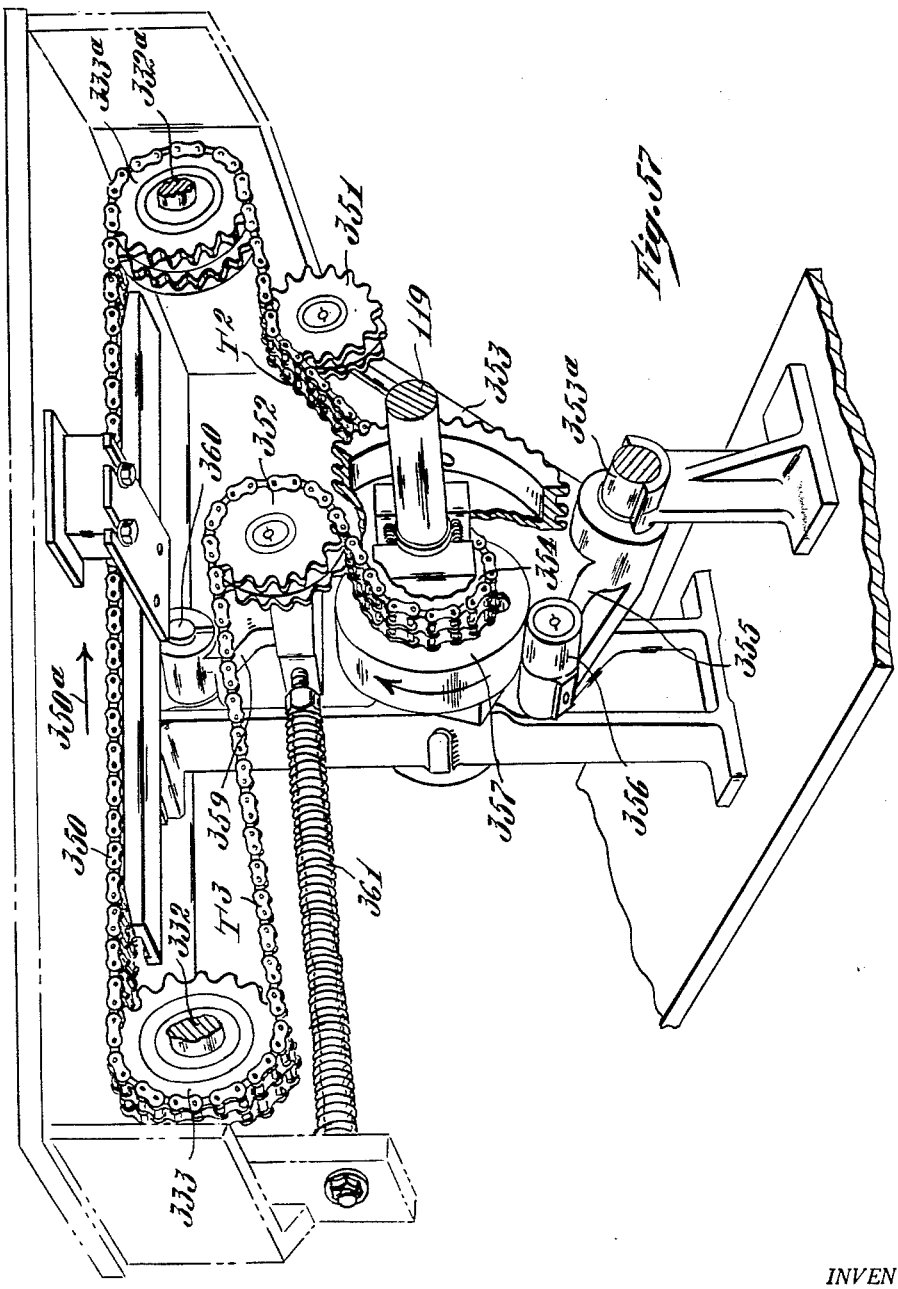
Fig. 57 is a diagrammatic perspective view illustrating the mechanism whereby the angular velocity of the wipers is varied.

Referring to Fig. 57, which shows the connections for imparting variable angular velocity to the wiper-actuating shafts 332 and 332$^a$ at opposite sides of the machine, a sprocket chain 350 is shown as passing about the sprocket wheels 333 and 333$^a$ (Figs. 39 and 40) mounted on the shafts 332 and 332$^a$, this sprocket chain also passing about an idler pulley or sprocket 351 and about the drive sprocket 354 fixed to the main shaft 119 and then about a second idler sprocket 52. This chain travels in the direction of the arrow 350$^a$ (Fig. 57). The idler sprocket 351 is carried by on arm 353 of a bell crank lever which is mounted on a shaft 353$^a$ suitably supported in bearings in the machine frame beneath the main shaft 119, this bell crank lever having a second arm 355 which carries a cam follower roll 356 which engages the peripheral surface of a cam 357 mounted on the main shaft 119. The idler pulley 352 is mounted on a lever 359 pivotally supported at 360 and which is urged in a counterclockwise direction as viewed in Fig. 57 by a long compression spring 361. That portion of the sprocket chain 350, indicated at $T^2$, and which extends from the sprocket 333$^a$ to the drive sprocket 354 is the tight side of the chain. The spring-pressed idler 352 keeps the chain under proper operative tension at all times. The cam 357 is so contoured as to swing the lever arm 353 up or allow it to move down, and such motion of the lever arm, through the sprocket wheel 351, causes the tight portion $T^2$ of the chain to deviate more or less from a straight line between the sprockets 333$^a$ and 354. When the arm 353 is moved up (since the sprocket 354 is turning at uniform angular velocity), the result is to pull the sprockets 333$^a$ and 333 ahead at faster than their normal angular velocity, and when the arm 353 moves down and thus allows the portion $T^2$ of the chain to become more nearly straight, the spring 361 swings the lever arm 359 so that the sprocket 352 tends to pull the portion $T^3$ of the chain in the reverse direction, thus slowing the angular velocity of the cranks. As above noted, Fig. 56 of the drawings indicates the variation in angular velocity resulting from the employment of the mechanism shown in Fig. 57.

Figure 48:
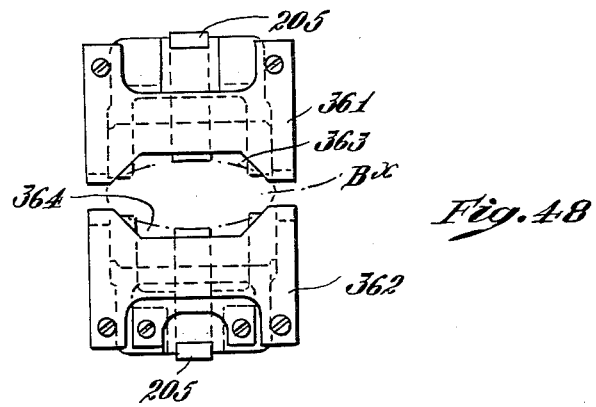
Fig. 48 is a plan view of a secondary spotting device useful in squaring up non-circular articles such as pint flasks when such articles are not perfectly aligned as they leave the feed screw.
Figure 51:
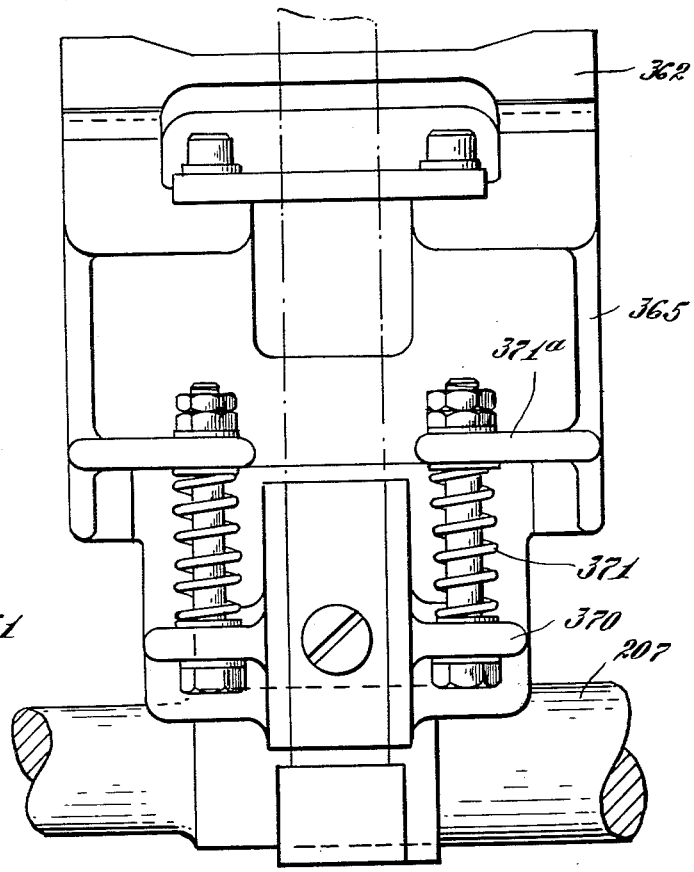
Fig. 51 is a fragmentary elevation looking from the left-hand side of Fig. 49.

When the bottles are not truly circular, for example, of more or less oval shape in cross section like customary pint flasks, they do not always leave the feed screw with the longer horizontal axis of the bottle exactly in line with the center line of the article path. In this connection it may be observed that bottles of the same size and type may not all be of the exact same width or thickness due to manufacturing tolerances, and that the feed screw does not center the bottles with reference to their center lines but by contact with the outer surface of the bottle. In order to orient the bottles so that their longer axes will be exactly parallel to the conveyor path, a straightener device (Figs. 48, 49, 50 and 51) is associated with each grip finger. Each straightening device comprises a pair of plates 361, 362 (Fig. 48), these plates being associated respectively with the grip fingers at opposite sides of the machine. The inner edges of these plates are provided with recesses 363 and 364 respectively, which are so contoured as, by contact with the outer surface of a bottle gripped between the plates, that the bottle is constrained to turn until its longer axis is parallel to the conveyor path. In Fig. 48 the character $B^x$ indicates a bottle of generally elliptical contour (shown in broken lines) gripped between the opposed edges of the plates 361 and 362.

Each of these plates is attached to the upright arm 365 (Fig. 49) of a lever fixed to a shaft 366 which turns in bearings in a part 367 secured to the corresponding grip finger holder 206. A bracket 370 carried by the holder for the grip finger supports the lower end of a compression spring 371 whose upper end bears against a lug 371$^a$ (Fig. 51) projecting from the lever arm 365. Thus, referring to the lever arm 365 at the righthand side of Figs. 49 and 50, the spring tends to turn this arm in a counterclockwise direction. At the opposite side of the machine a spring 369$^a$, which is lighter than the spring 371, tends to turn its lever arm 365 in a clockwise direction. The movement of the plate 362, at the front of the machine, toward the bottle is limited by a stop 370$^s$ (Fig. 50) carried by the arm 365, and which is arranged to engage the conveyor guide $C^{10}$ so that the inner edge of the recess 364 in the plate 362 always stops in exactly the same position relatively to the center line of the article path. On the other hand, the lever arm 365 at the rear of the machine which is urged forwardly by the lighter spring 369$^a$ (Figs. 49 and 50) is not limited as to its inward movement except by contact with the bottle. The plates 361 and 362 are so located, with reference to the grip fingers that their edges contact the bottle below the area to which the label is to be applied and just before the label is applied to the bottle by the grip fingers.

When the shafts 207 are rocked so as to carry the grip fingers 205 inwardly in opposite directions toward the bottle, the springs 371 and 369$^a$ yieldingly urge the arms 365 so as to bring the edges of the plates 361 and 362 into contact with the opposite sides of the bottle. The contact of the edges of these plates with the bottle properly orients the latter, and because the plate 362 always stops in the same position, corresponding faces of all of the bottles are brought into accurate alignment. As the grip fingers continue to move inwardly to affix the labels to the bottle, the springs 371 and 369$^a$ yield, thus permitting the plates 361 and 362 to remain in contact with the bottle while the grip fingers themselves continue to move inwardly into the operative position.

When the machine is without bottles properly positioned to receive labels, it is important that no labels be picked from the label magazine. For this purpose a solenoid 234 is provided (Figs. 13, 15, 16, 17, 17$^a$ and 25) which controls the position of a lever 235 (Fig. 17$^a$) provided at one end with a roll 236. So long as the solenoid is energized it holds the lever in the horizontal position of Fig. 17, but when the solenoid is deenergized the roller end of the lever is permitted to drop (its movement being limited by a stop rod 237). When the lever thus drops the roller 236 enters a recess in the upper end of the normally vertical arm of the bell crank lever 238 which is pivoted at 239 to the upper end of the link 182 as above described, said arm being normally kept in alignment with the link 182 by a tension spring 240. The parts as thus provided constitute a knuckle joint similar to that disclosed in the patent to Carter 2,573,182, October 30, 1951, such that under normal conditions upward motion of the link 182 rocks the picker shaft 175 by means of bell crank lever 238 and crank 175m to carry the pickers up into label-picking position. However, when the rocker 236 engages in the recess in the upper end of the upstanding arm 238 of the bell crank, the knuckle joint is thus broken as the link 182 rises, so that the picker shaft 175 is not turned sufficiently to contact the picker with a label in the magazine. The connections are so designed that the engagement of the roll 236 in the recess in the upper end of the bell crank arm 238 takes place just as the transfer roll 197 reaches the ends of the pickers on its gum-applying stroke, during which it coats the pickers with gum. This timing is desirable, since if the arm 238 were rocked before the transfer roll reached the ends of the pickers, the pickers would be left without glue and thus the label would be insufficiently coated with glue. When the solenoid 234 is energized the lever 235 is pulled up to the horizontal position of Fig. 17, thus permitting the linkage comprising the parts 238, 240, etc. to actuate the picker shaft 175 in normal manner. Current is thus applied to the solenoid 234 by a microswitch 244 (Fig. 25), which is closed during a part of each cycle by a cam on shaft 119, assuming that during this part of the cycle, which, as determined by the cam, occupies 335° of rotation of the main shaft, three bottles are properly positioned in the feed screw 153, so that all of the arms 171, 172 and 173 are moved away from their normal dotted line positions (Fig. 10). The microswitches herein referred to are of conventional type. Thus, for example, as indicated in Fig. 29, the switch 244 has the actuating pin 229 which is pushed inwardly for closing the circuit by one arm 230 of a bell crank lever whose other arm 231 carries a cam follower roll 232 which engages the peripheral edge of the cam 233 mounted on the main shaft 119. There are five of these microswitches which are used to control the stopping of the labeling machine. These microswitches indicated generally by the character M$^s$ (Fig. 29) are mounted on a bracket M$^x$ (Fig. 29) in such relation to the main shaft 119 that the cam follower rolls of each of the several switches may be actuated by a suitably contoured cam as the main shaft rotates.

The microswitches 168, 169 and 170 (Fig. 25) are in series. The parts are so arranged that these switches are actuated approximately 15° of the cycle before the switch 244 breaks circuit. The bottles keep the switches 168, 169 and 170 closed for a period of approximately 55° of the cycle. This means that these switches are holding the circuit closed for approximately 15° after switch 244 closes the circuit, so that when the machine is running and is full of bottles the action of switches 168, 169 and 170 overlaps the operation of switch 244, so that solenoid 234 is kept energized under normal conditions (solenoid 234 being permitted by its controlling cam to remain closed for the entire 360° of the cycle, except for the 335° above referred to). Thus the solenoid 234 remains energized so long as bottles are in position to keep the switches 168, 169 and 170 closed simultaneously. However, if for any reason a bottle is missing from the series, so that one or another of the switches 168, 169 and 170 is not closed, then, because these switches are in series, the rock arm 235 is permitted to drop and thus the normal motion of the picker is so modified that it cannot pick a label from the magazine. It may be noted that the switches 168, 169 and 170 are actuated three times during each cycle of the main shaft, but although they are actuated three times during each cycle, only one of these actuations of this set of switches is controlling upon the operation of the pickers. Another switch 246 (Fig. 25) actuated by a cam 247 (Fig. 26) is also connected into the circuit with the switches 168, 169 and 170, but using the opposite side of the switch with a three-wire connection, as indicated in the wiring diagram (Fig. 25). This switch 246 controls the sounding of a horn K (Fig. 25), the parts being so arranged that the horn will blow whenever bottles pass through the feed screw 153, but in insufficient numbers to keep the solenoid 234 constantly energized. Since bottles can go through at random, either singly or in groups of two or more, there is always the possibility that labels will not be applied because the machine will not pick a label unless there are three bottles in the proper sequence simultaneously to close the switches 168, 169 and 170, and thus to receive labels simultaneously. Under these circumstances the horn blows to tell the operator to watch for the unlabeled bottle or bottles at the discharge end of the machine.

The starting of the machine is normally controlled through the action of a manually operated switch 247 (Fig. 25), which controls the circuit of an electrical clutch 248 (Figs. 4, 5, 25 and 26). However, in order to make certain that the labeling machine will stop when the transfer roll is away from the gum-applying roll and also away from the pickers, the circuit of the electric clutch 248 (Fig. 26) also includes a normally open switch 248$^a$ which is kept closed, except for a short period during each cycle by a cam 248$^b$ fixed to the main shaft. This cam is adjustable on the shaft so that it may be set properly to insure stopping of the machine at the proper instant in the cycle. For convenience it is desirable to provide such a manually operable switch for controlling the clutch at all four corners of the machine.

Another switch 250 is included in this circuit, this switch being located on an accumulating table 251 (Fig. 4) at the delivery end of the machine. If, when the machine is running, the free discharge of bottles from the delivery end of the machine should be interfered with, for example by the stoppage of the receiving machine so that bottles tend to back up into the labeling machine, the switch 250 will respond to the pressure of bottles entering the accumulating table and thus break the circuit to stop the machine in the normal stopping position. This is a safety device, for when the machine is operating at a rate of three-hundred bottles per minute it is almost impossible for the operator to stop the machine manually in time to prevent bottles from backing up into the wiping station.

A second circuit is provided, by means of which the machine may be stopped in the event of an emergency, without reference to its stopping at some particular point in the cycle. This emergency circuit is provided with manually actuable push-button switches 253 located at the four corners of the machine. Two additional switches, one of them the switch 254 (Fig. 10) are arranged in series in this emergency circuit. Under most conditions bottles which enter the receiving end of the machine, slightly out of position, will be properly positioned in the feed screw by the hinged gate 156. However, if a bottle tips or continues to enter the conveyor path out of time with the feed screw, it will eventually be forced against a resiliently yieldable portion 255 of the guide rail 103 at the opposite side from the feed screw and will force this yieldable portion 255 of the guide rail outwardly, thus operating the microswitch 254 to break the emergency circuit. This yieldable portion of the guide rail is guided and urged inwardly by rods and springs in the same way at gate 156. A movement of approximately ⅛″ of the yieldable rail 255 will thus actuate the switch 254. The second of these automatic emergency switches is indicated at 256 (Figs. 25, 30 and 59). This switch is located at the receiving end of the hold-down device, and is controlled by a bell crank lever having one arm 257 which is positioned for actuating the switch, and a second arm 258 which carries a roll 259 positioned to be engaged by bottles which are abnormally tall, for example a bottle whose screw cap has not been turned all of the way down. The resiliency of the blocks H⁴ of the hold-down device is sufficient to take care of variations in bottle height of approximately 3/16″, but when a bottle exceeding the normal height by more than this amount approaches the hold-down device, it will contact the roll 259.

When the microswitches 160 and 161 are not closed by bottles entering the feed screw, air is fed through the solenoid valve 324 which then positions the motor M to drive the main shaft at slow speed. The Reeves speed changer (Fig. 27) is manually adjustable by means of the nut N on the screw-threaded rod 127 to determine what this low speed shall be when the air pressure has moved the piston to the end of the cylinder. When bottles arrive in position to close the switches 160 and 161, the time delay relay 160ª (Fig. 25) keeps solenoid valve 324 from opening for a predetermined period of time. At the end of this time interval solenoid valve 324 operates to cut off the air supply to the cylinder and exhaust air from the cylinder. The spring of the Reeves drive then forces the motor to the high speed position and returns the piston in the cylinder to the opposite end of the cylinder. The rate of speed increase is controlled by the strength of the spring and by the adjustment of valve 316. A muffler 318$^x$ is provided to reduce the noise of air exhaust. If the spring of the Reeves drive does not return to high speed at the proper rate, an additional spring may be employed for balancing the rate of travel with the control valve. When a bottle is missing at either of switches 160 or 161, the respective switch will open, causing solenoid valve 324 to close instantly, thus delivering air to the air cylinder 130 and causing the motor to move to the slow drive position. The rate at which the motor returns to the slow position is controlled by the air pressure regulator 316. If a bottle follows after the first empty space in the feed screw, switch 160 will close, but the motor will still remain at slow speed until the time delay relay 160ª is satisfied, after which it returns to high speed. The time delay is necessary in the labeler to satisfy the no-bottle, no-label system of control. It is desirable to run the labeler at slow speed when not applying labels. In addition it is better to have a surplus of bottles ahead of the feed screw at all times, and the time delay automatically provides this operating condition.

The vacuum pump V$^p$ is driven by an auxiliary motor whose circuit is shown in Fig. 25.

At the left-hand end of the machine (Figs. 1 to 5) there is arranged a large wheel W$^x$ (for example, 16 inches in diameter) whose periphery is graduated in degrees, and which may be employed for turning the main shaft manually (the drive clutch being disengaged) while adjusting the various parts to insure proper timing.

Since the operations of the various parts of the machine are coordinated electrically, the electrical circuit and its component parts are briefly reviewed as follows with reference to Fig. 25 of the drawings, wherein the several electrical circuits are designated by the characters I, II, III, III–A, IV, V, VI, VI–A, VII and VIII.

CIRCUIT NO. I.—VACUUM PUMP START-STOP CIRCUIT

Pushing the Pump Start button IX energizes the vacuum pump magnetic starter X, closing the contacts of starter X across the start button and three contacts in the vacuum pump motor circuit, starting the vacuum pump.

Pushing the Pump Stop button XI deenergizes the magnetic starter X and opens the contacts at X stopping the vacuum pump motor.

CIRCUIT NO. II.—DRIVE MOTOR START-STOP CIRCUIT

Pushing the Drive-Start button XII energizes the drive magnetic motor-starter XIII, closing the contact across the Drive Start button and the three contacts in the drive motor circuit, starting the drive motor.

Pushing either Drive Stop button XIV deenergizes the magnetic starter XIII, opening its contacts and stopping the drive motor.

The actuating of any of the emergency stop buttons 253; the switch 254 or the switch 256 also immediately deenergizes the magnetic starter and stops the drive motor.

CIRCUIT NO. III.—MACHINE START-STOP CIRCUIT

Pushing the Start button XV energizes the relay XVII, closing the contacts across the Start button XV; the contacts of relay XVII in circuit No. VI; and the contacts of relay XVII in circuit No. VII which energizes the clutch 248 and starts the main shaft 119 of the machine. Switch 248ª is a cam-operated microswitch which opens once every cycle. Holding any of the stop buttons or switch 250 open will deenergize the relay XVII as soon as the switch 248ª comes to the open position in the cycle. The deenergizing of relay XVII opens the three relay contacts and thus deenergizes the clutch and stops the main drive shaft 119. By adjusting the switch 248ª the main drive shaft 119 can thereby be stopped in any prescribed point in the cycle. The purpose of the Hand-Auto switch XVI in this circuit is explained hereinafter. With the machine running, this switch is maintained in the Auto position.

CIRCUIT NO. III–A.—HORN CIRCUIT

For the horn K to be energized, the relay XIX must be deenergized; the relay XX must be deenergized; and the switch 246 must be closed. The switch 246 is a cam-operated microswitch which closes once every cycle. This switch closes at the same time in the cycle that the switch 244 is actuated to connect points a and b of the circuit. With the Wash-Run switch XXI in the Run position as shown in Fig. 25 and the Hand-Auto switch XVI in the Auto position, in order for relay XIX to be deenergized there must be less than three bottles in the feed screw (switches 168, 169 and 170 being in series in circuit No. VI). Also in order for the relay XX to be deenergized there must be one or more bottles in the feed screw because of switches 168, 169 and 170. Consequently, if there are one or two bottles in the screw and in the correct time relationship with switches 244 and 246 the horn will blow.

CIRCUIT NO. IV.—VACUUM VALVE CIRCUIT

Switch 228$^x$ is a cam-operated microswitch which closes for a fixed period once every revolution and when closed energizes the three-way solenoid-operated vacuum valve 228$^b$.

CIRCUIT NO. V.—AIR PRESSURE VALVE CIRCUIT

Switch 228$^n$ is a cam-operated microswitch which closes for a fixed period once each cycle and when closed energizes the two-way solenoid-operated air pressure valve 228$^m$.

CIRCUIT NO. VI.—LABEL CONTROL CIRCUIT

In this circuit is the label control solenoid 234, which determines whether or not the machine picks labels. When solenoid 234 energized, the machine will pick labels. Since the machine labels three bottles at a time, the circuit is designed so that if only one or two bottles pass through the machine they will not receive a label, that is, solenoid 234 will be deenergized. Switches 168, 169 and 170 (located opposite the feed screw) determine whether bottles are present or not. These switches are timed with the label station by means of the switch 244. At a prescribed time once each cycle, the switch 244 connects points a and b of the circuit. If there are three bottles in the feed screw, the circuit is closed to energize solenoid 234 and the relay XIX also is energized, closing the switch 244 and connecting points c and d of the circuit; and opening the circuit between e and f of the circuit. The circuit which is thus closed between points c and d remains closed for one cycle until such time that the switch 244 again connects points a and b to again detect if there are three bottles in the screw.

CIRCUIT NO. VI–A.—RELAY XX AND TEST LIGHT CIRCUIT

With no bottles in the feed screw and switches 68, 69 and 70 open, the relay XX and the test-light T$^x$ are energized. Relay XX has contacts which close to connect points $a$ and $g$ of the circuit to allow the operator to energize the label control solenoid 234 (when turning the machine over by hand), by reaching up and tripping the switch 168. This is done with the Hand-Auto switch XVI in the Hand position. The relay XX also has contacts to connect points $f$ and $u$ in the horn circuit No. III–A. The purpose of the test-light T$^x$ is to assist the operator in the setting of the switches 168, 169 and 170. The light will go not by tripping any one of these three switches. Bottles should trip these switches during a definite portion of the cycle as can be checked by means of the graduated hand wheel W$^x$.

CIRCUIT NO. VII.—RECTIFIER AND CLUTCH CIRCUIT

The rectifier R$^x$ supplies D.C. voltage to the clutch 248. Condenser C$^x$ is across the clutch to minimize arcing of contacts in relay XVII. Closing contacts of relay XVII energizes the clutch and starts the machine.

CIRCUIT NO. VIII.—TIME DELAY AND AEROMATIC DRIVE CIRCUIT

The solenoid-operated air valve 324 controls the delivery of air to the cylinder of the speed changer. The low speed position is with valve 324 deenergized and with air pressure in the cylinder 130. The high speed position is with solenoid valve 324 energized and the cylinder exhausted to the atmosphere. Switch 160 is located opposite the feed screw at the front of the machine. Switch 161 is located adjacent to the conveyor at the front of the machine. With the Hand-Auto switch XVI in the Auto position and the Wash-Run switch XXI in the Run position, the closing of switches 161 and 160 by bottles energizes the time-delay relay 160$^a$. After the time-delay expires the contacts of the relay connect points $k$ and $m$ of the circuit and thus energizes solenoid 324, and the machine goes into high speed. The opening of either of these two switches 160 or 161 deenergizes the time-delay relay 160$^a$, separates its contacts and deenergizes the solenoid 324 and the machine drops down to low speed.

Selector switches (1) *Wash-Run.*—The Run position of switch XXI (shown in Fig. 25) is used during normal production. The wash position (not shown) is used during the washing of the gum roll, the transfer roll and pickers. In the Wash position of switch XXI the circuit between points $p$ and $q$ is broken to make the vacuum pump motor X inoperative during the wash period.

The switch XXI now holds closed a circuit between the points $c$ and $a$ to maintain the two label-control solenoids 234 and 234$^a$ energized thus eliminating unnecessary operation of the label-control mechanism.

The switch XXI, by breaking the circuit between points $s$ and $k$ prevents high speed operation during the wash period by maintaining the solenoid valve 324 deenergized.

(2) *Hand-Automatic.*—The Hand-Automatic selector switch XVI is maintained in the Auto position during normal production. The Hand position is used when it is necessary to check the functioning of the various machine components by turning the machine over by hand, using the hand wheel.

The contacts of switch XVI are separated as shown in Fig. 25, to prevent the starting of the machine, when the switch is in the Hand position.

The contacts of switch XVI are closed to connect points $c$ and $t$ when in the Hand position to supply voltage to the solenoid valves 228$^b$ and 228$^m$.

The contacts of switch XVI are positioned to connect points $t$ and $v$ when in the Auto position to supply voltage to the solenoid valves 228$^b$ and 228$^m$.

The purpose of the contacts of switch XVI which connect points $c$ and $g$ is explained with respect to circuit No. VI–A above.

The contacts of switch XVI which break the circuit between points $c$ and $s$ when the Hand position prevent high speed operation by maintaining the solenoid valve circuit 324 open.

Label—No Label

The Label—No Label switch XXIV is maintained in the Label position during normal production.

When the contacts of switch XXIV are separated, that is in the No-Label position, a full supply of bottles is allowed to pass through the machine without receiving labels by maintaining the circuit of label-control solenoid 234 open.

When the contacts of switch XXIV are set in the No-Label position the points $f$ and $e$ are connected in circuit to energize the horn K even though there is a full supply of bottles entering the machine.

Control panel

The control of the machine by the use of the push buttons (Fig. 48) in the control panel P$^r$ at the right-hand end of the machine, as viewed in Fig. 1, is substantially as follows: For starting the drive motor of the machine the button XII is pressed in, but the drive motor will not start if either of the safety switches 254 or 256 is open at this time. To stop the drive motor the button XIV is pressed.

After the motor has been started by pressing the button XII the main drive shaft 119 may be started by pressing the button XV. However, when the motor is running, but while the main drive shaft 119 is standing still, the gum rolls are driven slowly by the sprocket wheel 261 as above described. This energizes relay XVII which closes the contacts in the circuit of clutch 248; at the same time other contacts in this relay XVII complete the label control circuit VI. If, when the button XV is pressed the Hand-Auto switch XVI is in the Hand position the machine will not start. If the Hand-Auto switch is in the Auto position, pressing of the button XV also completes the circuit for putting into operation the valves 228$^b$ and 228$^m$. To stop the operation of the main shaft the button S$^b$ is pressed thus deenergizing the relay XVII but in order to accomplish this the button S$^b$ must be held in until the cam operated stop switch 248$^a$ reaches the circuit breaking position. The button 253 is an emergency stop button and pressing this button immediately breaks the drive motor circuit and stops the entire machine. Both the buttons XII and XV must again be pressed in order to start the machine into operation. Pressing the button IX starts the vacuum pump V. However, this pump cannot be started so long as the Wash-Run switch XXI is in the Wash position. During the normal operation of the machine for applying labels the vacuum pump must be in operation. The pressure of button XI stops the vacuum pump. The button XXI is set in the Run position during normal label operation but is turned to the Wash position in preparation for washing the gum roll and associated parts. When in the Wash position the vacuum pump D cannot be started and the solenoid valve 324 is open so that the machine cannot run at high speed. At the same time the label control solenoid 234$^a$ is energized so that the label control mechanism does not operate. When the button XXIV is in the Label position the labeling devices are in normal position for operation. When this button is turned to the No-Label position the machine will run but will not apply labels, since the label control circuit is open, at the same time the horn circuit is closed so that the horn will blow at every revolution of the machine.

The button XVI is set to the Auto position during normal operation. It is set to the Hand position when it is necessary to check the operation of the machine by turning it over by means of the hand wheel W$^x$. When in the Hand position the Start circuit II is opened so that the machine cannot be started; the vacuum valve 228$^b$ and the air pressure valve 228$^m$ are now connected into the circuit for operation and the label control circuit can be energized by actuating either of the switches 168, 169 or 170 by hand. At this time the solenoid valve 324 is open so that the drive motor will not be coupled to the main shaft of the machine.

While the apparatus herein described and illustrated represents one embodiment of the invention, it is to be understood that the invention is broadly inclusive of any and all modifications thereof included with the appended claims.

I claim:

1. In combination in a labeling machine having means defining a path along which the articles to be labeled are moved uninterruptedly and in succession by a conveyor and to which articles are delivered from a supply, the machine comprising devices for applying labels to the articles as the latter move along said path, means for driving the conveyor and label-applying means at a predetermined relatively low speed so long as no articles are supplied to the article path, and speed changing means, responsive only to the reception, at the entrance of said path, of a predetermined number of articles in contact with each other, to increase the speed of operation of the conveyor and label-applying means to a predetermined maximum.

2. A labeling machine of the kind wherein articles to be labeled are moved uninterruptedly along a predetermined path, a conveyor device for so moving the articles, label applying means, variable speed drive means for the conveyor and label-applying means, said variable speed drive being so designed as to drive the conveyor and label-applying means at a predetermined minimum speed even though no articles are being delivered into the article path, and means responsive to the entrance of articles in a predetermined spaced relation into said path for increasing the drive speed to a maximum.

3. Apparatus according to claim 2, comprising means operative to delay, for a predetermined period of time, the shift from minimum to maximum speed when articles in properly spaced relation enter the conveyor path.

4. In combination in a labeling machine having conveyor means for moving articles to be labeled along a predetermined path, and means for applying labels to the articles while they are in said path, motor means, means for transmitting motion from the motor means to the conveyor means and to the labeling means, said transmission means comprising speed changing mechanism, the latter being so designed as to drive the conveyor and label-applying means at a predetermined low speed in the absence of articles from said path, and control means responsive to the approach to said path of a plurality of articles, spaced apart a predetermined distance, to increase the speed of the conveyor and label-applying means up to a predetermined maximum.

5. In combination in a labeling machine comprising a conveyor for advancing articles along a predetermined path, means for supplying articles to said conveyor, a variable speed drive operative to move the conveyor at either of two predetermined speeds, respectively, detector means responsive to the presence of articles arriving from the supply and located at a predetermined distance from the entrance to said path, and means controlled by the detector means for adjusting the variable speed drive to drive the conveyor at one or the other of said predetermined speeds for adjusting the variable speed drive.

6. In a labeling machine of the kind having means for moving bottles in succession along a predetermined path while spaced apart a distance less than the diameter of a bottle and which comprises means operative simultaneously to apply a label to each of the bottles which collectively constitute a selected group of those within said path without interrupting the motion of the bottles along the path, means for delivering bottles into said path, a plurality of detector devices, in number corresponding to the number of bottles constituting such group, each detector device being arranged to respond to the presence of a bottle within the entrance portion of said path, and means operative to prevent actuation of the label-applying means except when all of said detector devices are concomitantly responding to the presence of a bottle.

7. A labeling machine according to claim 6 further characterized in having means operative to indicate the advance of successive articles along said path in abnormally spaced relation.

8. In a labeling machine of the kind which comprises means for moving articles uninterruptedly and in succession, one following another along the same predetermined path and which comprises means operative simultaneously to apply labels to each of the articles which collectively constitute a selected group of those moving along said path without interrupting the motion of the articles along said path, means for delivering articles, to form such a group in which successive articles are spaced apart a distance less than the maximum transverse dimension of the article, lengthwise of said path, into the entrance to said path, a plurality of detector elements, in number corresponding to the number of articles constituting each group, each detector element being of a kind which responds to the presence of an article within said path and in a predetermined position relatively to the respective detector element, the detector elements being spaced apart along said path the same distance as that between successive articles constituting such group, and means operative to prevent actuation of the label-applying elements except when all of the detector devices are concomitantly responding to the presence of articles properly spaced apart at the entrance to said path.

9. A labeling machine according to claim 8, wherein the means for delivering articles into the entrance to said path is a helix whose delivery portion at least is of a pitch which equals the correct spacing of articles of a group and wherein the successive detector devices are spaced apart a distance equal to the pitch of said portion of the helix.

10. A labeling machine according to claim 8, wherein each detector element comprises a horizontally swinging finger extending into the article path so as to be contacted by a passing article, each finger being connected to an electrical switch, each switch being normally in circuit-breaking position but being closed when its corresponding finger is swung from normal position by a passing article, motor means for actuating the label-applying elements, the several detector actuated switches being in series in a motor-controlling circuit whereby the motor is deenergized except when all of the fingers are concomitantly swung from normal position by contact with articles within the path.

11. In a labeling machine of the kind wherein articles to be labeled are moved in succession along a predetermined path, means for so spacing the articles that the space between successive articles is less than the maximum transverse dimension of the article, and means operative simultaneously to adhere labels to each of the articles of a group of such articles while said group of articles is moving uninterruptedly along said path, a plurality of label magazines, equal in number to the number of articles in the group, a plurality of sets of pickers, one set corresponding to each respective magazine, means normally operative to move the sets of pickers to take labels from the magazines and to carry them to a transfer station, a plurality of spaced detector devices, in number equal to the number of articles in the group and arranged adjacent to the receiving end of the article path, each detector being individually responsive to the presence of an article at a corresponding predetermined position, and means operative to prevent the pickers from taking labels from the magazines except when all of said detectors are responding at the same time to the presence of articles at said predetermined points.

12. A labeling machine according to claim 11, wherein each of the detector devices comprises a finger normally extending into the article path, and an electrical switch which is open until its finger has been pushed out of its normal position by an article in said path, said switches being in series in a motor circuit, a motor in said circut, and means actuable by the motor for preventing effective operation of the pickers except when all of said switches are closed at the same time.

13. A labeling machine of the kind in which spaced articles are moved uninterruptedly along a predetermined path by an endless conveyor, and having means for applying labels to the articles while they are so moving, the label-applying means being so constructed and arranged as to apply labels simultaneously to all of the articles of a group consisting of a predetermined number of such articles equally spaced from each other, the space between adjacent articles not substantially exceeding the maximum transverse dimension of the article, the label-applying means comprising pickers equal in number to the number of articles in such a group for removing labels from corresponding magazines, means operative to prevent normal operation of the pickers except when a complete group of articles is approaching the label-receiving position, means for moving the articles along said path at a rate of the order of 300 per minute, and means operative to notify the machine operator of the advance of unlabeled articles toward the delivery end of the conveyor path.

14. A labeling machine according to claim 13, wherein the means for preventing normal operation of the pickers comprises a plurality of switches corresponding in number to the number of articles in such a group, the switches being connected electrically in series, and each switch having an actuating arm normally disposed across the article path, adjacent to the entrance to the latter, and so arranged as to be moved to switch-closing position by engagement with an article moving along said path.

15. In combination in a labeling machine comprising means for moving articles in succession along a predetermined path, means operative simultaneously to apply labels to a plurality of articles spaced accurately a predetermined distance apart which does not substantially exceed the maximum transverse dimension of an article as the articles move one after another in tandem relation along said path, and a feed screw for delivering articles into the entrance end of said path, said screw having at its receiving end a portion of constant pitch equal to the horizontal thickness of the article to be labeled, and having at its delivery end a portion of a constant pitch equal to said accurate spacing of the articles.

16. In a labeling machine of the kind wherein articles to be labeled are moved uninterruptedly in succession, one following another, along the same predetermined path and having means for applying labels simultaneously to a plurality of said articles as they are moving along the aforesaid path, conveyor means normally moving at constant speed for moving the articles along said path, one after another in tandem relation, means for supplying articles to the receiving end of said path, and means for spacing the articles as they enter said path, said spacing means comprising an elongate rotating feed screw having its axis parallel to the article path and which is arranged to receive articles from the article-supporting means, the screw being of different pitch at its receiving and delivery ends respectively, the pitch of the screw at its delivery end being such as to space successive articles apart a distance not substantially exceeding the maximum transverse dimension of the article.

17. A labeling machine of the kind wherein a group of spaced articles to be labeled is moved uninterruptedly along a predetermined path with the articles which constitute a group disposed in tandem relation, one following another and spaced apart along said path, a conveyor for so moving the group of spaced articles, means for applying labels simultaneously to all of the articles of the group while they are so moving, one after another, along said path, and means operative to orient each article as it approaches the label-applying position, said orienting means being movable with the respective article along the conveyor path.

18. In a labeling machine of the kind wherein spaced articles are moved, one following another, in succession and in tandem relation along a rectilinear path with successive articles spaced apart a distance not substantially exceeding the maximum transverse dimension of the article, a plurality of sets of label pickers operative simultaneously to take a label for each of the articles constituting a group of successive, spaced articles within the aforesaid rectilinear path, a plurality of stationary label magazines corresponding in number to the number of articles in each group, and means so moving the sets of pickers that they simultaneously remove labels from the respective magazines, and means operative to take labels from all of the pickers simultaneously and to adhere such labels to corresponding bottles while the latter continue to move along said path.

19. In a labeling machine of the kind wherein spaced bottles to be labeled are moved in succession along a single predetermined path and in tandem relation, successive bottles being spaced apart a distance not substantially exceeding the diameter of a bottle, and wherein labels are applied simultaneously to each of a plurality of bottles constituting a group of spaced bottles disposed in tandem relation within the aforesaid path while the group of bottles continues to move along said path and having a plurality of stationary magazines for labels, the magazines corresponding in number to the number of bottles which are simultaneously to receive labels, picker means for removing labels from each of the several magazines, said picker means comprising a shaft, a pair of sleeves slidable axially along said shaft, a pair of picker blades corresponding to each bottle of said group, one picker blade of each pair being fixed to one of said sleeves, and another blade being fixed to the other of said sleeves, the picker blades carried by one sleeve alternating with picker blades carried by the other sleeve, means for moving the sleeves toward and from each other axially of the shaft, and means for rocking the picker blades together with the shaft.

20. In a labeling machine of the kind wherein articles to be labeled are moved, one following another, in succession along a single predetermined path and in tandem relation with successive articles spaced apart a distance not substantially exceeding the maximum transverse dimension of the article, and having means operative simultaneously to adhere labels to each of the articles of a group of the so spaced-apart articles while the articles constituting said group are moving uninterruptedly along the aforesaid path in tandem relation, a plurality of picker sets, in number equal to the number of articles constituting said group, an equal number of stationary label magazines, means operative simultaneously to move the several pickers to take labels from the respective magazines and to carry them to a transfer station, a group of pneumatic grip fingers equal in number to the picker sets and each having a suction port in its label-engaging face, means for moving each grip finger toward the transfer station, and means for establishing suction at the suction ports of the several grip fingers.

21. A labeling machine according to claim 20, having means for bodily moving the suction grip fingers, while they are contacting the labels with the articles, in a direction parallel to the article path and at the same linear speed as the articles.

22. A labeling machine according to claim 20, comprising a rocker on which all of the grip fingers of the group are attached, means for oscillating the rocker to move the grip fingers from a transfer station to the label-applying position, and means for moving the rocker bodily in a direction parallel to the article path.

23. A labeling machine according to claim 20, wherein the means for moving the grip fingers causes them to move a predetermined distance parallel with and toward the delivery end of the article path and then to move parallel to the article path back to the starting point, the means for rocking the grip fingers toward the label-delivery position during the first one-fourth of the motion of the grip fingers toward the delivery end of the path, then to hold the grip fingers in label-depositing position during the next one-half of the motion of the grip fingers toward the delivery end of the path, and then to move the grip fingers away from the article while they are completing the motion toward the delivery end of the path.

24. A labeling machine according to claim 20, comprising means for first establishing suction at the suction ports of the grip fingers just before the grip fingers arrive at the transfer station.

25. A labeling machine according to claim 20, having means operative to break the suction and to build up positive pressure at the ports in the grip fingers just as the grip fingers are ready to deposit the labels on the articles.

26. In a labeling machine in combination, a support for an article to be labeled, means operative to affix a gum coated label to an article on the support, a movable label wiper, and pneumatic means operative yieldingly to hold the wiper in wiping contact with a label affixed to the article.

27. A labeling machine according to claim 26, wherein the pneumatic means for yieldingly holding the label wiper in operative contact with a label affixed to the article comprises a piston having a rod, to one end of which the wiper is attached, a cylinder in which the piston slides, and means for supplying compressed air to the cylinder.

28. In a labeling machine wherein articles are moved uninterruptedly and in series, one following another along a rectilinear path, a carriage located adjacent to and at one side of said path, a label wiper mounted on the carriage, means for supporting and moving the carriage comprising spaced crank arms turning about parallel axes disposed in a plane parallel to the article path, and means for turning the crank arms in the same direction thereby to move the carriage toward and from the article path and also longitudinally of said path, said crank actuating means comprising a part which moves at varying angular velocity such that when the wiper is in wiping contact with the article it travels parallel to said path and at the same speed as the moving article.

29. A labeling machine according to claim 28, comprising means for accelerating the angular velocity of the cranks as the carriage is moving toward the article path and for decelerating the angular velocity of the cranks as the carriage is moved away from the article path.

30. In combination in a labeling machine of the kind wherein articles to be labeled are moved uninterruptedly and at constant speed along a predetermined path, means for adhering a label to each article as the latter so moves along said path means operative so to deliver articles into said path that the space between successive articles does not substantially exceed the maximum transverse dimension of such an article, a wiper for applying pressure to said label and means operative to cause the wiper first to move toward said path and into label-pressing contact with the article then to travel parallel to said path while in contact with the article and then to recede from the article path, said wiper operating means comprising a crank-shaft and a crank-arm fixed thereto, a drive shaft which turns at constant angular velocity, a sprocket fixed to the crank-shaft, a sprocket fixed to the drive shaft, a sprocket chain which embraces said sprockets, an idler sprocket which engages the tight run of the chain, a movable support for the idler sprocket, and means operative to shift said support during each cycle of operation of the machine in such a way as to accelerate the angular velocity of the crank as it is moving the wiper toward the article path, to cause the crank to move at a constant and lesser angular velocity while the wiper is in contact with the article, and to decelerate the angular velocity of the crank as the wiper is moving away from the article path.

31. In a labeling machine, in combination, suction grip fingers arranged to apply labels simultaneously to opposite sides of an article, and article orienting means associated with each grip finger and so arranged as to engage opposite sides of the article and to turn the latter to a predetermined position just before the grip fingers apply the label to the article.

32. A labeling machine according to claim 31 wherein the article orienting means comprises elements which are moved toward the article as the label-affixing parts move toward the article at opposite sides of the latter, there being a spring interposed between each article orienting element and the label-affixing part with which it is associated, whereby the article orienting elements may stop in contact with the article while the label-affixing parts complete their motion, the spring at one side of the article being heavier than the spring at the other side.

33. A labeling machine comprising parts arranged simultaneously to affix labels to opposite sides of an article, each label-affixing part being fixed to a rocker arm, means for rocking said arms toward the article, and article orienting means associated with each respective rocker arm.

34. A labeling machine according to claim 33 wherein the article orienting means is constructed and arranged to contact the article and turn the latter just before the label is applied to the article.

35. A labeling machine according to claim 33 wherein each of the parts for adhering the labels to the article is carried by a rocker arm which rocks about an axis parallel to the article path, and the means for orienting the article comprises an element associated with each rocker arm, said elements, at opposite sides of the article path, being so contoured as by contact with the article, as the rocker arms move toward each other, to orient the article and bring its longer axis in exact parallel relation to the article path.

36. A labeling machine according to claim 33 wherein the article orienting means is relatively movable with reference to the label-affixing part and is arranged to contact the article before the rocker arm completes its operative movement, there being a yieldable connection between the orienting means and the rocker arm, thereby to permit completion of the movement of the rocker arm after the orienting means contacts the article.

37. In combination in a labelling machine of the kind wherein articles to be labeled are moved uninterruptedly along a rectilinear path by a conveyor while labels are being applied to the articles, drive means for the conveyor operative to move it at either respectively of two different predetermined linear speeds, means to supply articles to the conveyor, and control means for the drive means operative automatically to cause the conveyor to run at the lower of said speeds until articles are being supplied in a solid column to the conveyor.

38. The combination, according to claim 37, including means operative to interpose a predetermined time delay in shifting from the lower to the higher of said speeds.

39. In combination, in a labeling machine of the kind wherein bottles to be labeled are moved uninterruptedly, one following another in tandem relation along a single rectilinear path by a conveyor while labels are being applied to the bottles, means for supplying bottles to the conveyor, means operative to space the bottles on the conveyor so that the distance between successive bottles while moving along the aforesaid rectilinear path does not substantially exceed a bottle diameter, and means operative simultaneously to adhere labels to a predetermined number of bottles while the bottles are in motion along the aforesaid rectilinear path.

40. The combination according to claim 39 further characterized in having like parts disposed at opposite sides, respectively, of the article path and which are operative simultaneously to place gummed labels in adhering contact with the opposite sides, respectively, of an article as the latter moves along the aforesaid path, and means for supporting and actuating said parts to rock about axes parallel to the article path and also to reciprocate back and forth parallel to said path.

41. The combination, according to claim 39, wherein the means for adhering labels to the bottles comprises suction type grip fingers, means for moving all of the grip fingers simultaneously from a label-receiving position into label-adhering relation to the respective bottles, means for moving each grip finger longitudinally of the aforesaid path while holding its label in adhering relation to the bottle, and means for returning the several grip fingers simultaneously to the label-receiving position.

42. The combination, according to claim 39, wherein the means for adhering labels to each bottle comprises a suction type grip finger, and means for moving all of the grip fingers toward the corresponding bottles, then along and parallel to the aforesaid article path at the same speed as the bottles, then outwardly from the article path, and then reversely along and parallel to the aforesaid article path to the starting point.

43. A labeling machine according to claim 42, having an abutment element associated with and at the opposite side of the article path from each respective grip finger and which is engageable with the opposite side of the article from that to which the label is adhered for supporting the article while the label is being so adhered, and means for moving said abutment elements along the conveyor path at the same linear velocity as the grip finger.

44. In a labeling machine of the kind wherein articles to be labeled are moved in predetermined spaced tandem relation, one following another, uninterruptedly along the same rectilinear path, means adjacent to said path for applying labels to said articles while they are in motion along said path, characterized in that the label-applying means comprises a plurality of like label-picking devices, spaced from one another a distance equal to the spacing of the articles, each label-picking device comprising a pair of relatively movable picker blades mounted to oscillate about an axis parallel to the article path, and means for actuating all of said picker devices simultaneously.

45. In a labeling machine of the kind wherein articles to be labeled are moved, one following another, in predetermined spaced tandem relation uninterruptedly along the same rectilinear path, means adjacent to said path for applying labels to said articles while they are in motion along said path, characterized in that the label-applying means comprises a plurality of like, fixed label magazines, spaced apart from one another along said path a distance equal to the spacing of the articles, and means for removing a label from each of the several magazines simultaneously.

46. The combination according to claim 45, further characterized in having means operative to receive labels, so removed from the several magazines, and which is operative simultaneously to adhere labels to each article of such a group, the number of articles in the group being equal to the number of magazines, while said group of articles is moving uninterruptedly along the path, wiper means for pressing the label, after it has been initially adhered to an article, firmly and smoothly against the article, said wiper means comprising a plurality of sets of wiper devices, each set comprising a number of wiper devices equal to the number of articles comprised in the group, and means for so actuating the several sets of wiper devices that when the wiper devices of one set are operatively engaging labels on the articles of one group the wipers of another set are operatively engaging labels on the articles of a different group, the several sets of wiper devices being so arranged as simultaneously to contact the labels on articles of successive groups, respectively.

47. A labeling machine according to claim 45 wherein groups of spaced articles to be labeled are moved one following another uninterruptedly in succession along the same path, the number of articles forming each group being equal to the number of magazines, means operative to apply labels so removed from the magazine simultaneously to each of the articles of a group as said group continues to advance along the aforesaid path, said label-applying means comprising sets of label pickers, in number corresponding to the number of articles constituting such a group, means normally operative to actuate all of said pickers simultaneously, and means operative to prevent effective operation of the pickers in the event that an incomplete group of articles approaches the field of action of the pickers.

48. A labeling machine, according to claim 45, having means for supplying gum to the pickers comprising a single gum transfer roll which normally moves from a gum supply roll to a position such as to deliver gum simultaneously to all of the pickers, drive means for the machine including an electric motor, a normally closed switch in the motor circuit, and means operative to prevent stopping of the machine, after said switch has been opened, until the transfer roll occupies a position in which it is spaced from the gum supply roll and is inoperative to supply gum to the pickers.

49. In a labeling machine of the kind wherein articles to be labeled are moved in predetermined spaced tandem relation uninterruptedly, one following another along the same rectilinear path, means adjacent to said path for applying labels to said articles while they are in motion along aforesaid path, characterized in that the label-applying means comprises a plurality of like, label transfer devices, spaced apart from one another along the aforesaid path a distance equal to the spacing of the articles, means for moving all of the transfer devices simultaneously, each from a label-receiving position to a position at which a label carried by the transfer device is contacted with the corresponding article, and means for moving all of the transfer devices simultaneously along the article path while holding the labels in contact with the respective articles.

50. A labeling machine according to claim 49, further characterized in that the means for moving the transfer devices along the article path is so devised that after a predetermined travel with the corresponding article each transfer device is restored to label-receiving position, and means operative simultaneously to press said labels into firm contact with the respective articles while the latter continue to move along the aforesaid path.

51. A labeling machine according to claim 50, further characterized in that the transfer devices are suction grip fingers and the means for pressing the labels into firm contact with the moving articles comprises a plurality of wipers, in number equal to the number of grip fingers, and spaced apart the same distance as the articles to be labeled, and means for moving the wipers simultaneously toward said path.

52. A labeling machine according to claim 51, wherein each grip finger has suction orifices which communicate with a conduit, and means operative alternatively to establish vacuum or pressure in the conduit.

53. In a labeling machine of the kind wherein articles to be labeled are moved in predetermined spaced tandem relation uninterruptedly and one following another along the same rectilinear path, means adjacent to said path for applying labels to said articles while they are in motion along said path, characterized in that the label-applying means comprises a plurality of like, label wipers, spaced apart along the aforesaid path a distance equal to the spacing of said articles, means operative simultaneously to move each of the wipers from an inoperative position into wiping contact with a label on a corresponding article, and means for moving all of said wipers simultaneously along the article path and at the same linear speed as the articles.

54. A labeling machine according to claim 53, having means operative to deliver articles into the aforesaid path so that successive articles are spaced apart a distance not substantially exceeding the maximum transverse dimension of the articles, the label-applying means being operative to apply labels simultaneously to a plurality of successive articles constituting a group while said group is moving along said path, the wipers, in number, equalling the number of articles constituting said group, means for advancing all of said wipers parallel to said path, while in contact with the articles, a distance equal to the length of said group of articles, and then to retract the wipers from the articles, and means to return the wipers to their starting point and to engage them with the articles constituting a following group.

55. A labeling machine according to claim 54, further characterized in that the label-applying means comprises elements operative to adhere labels to opposite sides, respectively, of each of the articles constituting each successive group while so moving, and means for simultaneously pressing the labels so adhered to opposite sides of the respective articles into firm contact with the articles while the latter continue to move along said path, said pressing means comprising wipers, in number equal to the number of articles in a group, disposed at opposite sides respectively of the article path, means for moving all of the wipers at opposite sides of said path simultaneously toward each other and into contact with the labels on the articles, and means for moving the wipers at opposite sides of the article path simultaneously along said path and at the same speed as the articles while pressing the labels against the article.

56. A labeling machine according to claim 53, wherein a constantly moving conveyor advances the articles along said path, means moving transversely of said path for applying labels simultaneously to each of a plurality of the articles while they are so moving, one after another in tandem relation along the aforesaid path, and means for supporting the wipers for bodily movement along the conveyor path while pressing the labels against the articles, each wiper having a resiliently yieldable label-contacting face, and pneumatic means for urging the wipers toward the articles.

57. A labeling machine according to claim 56, wherein each wiper is carried by a piston rod having a head which slides in a cylinder and means operative to deliver pressure fluid to each of the cylinders at a predetermined time in the labeling cycle.

58. In a labeling machine of the type wherein equally spaced bottles to be labeled are moved uninterruptedly, one following another, in tandem relation along the same rectilinear path, the space between successive bottles not substantially exceeding the diameter of a bottle, means adjacent to said path for simultaneously applying labels to a predetermined number of said bottles as the bottles continue to move along the aforesaid path.

59. A labeling machine, according to claim 58, wherein the means for applying the labels comprises spaced label-picking devices, in number corresponding to the number of bottles to be labeled simultaneously, each picker device comprising a pair of picker blades arranged to oscillate about the same axis, and means for swinging all of the picker blades simultaneously toward and from said path.

60. In combination, in a labeling machine which includes a conveyor of generally conventional type such as is customarily employed in bottle-labeling machines, and which has an article-supporting surface of a character such that an article, standing thereon, may be oriented to present it in proper position to receive a label from a label-applying device, the conveyor being operative to move articles, each of which is substantially rigid and each of which has a body portion that, in transverse horizontal section, is substantially symmetrical in peripheral contour, along a predetermined path with the article standing upon the conveyor with its axis of symmetry vertical, label-applying means comprising a part which is movable transversely of said path and which is operative to press an individual label against the peripheral surface of an article as the latter moves along said path, hold-down means operative, by contact with the top of an article while it is so moving, to prevent the article from tipping when subjected to lateral pressure during application of the label to the peripheral surface of the article, said hold-down means comprising an elongate resilient element parallel to and above the article path, the length of said element being such that it may contact the tops of a plurality of articles simultaneously and regardless of the spacing of the articles one from another, and means for moving said element at the same speed as the articles and in the same direction.

61. The combination according to claim 60, wherein said hold-down means comprises an endless belt provided at its outer side with a layer of resiliently yieldable material, means for guiding the belt to form a run parallel to the conveyor, the resilient layer being at the underside of said run with its exposed face so spaced from the conveyor as to contact the tops of articles as the latter move along the conveyor path, the yieldable layer which forms said run presenting a substantially continuous uninterrupted surface for contact with the article tops.

62. The combination according to claim 61, wherein the yieldable layer is of soft rubber of the order of one inch in thickness, said soft rubber layer having at regular intervals, spaced slits extending inwardly from its outer surface and to a distance of approximately three-quarters of the thickness of the rubber, said slits defining relatively movable blocks which constitute yieldable hold-down elements.

63. A hold-down device, according to claim 61, wherein the endless belt has teeth on one surface for engagement with a toothed drive element, the opposite surface of the belt carrying the layer of yieldable material, the latter being soft rubber of the order of one inch in thickness, said layer of rubber having transverse holes at regularly spaced intervals along the length of the belt, the rubber having incisions extending from its outer surface to each of said holes, respectively, the incisions and holes defining yieldable article-engaging blocks integrally joined at their inner portions and which are free to flex apart at their outer portions when the belt is trained about the drive element, but whose outer faces are normally in substantially the same plane and form a substantially continuous uninterrupted surface for contact with the tops of the articles.

64. A labeling machine according to claim 61, having means for simultaneously moving the conveyor and the endless belt at the same linear velocity, means for delivering articles into the conveyor path and means operative automatically to stop the belt and conveyor if an article too tall to enter between the belt and conveyor approaches the entrance to said path.

65. In a labeling machine of the kind wherein each article to be labeled is a bottle which is moved by a conveyor along a predetermined path while it is so supported by the conveyor that the axis of the bottle is vertical, in combination, hold-down means engageable simultaneously with the tops of several successive bottles while the latter are so moving, thereby to prevent the bottles from tipping, said hold-down means comprising a layer of resiliently yieldable material for contact with the tops of the bottles, an endless belt to which said yieldable layer is attached, means so guiding said belt that the yieldable hold-down layer moves in a path parallel to the bottle-supporting surface of the conveyor and at such a distance from the latter that the resilient layer normally contacts the tops of the moving bottles with resilient pressure, means moving the belt with its yieldable layer at the same linear velocity as the conveyor, the yieldable layer being so constructed and arranged that, while moving along said path, it presents a substantially continuous, uninterrupted bottle-contacting surface, and means operative to orient bottles while they are in said path, the means for guiding the belt comprising an elongate rigid shoe whose lower surface is directly above and parallel to the conveyor, said shoe having a recess at the orienting point to relieve the pressure on the bottle top normally exerted by the yieldable layer of the belt, thereby to facilitate the orientation of the bottle.

References Cited in the file of this patent

UNITED STATES PATENTS

| Number | Name | Date |
|---|---|---|
| 604,085 | Richards | May 17, 1898 |
| 704,480 | Leiger | July 8, 1902 |
| 1,308,280 | Ermold | July 1, 1919 |
| 1,425,351 | Weeks | Aug. 8, 1922 |
| 1,875,301 | Fredsell | Aug. 30, 1932 |
| 2,051,105 | Roberts | Aug. 18, 1936 |
| 2,162,443 | Muller | June 13, 1939 |
| 2,221,396 | Evoy | Nov. 12, 1940 |
| 2,262,721 | Flygare et al. | Nov. 11, 1941 |
| 2,293,553 | Magnusson | Aug. 18, 1942 |
| 2,297,296 | Flintjer | Sept. 29, 1942 |
| 2,397,312 | Forrest | Mar. 26, 1946 |
| 2,528,944 | Carter | Nov. 7, 1950 |
| 2,540,694 | Sieg | Feb. 16, 1951 |
| 2,571,036 | Heyne et al. | Oct. 9, 1951 |
| 2,623,655 | Glans | Dec. 30, 1952 |
| 2,687,821 | Fairest | Aug. 31, 1954 |
| 2,692,671 | Day et al. | Oct. 26, 1954 |
| 2,723,743 | Carter | Nov. 15, 1955 |
| 2,725,156 | Manas | Nov. 29, 1955 |
| 2,771,206 | Daniels et al. | Nov. 20, 1956 |